US010542544B2

(12) United States Patent
Zhang et al.

(10) Patent No.: US 10,542,544 B2
(45) Date of Patent: Jan. 21, 2020

(54) INFORMATION TRANSMISSION METHOD, BASE STATION, AND USER EQUIPMENT

(71) Applicant: Huawei Technologies Co., Ltd., Shenzhen, Guangdong (CN)

(72) Inventors: Jian Zhang, Shanghai (CN); Yuanjie Li, Shanghai (CN); Bingyu Qu, Beijing (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/785,079

(22) Filed: Oct. 16, 2017

(65) Prior Publication Data

US 2018/0042000 A1  Feb. 8, 2018

Related U.S. Application Data

(63) Continuation of application No. PCT/CN2015/076879, filed on Apr. 17, 2015.

(51) Int. Cl.
*H04W 72/04* (2009.01)
*H04B 7/06* (2006.01)
*H04B 7/04* (2017.01)
*H04B 7/08* (2006.01)
*H04W 48/00* (2009.01)

(52) U.S. Cl.
CPC ............ *H04W 72/046* (2013.01); *H04B 7/04* (2013.01); *H04B 7/063* (2013.01); *H04B 7/0626* (2013.01); *H04B 7/0695* (2013.01); *H04B 7/088* (2013.01); *H04W 72/042* (2013.01); *H04W 48/00* (2013.01)

(58) Field of Classification Search
CPC ..... H04W 8/005; H04W 16/28; H04W 24/10; H04W 48/16; H04W 72/042; H04W 72/046; H04B 7/088; H04B 7/0626; H04B 7/0695; H04B 7/0413
See application file for complete search history.

(56) References Cited

U.S. PATENT DOCUMENTS

| 2006/0030364 | A1* | 2/2006 | Olesen | H04B 7/0617 455/562.1 |
| 2010/0189189 | A1* | 7/2010 | Hoshino | H04B 7/0408 375/267 |
| 2011/0143807 | A1* | 6/2011 | Aue | H04B 7/0413 455/522 |

(Continued)

FOREIGN PATENT DOCUMENTS

| CN | 104115419 A | 10/2014 |
| WO | 2013086164 A1 | 6/2013 |

*Primary Examiner* — Michael Thier
*Assistant Examiner* — Prince A Mensah
(74) *Attorney, Agent, or Firm* — Staas & Halsey LLP

(57) ABSTRACT

Embodiments of the present application provide an information transmission method, includes: receiving a beam indication signal on at least one beam that is sent by a base station, where the beam indication signal carries identity information of the beam on which the signal is located; determining the identity information of the at least one beam according to the beam indication signal on the at least one beam; determining, according to signal quality of the at least one beam, a primary beam used when the base station sends a downlink signal to the UE; and sending a first beam report message to the base station, where the first beam report message carries identity information of the primary beam.

17 Claims, 19 Drawing Sheets

(56) References Cited

U.S. PATENT DOCUMENTS

| | | |
|---|---|---|
| 2013/0155847 A1 | 6/2013 | Li et al. |
| 2013/0223251 A1 | 8/2013 | Li et al. |
| 2013/0258885 A1 | 10/2013 | Yu et al. |
| 2013/0322280 A1 | 12/2013 | Pi |
| 2014/0044044 A1* | 2/2014 | Josiam ................. H04W 24/10 370/328 |
| 2014/0056256 A1 | 2/2014 | Kim et al. |
| 2014/0177561 A1* | 6/2014 | Yu ....................... H04W 72/042 370/329 |
| 2015/0004918 A1 | 1/2015 | Wang et al. |
| 2015/0230263 A1* | 8/2015 | Roy ..................... H04W 16/28 455/452.2 |
| 2015/0382171 A1* | 12/2015 | Roy ..................... H04W 48/16 370/329 |
| 2016/0262140 A1* | 9/2016 | Liu ...................... H04W 16/28 |
| 2016/0285660 A1* | 9/2016 | Frenne ................. H04L 27/261 |
| 2016/0353271 A1* | 12/2016 | Stephenne ............ H04W 8/005 |

\* cited by examiner

INFORMATION TRANSMISSION METHOD, BASE STATION, AND USER EQUIPMENT

CROSS-REFERENCE TO RELATED APPLICATIONS

This application is a continuation of International Application No. PCT/CN2015/076879, filed on Apr. 17, 2015, the disclosure of which is hereby incorporated by reference in its entirety.

TECHNICAL FIELD

The present application relates to the communications field, and more specifically, to an information transmission method, a base station, and user equipment.

BACKGROUND

With rapid development of a packet service and an intelligent terminal, a service of a high speed and a large data volume has an increasing demand for a spectrum. A centimeter wave frequency band generally refers to a spectrum ranging from 3 GHz to 30 GHz, and a millimeter wave frequency band generally refers to a spectrum ranging from 30 GHz to 300 GHz, which may be collectively referred to as a millimeter wave. Because of a large amount of available bandwidth, the millimeter wave will be a potential target spectrum in future development of 5G communications and $3^{rd}$ Generation Partnership Project (3GPP) Long Term Evolution Advanced (LTE-A). In the prior art, cellular communications such as Long Term Evolution (LTE) usually uses a frequency band of approximately 2 GHz or lower, and an LTE-A small cell enhancement standardization project is studying and using a 3.5 GHz frequency band. In the Institute of Electrical and Electronics Engineers (IEEE) 802.11ad standard, a 60 GHz frequency band is used for a wireless local area network (WLAN), and is usually used for indoor communication at a short distance of approximately 10 meters.

A 6 GHz or higher frequency band has not been used in cellular communication in the prior art. A main challenge of using a millimeter-wave high frequency band in cellular communication lies in that relatively large free-space attenuation exists in this band; in addition, attenuation caused by absorption and scattering by air, rain, fog, buildings or other objects is extremely severe. A beamforming technology is considered as a potential technology that can compensate a severe millimeter-wave pathloss, and a massive multiple-input multiple-output (Massive MIMO or Large Scale MIMO) system is considered as a potential direction for implementing the beamforming technology in a millimeter wave frequency band.

The IEEE 802.11ad standard supports beamforming. A process of performing beam training between two nodes in communication is as follows: A node 1 separately sends training beacons in multiple different directions in a beam manner, and a node 2 receives the training beacons in a quasi-omni manner and identifies a best beam a; the node 2 separately sends beacons in multiple different directions in a beam manner, and the node 1 receives the beacons in a quasi-omni manner and identifies a best beam b; and the node 2 reports the best beam a to the node 1, and the node 1 reports the best beam b to the node 2, so as to find an optimal matched beam pair. Subsequently, data communication is performed in directions of the beam pair. However, the 802.11ad is usually used in short-distance indoor point-to-point communication, in which a beam training process is complex, a delay is relatively long, and efficiency is relatively low, and cannot be directly applied to a cellular mobile communications system.

Current cellular communication is performed in a low frequency band, and an omni transmission manner is generally used for a common signal in a cell, such as a synchronization channel and a broadcast channel. If the omni transmission manner is still used for a common signal in a millimeter-wave high-frequency-band cellular communications system, a transmission range of the common signal is limited, for example, is several dozens of meters, and this results in an adverse effect on power consumption of a base station, coverage and a capacity of a cell, and the like.

SUMMARY

Embodiments of the present application provide an information transmission method, a base station, and user equipment, so that a primary beam used when a base station sends a downlink signal to UE can be determined, and this helps improve communication quality in downlink communication performed by the base station.

According to a first aspect, an information transmission method is provided, and the method includes: receiving, by UE, a beam indication signal on at least one beam that is sent by a base station, where the beam indication signal carries identity information of the beam on which the signal is located; determining, by the UE, the identity information of the at least one beam according to the beam indication signal on the at least one beam; determining, by the UE according to signal quality of the at least one beam, a primary beam used when the base station sends a downlink signal to the UE; and sending, by the UE, a first beam report message to the base station, where the first beam report message carries identity information of the primary beam.

With reference to the first aspect, in a first possible implementation, the method further includes: determining, by the UE, that the primary beam becomes abnormal if signal quality detected by the UE on the primary beam within a first preset time period is less than a first preset threshold; or determining, by the UE, that the primary beam becomes abnormal if the UE detects no downlink signal on the primary beam within a second preset time period.

With reference to the first possible implementation of the first aspect, in a second possible implementation, the method further includes: when the primary beam becomes abnormal, sending, by the UE, a second beam report message to the base station, where the beam report message is used to indicate that the primary beam becomes abnormal; or when the primary beam becomes abnormal, sending, by the UE, an SRS to the base station on a second SRS resource, where the base station configures a first SRS resource and the second SRS resource for the UE, and instructs the UE to send an SRS on the first SRS resource when the primary beam works normally and send an SRS on the second SRS resource when the primary beam works abnormally.

With reference to the second possible implementation of the first aspect, in a third possible implementation, the method further includes: receiving, by the UE in a low-frequency cell, beam receiving instruction information sent by the base station, where the beam receiving instruction information is used to instruct the UE to receive a downlink signal on at least one beam in a high-frequency cell; receiving, by the UE, the downlink signal on the at least one beam in the high-frequency cell; obtaining, by the UE, signal quality of the at least one beam in the high-frequency cell;

and using, by the UE, a beam with best signal quality as a new primary beam, and feeding back the new primary beam to the base station.

With reference to any one of the first aspect, or the first possible implementation of the first aspect to the third possible implementation of the first aspect, in a fourth possible implementation, specifically, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

With reference to any one of the first aspect, or the first possible implementation of the first aspect to the fourth possible implementation of the first aspect, in a fifth possible implementation, specifically, an uplink time-frequency resource used by the UE to send the first beam report message is configured by the base station for the UE.

With reference to any one of the first aspect, or the first possible implementation of the first aspect to the fifth possible implementation of the first aspect, in a sixth possible implementation, the method further includes: generating, by the UE, one or more receiving beams corresponding to the primary beam according to the primary beam and one or more pieces of receiving beam vector information corresponding to the primary beam, and receiving downlink information of the base station on the one or more receiving beams corresponding to the primary beam, where the one or more pieces of receiving beam vector information corresponding to the primary beam are preconfigured by the base station.

With reference to any one of the first aspect, or the first possible implementation of the first aspect to the sixth possible implementation of the first aspect, in a seventh possible implementation, the method further includes: generating, by the UE, one or more uplink beams corresponding to the primary beam according to the primary beam and one or more pieces of uplink beam vector information corresponding to the primary beam, and sending uplink information to the base station on the one or more uplink beams corresponding to the primary beam, where the one or more pieces of uplink beam vector information corresponding to the primary beam are preconfigured by the base station.

With reference to any one of the first aspect, or the first possible implementation of the first aspect to the sixth possible implementation of the first aspect, in an eighth possible implementation, the method further includes: sending, by the UE, an uplink SRS on the one or more uplink beams corresponding to the primary beam, so that the base station determines an uplink primary beam of the UE according to a measurement result of the uplink SRS on the one or more uplink beams corresponding to the primary beam; receiving, by the UE, uplink primary beam identity information sent by the base station; and sending, by the UE, an uplink signal on the uplink primary beam indicated in the uplink primary beam identity information.

With reference to any one of the first aspect, or the first possible implementation of the first aspect to the eighth possible implementation of the first aspect, in a ninth possible implementation, specifically, the base station and the UE agree in advance that adjacent beams of the primary beam are used as secondary beams of the primary beam.

With reference to any one of the first aspect, or the first possible implementation of the first aspect to the eighth possible implementation of the first aspect, in a tenth possible implementation, the method further includes: determining, by the UE, the at least one secondary beam according to the signal quality of the at least one beam, where a maximum quantity of secondary beams is configured by the base station for the UE, or is agreed upon by the base station and the UE in advance.

With reference to the ninth possible implementation or the tenth possible implementation of the first aspect, in an eleventh possible implementation, the method further includes: using, by the UE, the primary beam as a secondary beam and using the first secondary beam as a new primary beam if the UE detects that signal quality of the primary beam is less than a second preset threshold and signal quality of the first secondary beam is greater than a third preset threshold, and duration of this case is greater than a third preset time period, and reporting identity information of the new primary beam and the secondary beam to the base station.

With reference to the ninth possible implementation or the tenth possible implementation of the first aspect, in a twelfth possible implementation, the method further includes: replacing, by the UE, the second secondary beam with a first beam if the UE detects that signal quality of the second secondary beam is less than a fourth preset threshold and signal quality of the first beam is greater than a third preset threshold, and duration of this case is greater than a fourth preset time period, and sending identity information of the first beam and the second secondary beam to the base station, where the first beam is another beam other than the primary beam and the secondary beam in beams of the UE.

With reference to any one of the ninth possible implementation of the first aspect to the twelfth possible implementation of the first aspect, in a thirteenth possible implementation, the method further includes: if channel quality of a current primary beam and channel quality of all secondary beams of the UE are all less than a fourth preset threshold, and duration of this case is greater than a fifth preset time period, attempting, by the UE, to communicate with the base station on a beam corresponding to a preconfigured candidate beam identity, where the beam corresponding to the candidate beam identity is used when the primary beam and all the secondary beams fail.

With reference to the first aspect or the first possible implementation of the first aspect, in a fourteenth possible implementation, the method further includes: selecting, by the UE, a beam corresponding to a preconfigured candidate beam identity as a primary beam if a current primary beam of the UE becomes abnormal, where the beam corresponding to the candidate beam identity is used when the primary beam fails.

With reference to any one of the first aspect, or the first possible implementation of the first aspect to the fourteenth possible implementation of the first aspect, in a fifteenth possible implementation, before the UE receives a beam indication signal on at least one beam that is sent by a base station, the method further includes: when the UE enters a high-frequency cell, sending, by the UE, a discovery signal to the base station according to configuration information of the high-frequency cell, so that the base station sends, according to the discovery signal of the UE, the beam indication signal to the UE on the at least one beam in a direction in which the discovery signal of the UE is located.

With reference to any one of the first aspect, or the first possible implementation of the first aspect to the fifteenth possible implementation of the first aspect, in a sixteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a second aspect, an information transmission method is provided, and the method includes: sending, by a base station, a beam indication signal to UE on at least one beam, where the beam indication signal carries identity information of the beam on which the signal is located; receiving, by the base station, a first beam report message fed back by the UE, where the first beam report message carries identity information of a primary beam in the at least one beam, and the primary beam is determined by the UE according to signal quality of the at least one beam; determining, by the base station, the primary beam according to the first beam report message.

With reference to the second aspect, in a first possible implementation, the method further includes: detecting, by the base station, an uplink signal of the UE on an uplink beam corresponding to the primary beam; and when the base station detects no measurement signal of the UE on the uplink beam corresponding to the primary beam, determining, by the base station, that the primary beam becomes abnormal; or if the base station detects that quality of a measurement signal of the UE on the uplink beam corresponding to the primary beam is less than a first preset threshold, determining, by the base station, that the primary beam becomes abnormal.

With reference to the second aspect, in a second possible implementation, the method further includes: if the base station receives, on a second SRS resource, an SRS sent by the UE, determining that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

With reference to the second aspect, or the first possible implementation of the second aspect or the second possible implementation of the second aspect, in a third possible implementation, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

With reference to any one of the second aspect, or the first possible implementation of the second aspect to the third possible implementation of the second aspect, in a fourth possible implementation, the method further includes: receiving, by the base station, second beam report information sent by the UE, where the second beam report information indicates that the primary beam works abnormally.

With reference to any one of the second aspect, or the first possible implementation of the second aspect to the fourth possible implementation of the second aspect, in a fifth possible implementation, specifically, an uplink time-frequency resource used by the UE to send the first beam report message is configured by the base station for the UE.

With reference to any one of the second aspect, or the first possible implementation of the second aspect to the fifth possible implementation of the second aspect, in a sixth possible implementation, the method further includes:

preconfiguring, by the base station, one or more pieces of corresponding receiving beam vector information for each beam in the at least one beam of the UE; and/or preconfiguring, by the base station, one or more pieces of corresponding uplink beam vector information for each beam in the at least one beam of the UE.

With reference to any one of the second aspect, or the first possible implementation of the second aspect to the sixth possible implementation of the second aspect, in a seventh possible implementation, specifically, the base station and the UE agree in advance that adjacent beams of the primary beam are used as the secondary beams.

With reference to any one of the second aspect, or the first possible implementation of the second aspect to the sixth possible implementation of the second aspect, in an eighth possible implementation, the method further includes: determining, by the base station, at least one secondary beam for the primary beam according to the first beam report message, where the first beam report message further carries identity information of the at least one secondary beam for the primary beam.

With reference to any one of the second aspect, or the first possible implementation of the second aspect to the sixth possible implementation of the second aspect, in a ninth possible implementation, the method further includes: obtaining, by the base station, signal quality of an uplink SRS sent by the UE on an uplink beam corresponding to a beam in the at least one beam other than the primary beam; and selecting, by the base station from the at least one beam, at least one beam with relatively good uplink SRS signal quality as the secondary beam for the primary beam.

With reference to any one of the second aspect, or the first possible implementation of the second aspect to the ninth possible implementation of the second aspect, in a tenth possible implementation, the method further includes: sending, by the base station, identity information of at least one beam to the UE in a low-frequency cell, so that the UE finds a beam corresponding to an identifier of the at least one beam in a high-frequency cell, and receives downlink information on the beam corresponding to the identifier of the at least one beam; and sending, by the base station, the downlink information on one or more beams in the at least one beam.

With reference to any one of the second aspect, or the first possible implementation of the second aspect to the tenth possible implementation of the second aspect, in an eleventh possible implementation, specifically, the base station preconfigures at least one candidate beam identity corresponding to each primary beam; and when the primary beam and all the secondary beams fail, the base station performs downlink communication with the UE by using a beam indicated by the at least one candidate beam identity corresponding to the primary beam.

With reference to any one of the second aspect, or the first possible implementation of the first aspect to the eleventh possible implementation of the second aspect, in a twelfth possible implementation, before the sending, by the base station, a beam indication signal to UE on at least one beam, the method further includes: receiving, by the base station, a discovery signal sent when the UE enters a high-frequency cell; determining, by the base station, a location and a direction of the UE according to the discovery signal of the UE; and determining, by the base station, the at least one beam according to the location and the direction of the UE, where the at least one beam is located in the location and the direction of the UE.

With reference to any one of the second aspect, or the first possible implementation of the second aspect to the twelfth possible implementation of the second aspect, in a thirteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a third aspect, an information transmission method is provided, and the method includes: receiving, by UE, a beam indication signal on at least one beam that is sent by a base station, where the beam indication signal carries identity information of the beam on which the signal is located; obtaining, by the UE, the identity information of the at least one beam according to the beam indication signal on the at least one beam; obtaining, by the UE, signal quality information of the at least one beam; sending, by the UE, a first beam report message to the base station, where the first beam report message carries the signal quality information of the at least one beam; receiving, by the UE, identity information of a primary beam that is sent by the base station, and determining the primary beam according to the identity information of the primary beam.

With reference to the third aspect, in a first possible implementation, the method further includes: determining, by the UE, that the primary beam becomes abnormal if signal quality detected by the UE on the primary beam within a first preset time period is less than a first preset threshold; or determining, by the UE, that the primary beam becomes abnormal if the UE detects no downlink signal on the primary beam within a second preset time period.

With reference to the first possible implementation of the third aspect, in a second possible implementation, the method further includes: when the primary beam becomes abnormal, sending, by the UE, a second beam report message to the base station, where the beam report message is used to indicate that the primary beam becomes abnormal; or when the primary beam becomes abnormal, sending, by the UE, a sounding reference signal SRS to the base station on a second SRS resource, where the base station configures a first SRS resource and the second SRS resource for the UE, and instructs the UE to send an SRS on the first SRS resource when the primary beam works normally and send an SRS on the second SRS resource when the primary beam works abnormally.

With reference to the third aspect, or the first possible implementation of the third aspect, or the second possible implementation of the third aspect, in a third possible implementation, the first beam report message includes at least one piece of the following information: CSI-RS port information corresponding to the primary beam, a CSI measurement result corresponding to the primary beam, or an RRM measurement result corresponding to the primary beam.

With reference to any one of the third aspect, or the first possible implementation of the third aspect to the third possible implementation of the third aspect, in a fourth possible implementation, the method further includes: receiving, by the UE in a low-frequency cell, beam receiving instruction information sent by the base station, where the beam receiving instruction information is used to instruct the UE to receive a downlink signal on at least one beam in a high-frequency cell; obtaining, by the UE, signal quality of the at least one beam in the high-frequency cell; and using, by the UE, a beam with best signal quality as a new primary beam, and feeding back the new primary beam to the base station.

With reference to any one of the third aspect, or the first possible implementation of the third aspect to the fourth possible implementation of the third aspect, in a fifth possible implementation, specifically, an uplink time-frequency resource used by the UE to send the first beam report message is configured by the base station for the UE.

With reference to any one of the third aspect, or the first possible implementation of the third aspect to the fifth possible implementation of the third aspect, in a sixth possible implementation, the method further includes:

generating, by the UE, one or more receiving beams corresponding to the primary beam according to the primary beam and one or more pieces of receiving beam vector information corresponding to the primary beam, and receiving downlink information of the base station on the one or more receiving beams corresponding to the primary beam, where the one or more pieces of receiving beam vector information corresponding to the primary beam are preconfigured by the base station.

With reference to any one of the third aspect, or the first possible implementation of the third aspect to the sixth possible implementation of the third aspect, in a seventh possible implementation, the method further includes: generating, by the UE, one or more uplink beams corresponding to the primary beam according to the primary beam and one or more pieces of uplink beam vector information corresponding to the primary beam, and sending uplink information to the base station on the one or more uplink beams corresponding to the primary beam, where the one or more pieces of uplink beam vector information corresponding to the primary beam are preconfigured by the base station.

With reference to any one of the third aspect, or the first possible implementation of the third aspect to the seventh possible implementation of the third aspect, in an eighth possible implementation, the method further includes: sending an uplink SRS on the one or more uplink beams corresponding to the primary beam, so that the base station determines an uplink primary beam of the UE according to a measurement result of the uplink SRS on the one or more uplink beams corresponding to the primary beam; receiving, by the UE, uplink primary beam identity information sent by the base station; and sending, by the UE, an uplink signal on the uplink primary beam indicated in the uplink primary beam identity information.

With reference to any one of the third aspect, or the first possible implementation of the third aspect to the eighth possible implementation of the third aspect, in a ninth possible implementation, specifically, the base station and the UE agree in advance that adjacent beams of the primary beam are used as secondary beams of the primary beam.

With reference to any one of the third aspect, or the first possible implementation of the third aspect to the eighth possible implementation of the third aspect, in a tenth possible implementation, the method further includes: determining, by the UE, the at least one secondary beam according to the first beam report message, where the first beam report message further carries identity information of the at least one secondary beam.

With reference to the ninth possible implementation of the third aspect or the tenth possible implementation of the third aspect, in an eleventh possible implementation, the method further includes: sending, by the UE, identity information and corresponding channel quality of the primary beam and a first secondary beam to the base station if the UE detects that signal quality of the primary beam is less than a second preset threshold and signal quality of the first secondary beam is greater than a third preset threshold, and duration of this case is greater than a third preset time period.

With reference to the ninth possible implementation of the third aspect or the tenth possible implementation of the third aspect, in a twelfth possible implementation, the method further includes: sending, by the UE, identity information and corresponding channel quality of a first beam and a second secondary beam to the base station if the UE detects that signal quality of the second secondary beam is less than a fourth preset threshold and signal quality of the first beam is greater than a third preset threshold, and duration of this case is greater than a fourth preset time period.

With reference to any one of the ninth possible implementation of the third aspect to the twelfth possible implementation of the third aspect, in a thirteenth possible implementation, the method further includes: if channel quality of a current primary beam and channel quality of all secondary beams of the UE are all less than a fourth preset threshold, and duration of this case is greater than a fifth preset time period, attempting, by the UE, to communicate with the base station on a beam corresponding to a preconfigured candidate beam identity, where the beam corresponding to the candidate beam identity is used when the primary beam and all the secondary beams fail.

With reference to the second possible implementation of the third aspect to the third possible implementation of the third aspect, in a fourteenth possible implementation, the method further includes: selecting, by the UE, a beam corresponding to a preconfigured candidate beam identity as a primary beam if a current primary beam of the UE becomes abnormal, where the beam corresponding to the candidate beam identity is used when the primary beam fails.

With reference to any one of the third aspect, or the first possible implementation of the third aspect to the fourteenth possible implementation of the third aspect, in a fifteenth possible implementation, before the UE receives a beam indication signal on at least one beam that is sent by a base station, the method further includes: when the UE enters a high-frequency cell, sending, by the UE, a discovery signal to the base station according to configuration information of the high-frequency cell, so that the base station sends, according to the discovery signal of the UE, the beam indication signal to the UE on the at least one beam in a direction in which the discovery signal of the UE is located.

With reference to any one of the third aspect, or the first possible implementation of the third aspect to the fifteenth possible implementation of the third aspect, in a sixteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a fourth aspect, an information transmission method is provided, and the method includes: sending, by a base station, a beam indication signal to user equipment UE on at least one beam, where the beam indication signal carries identity information of the beam on which the signal is located; receiving, by the base station, a first beam report message fed back by the UE, where the first beam report message carries signal quality information of the at least one beam; determining, by the base station according to the signal quality information of the at least one beam, a primary beam used when the base station sends a downlink signal to the UE.

With reference to the fourth aspect, in a first possible implementation, the method further includes: detecting, by the base station, an uplink signal of the UE on an uplink beam corresponding to the primary beam; and if the base station detects no measurement signal of the UE on the uplink beam corresponding to the primary beam, determining, by the base station, that the primary beam becomes abnormal; or if the base station detects that quality of a measurement signal of the UE on the uplink beam corresponding to the primary beam is less than a first preset threshold, determining, by the base station, that the primary beam becomes abnormal.

With reference to the fourth aspect, in a second possible implementation, the method further includes: if the base station receives, on a second SRS resource, an SRS sent by the UE, determining that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

With reference to the second possible implementation of the fourth aspect, in a third possible implementation, specifically, the signal quality information includes at least one piece of the following information: CSI-RS port information corresponding to the primary beam, a CSI measurement result corresponding to the primary beam, or an RRM measurement result corresponding to the primary beam.

With reference to the third possible implementation of the fourth aspect, in a fourth possible implementation, specifically, the first beam report message further carries a physical cell identifier corresponding to the primary beam.

With reference to any one of the fourth aspect, or the first possible implementation of the fourth aspect to the fourth possible implementation of the fourth aspect, in a fifth possible implementation, receiving, by the base station, second beam report information sent by the UE, where the second beam report information indicates that the primary beam works abnormally.

With reference to any one of the fourth aspect, or the first possible implementation of the fourth aspect to the fifth possible implementation of the fourth aspect, in a sixth possible implementation, specifically, an uplink time-frequency resource used by the UE to send the first beam report message is configured by the base station for the UE.

With reference to any one of the fourth aspect, or the first possible implementation of the fourth aspect to the sixth possible implementation of the fourth aspect, in a seventh possible implementation, the method further includes:
preconfiguring, by the base station, one or more pieces of corresponding receiving beam vector information for each beam in the at least one beam of the UE; and/or
preconfiguring, by the base station, one or more pieces of corresponding uplink beam vector information for each beam in the at least one beam of the UE.

With reference to any one of the fourth aspect, or the first possible implementation of the fourth aspect to the seventh possible implementation of the fourth aspect, in an eighth possible implementation, specifically, the base station and the UE agree in advance that adjacent beams of the primary beam are used as the secondary beams.

With reference to any one of the fourth aspect, or the first possible implementation of the fourth aspect to the seventh possible implementation of the fourth aspect, in a ninth possible implementation, the method further includes: determining, by the base station, at least one secondary beam for the primary beam according to the signal quality information of the at least one beam.

With reference to any one of the fourth aspect, or the first possible implementation of the fourth aspect to the seventh possible implementation of the fourth aspect, in a tenth possible implementation, obtaining, by the base station, signal quality of an uplink SRS sent by the UE on an uplink beam corresponding to a beam in the at least one beam other than the primary beam; and selecting, by the base station from the at least one beam, at least one beam with relatively good uplink SRS signal quality as the secondary beam for the primary beam.

With reference to any one of the fourth aspect, or the first possible implementation of the fourth aspect to the tenth possible implementation of the fourth aspect, in an eleventh possible implementation, the method further includes: sending, by the base station, identity information of at least one beam to the UE in a low-frequency cell, so that the UE finds a beam corresponding to an identifier of the at least one beam in a high-frequency cell, and receives downlink information on the beam corresponding to the identifier of the at least one beam; and sending, by the base station, the downlink information on one or more beams in the at least one beam.

With reference to any one of the fourth aspect, or the first possible implementation of the fourth aspect to the eleventh possible implementation of the fourth aspect, in a twelfth possible implementation, the base station preconfigures at least one candidate beam identity corresponding to each primary beam; and when the primary beam and all the secondary beams fail, the base station performs downlink communication with the UE by using a beam indicated by the at least one candidate beam identity corresponding to the primary beam.

With reference to any one of the fourth aspect, or the first possible implementation of the fourth aspect to the twelfth possible implementation of the fourth aspect, in a thirteenth possible implementation, before the sending, by the base station, a beam indication signal to UE on at least one beam, the method further includes: receiving, by the base station, a discovery signal sent when the UE enters a high-frequency cell; determining, by the base station, a location and a direction of the UE according to the discovery signal of the UE; and determining, by the base station, the at least one beam according to the location and the direction of the UE, where the at least one beam is located in the location and the direction of the UE.

With reference to any one of the fourth aspect, or the first possible implementation of the fourth aspect to the thirteenth possible implementation of the fourth aspect, in a fourteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a fifth aspect, user equipment is provided, and the user equipment includes: a receiving unit, configured to receive a beam indication signal on at least one beam that is sent by a base station, where the beam indication signal carries identity information of the beam on which the signal is located; an obtaining unit, configured to obtain the identity information of the at least one beam according to the beam indication signal on the at least one beam, where the obtaining unit is further configured to obtain signal quality of the at least one beam; a determining unit, configured to determine, according to the signal quality of the at least one beam, a primary beam used when the base station sends a downlink signal to the user equipment; and a sending unit, configured to send a first beam report message to the base station, where the first beam report message carries identity information of the primary beam.

With reference to the fifth aspect, in a first possible implementation, the determining unit is further configured to determine that the primary beam becomes abnormal if signal quality detected by the UE on the primary beam within a first preset time period is less than a first preset threshold; or determine that the primary beam becomes abnormal if the UE detects no downlink signal on the primary beam within a second preset time period.

With reference to the first possible implementation of the fifth aspect, in a second possible implementation, the determining unit is further configured to: when the primary beam becomes abnormal, send a second beam report message to the base station, where the beam report message is used to indicate that the primary beam becomes abnormal; or when the primary beam becomes abnormal, send a sounding reference signal SRS to the base station on a second SRS resource, where the base station configures a first SRS resource and the second SRS resource for the UE, and instructs the UE to send an SRS on the first SRS resource when the primary beam works normally and send an SRS on the second SRS resource when the primary beam works abnormally.

With reference to any one of the fifth aspect, or the first possible implementation of the fifth aspect to the second possible implementation of the fifth aspect, in a third possible implementation, the receiving unit is further configured to receive, in a low-frequency cell, beam receiving instruction information sent by the base station, where the beam receiving instruction information is used to instruct the user equipment to receive a downlink signal on at least one beam in a high-frequency cell; the receiving unit is further configured to receive the downlink signal on the at least one beam in the high-frequency cell; the obtaining unit is further configured to obtain signal quality of the at least one beam in the high-frequency cell; and the sending unit is further configured to: use a beam with best signal quality in the at least one beam in the high-frequency cell as a new primary beam, and feed back the new primary beam to the base station.

With reference to any one of the fifth aspect, or the first possible implementation of the fifth aspect to the third possible implementation of the fifth aspect, in a fourth possible implementation, specifically, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

With reference to the fifth aspect, in a fifth possible implementation, an uplink time-frequency resource used by the user equipment to send the first beam report message is configured by the base station for the user equipment.

With reference to any one of the fifth aspect, or the first possible implementation of the fifth aspect to the fifth possible implementation of the fifth aspect, in a sixth possible implementation, the receiving unit is further configured to: generate one or more receiving beams corresponding to the primary beam according to the primary beam and one or more pieces of receiving beam vector information corresponding to the primary beam, and receive downlink information of the base station on the one or more receiving beams corresponding to the primary beam, where the one or more pieces of receiving beam vector information corresponding to the primary beam are preconfigured by the base station.

With reference to any one of the fifth aspect, or the first possible implementation of the fifth aspect to the sixth possible implementation of the fifth aspect, in a seventh possible implementation, the sending unit is further configured to: generate one or more uplink beams corresponding to the primary beam according to the primary beam and one or more pieces of uplink beam vector information corresponding to the primary beam, and send uplink information to the base station on the one or more uplink beams corresponding to the primary beam, where the one or more pieces of uplink beam vector information corresponding to the primary beam are preconfigured by the base station.

With reference to any one of the fifth aspect, or the first possible implementation of the fifth aspect to the sixth possible implementation of the fifth aspect, in an eighth possible implementation, the sending unit is further configured to send an uplink SRS on the one or more uplink beams corresponding to the primary beam, so that the base station determines an uplink primary beam of the UE according to a measurement result of the uplink SRS on the one or more uplink beams corresponding to the primary beam; the receiving unit is further configured to receive uplink primary beam identity information sent by the base station; and the sending unit is further configured to send an uplink signal on the uplink primary beam indicated in the uplink primary beam identity information.

With reference to any one of the fifth aspect, or the first possible implementation of the fifth aspect to the eighth possible implementation of the fifth aspect, in a ninth possible implementation, specifically, the base station and the UE agree in advance that adjacent beams of the primary beam are used as secondary beams of the primary beam.

With reference to any one of the fifth aspect, or the first possible implementation of the fifth aspect to the eighth possible implementation of the fifth aspect, in a tenth possible implementation, the determining unit is further configured to determine the at least one secondary beam according to the signal quality of the at least one beam, where a maximum quantity of secondary beams is configured by the base station for the UE, or is agreed upon by the base station and the UE in advance.

With reference to the ninth possible implementation or the tenth possible implementation of the fifth aspect, in an eleventh possible implementation, the determining unit is further configured to use the primary beam as a secondary beam and use the first secondary beam as a new primary beam if the user equipment detects that signal quality of the primary beam is less than a second preset threshold and signal quality of the first secondary beam is greater than a third preset threshold, and duration of this case is greater than a third preset time period; and the sending unit is further configured to report identity information of the new primary beam and the secondary beam to the base station.

With reference to the ninth possible implementation or the tenth possible implementation of the fifth aspect, in a twelfth possible implementation, the determining unit is further configured to replace the second secondary beam with a first beam if the user equipment detects that signal quality of the second secondary beam is less than a fourth preset threshold and signal quality of the first beam is greater than a third preset threshold, and duration of this case is greater than a fourth preset time period; and the sending unit is further configured to send identity information of the first beam and the secondary beam to the base station, where the first beam is another beam other than the primary beam and the secondary beam in beams of the UE.

With reference to any one of the ninth possible implementation of the fifth aspect to the twelfth possible implementation of the fifth aspect, in a thirteenth possible implementation, the sending unit is further configured to: if channel quality of a current primary beam and channel quality of all secondary beams of the UE are all less than a fourth preset threshold, and duration of this case is greater than a fifth preset time period, attempt to communicate with the base station on a beam corresponding to a preconfigured candidate beam identity, where the beam corresponding to the candidate beam identity is used when the primary beam and all the secondary beams fail.

With reference to the fifth aspect or the first possible implementation of the fifth aspect, in a fourteenth possible implementation, the determining unit is further configured to select a beam corresponding to a preconfigured candidate beam identity as a primary beam when a current primary beam of the UE becomes abnormal, where the beam corresponding to the candidate beam identity is used when the primary beam fails.

With reference to any one of the fifth aspect, or the first possible implementation of the fifth aspect to the fourteenth possible implementation of the fifth aspect, in a fifteenth possible implementation, the sending unit is further configured to: when the user equipment enters a high-frequency cell, send a discovery signal to the base station according to configuration information of the high-frequency cell, so that the base station sends, according to the discovery signal of the user equipment, the beam indication signal to the user equipment on the at least one beam in a direction in which the discovery signal of the user equipment is located.

With reference to any one of the fifth aspect, or the first possible implementation of the fifth aspect to the fifteenth possible implementation of the fifth aspect, in a sixteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a sixth aspect, a base station is provided, and the base station includes: a sending unit, configured to send a beam indication signal to user equipment UE on at least one beam, where the beam indication signal carries identity information of the beam on which the signal is located; a receiving unit, configured to receive a first beam report message fed back by the UE, where the first beam report message carries identity information of a primary beam in the at least one beam, and the primary beam is determined by the UE according to signal quality of the at least one beam; and a determining unit, configured to determine the primary beam according to the first beam report message.

With reference to the sixth aspect, in a first possible implementation, the base station further includes a detection unit, configured to detect an uplink signal of the UE on an uplink beam corresponding to the primary beam; and the determining unit is further configured to: if the detection unit detects no measurement signal of the UE on the uplink beam corresponding to the primary beam, determine that the primary beam becomes abnormal, or if the detection unit detects that quality of a measurement signal of the UE on the uplink beam corresponding to the primary beam is less than a first preset threshold, determine that the primary beam becomes abnormal.

With reference to the sixth aspect, in a second possible implementation, the receiving unit is further configured to receive, on a second sounding reference signal SRS resource, an SRS sent by the UE; and the determining unit is further configured to: when the receiving unit receives, on the second SRS resource, the SRS sent by the UE, determine that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

With reference to the sixth aspect, or the first possible implementation of the sixth aspect or the second possible implementation of the sixth aspect, in a third possible implementation, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

With reference to any one of the sixth aspect, or the first possible implementation of the sixth aspect to the third possible implementation of the sixth aspect, in a fourth possible implementation, the receiving unit is further configured to receive second beam report information sent by the UE, where the second beam report information indicates that the primary beam works abnormally.

With reference to any one of the sixth aspect, or the first possible implementation of the sixth aspect to the fourth possible implementation of the sixth aspect, in a fifth possible implementation, specifically, an uplink time-frequency resource used by the UE to send the first beam report message is configured by the base station for the UE.

With reference to any one of the sixth aspect, or the first possible implementation of the sixth aspect to the fifth possible implementation of the sixth aspect, in a sixth possible implementation, the base station further includes a first configuration unit, configured to:

preconfigure one or more pieces of corresponding receiving beam vector information for each beam in the at least one beam of the UE; and/or preconfigure one or more pieces of corresponding uplink beam vector information for each beam in the at least one beam of the UE.

With reference to any one of the sixth aspect, or the first possible implementation of the sixth aspect to the sixth possible implementation of the sixth aspect, in a seventh possible implementation, specifically, the base station and the UE agree in advance that adjacent beams of the primary beam are used as the secondary beams.

With reference to any one of the sixth aspect, or the first possible implementation of the sixth aspect to the sixth possible implementation of the sixth aspect, in an eighth possible implementation, the determining unit is further configured to determine at least one secondary beam for the primary beam according to the first beam report message, where the first beam report message further carries identity information of the at least one secondary beam for the primary beam.

With reference to any one of the sixth aspect, or the first possible implementation of the sixth aspect to the sixth possible implementation of the sixth aspect, in a ninth possible implementation, the detection unit is further configured to obtain signal quality of an uplink SRS sent by the UE on an uplink beam corresponding to a beam in the at least one beam other than the primary beam; and the determining unit is further configured to select, from the at least one beam, at least one beam with relatively good uplink SRS signal quality as the secondary beam for the primary beam.

With reference to any one of the sixth aspect, or the first possible implementation of the sixth aspect to the ninth possible implementation of the sixth aspect, in a tenth possible implementation, the sending unit is further configured to send identity information of at least one beam to the UE in a low-frequency cell, so that the UE finds a beam corresponding to an identifier of the at least one beam in a high-frequency cell, and receives downlink information on the beam corresponding to the identifier of the at least one beam; and the sending unit is further configured to send the downlink information on one or more beams in the at least one beam.

With reference to any one of the sixth aspect, or the first possible implementation of the sixth aspect to the tenth possible implementation of the sixth aspect, in an eleventh possible implementation, the base station further includes a second configuration unit, configured to preconfigure at least one candidate beam identity corresponding to each primary beam, where when the primary beam and all the secondary beams fail, the base station performs downlink communication with the UE by using a beam indicated by the at least one candidate beam identity corresponding to the primary beam.

With reference to any one of the sixth aspect, or the first possible implementation of the sixth aspect to the eleventh possible implementation of the sixth aspect, in a twelfth possible implementation, before the sending unit sends the beam indication signal to the UE on the at least one beam, the receiving unit is further configured to receive a discovery signal sent when the UE enters a high-frequency cell; and the determining unit is further configured to determine a location and a direction of the UE according to the discovery signal of the UE, and determine the at least one beam according to the location and the direction of the UE, where the at least one beam is located in the location and the direction of the UE.

With reference to any one of the sixth aspect, or the first possible implementation of the sixth aspect to the twelfth possible implementation of the sixth aspect, in a thirteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to a seventh aspect, user equipment is provided, and the user equipment includes: a receiving unit, configured to receive a beam indication signal on at least one beam that is sent by a base station, where the beam indication signal carries identity information of the beam on which the signal is located; an obtaining unit, configured to obtain the identity information of the at least one beam according to the beam indication signal on the at least one beam, where the obtaining unit is further configured to obtain signal quality of the at least one beam; a sending unit, configured to send a first beam report message to the base station, where the first beam report message carries signal quality information of the at least one beam; where the receiving unit is further configured to receive primary beam identity information sent by the base station; and a determining unit, configured to determine a primary beam according to the primary beam identity information.

With reference to the seventh aspect, in a first possible implementation, the determining unit is further configured to determine that the primary beam becomes abnormal if signal quality detected by the UE on the primary beam within a first preset time period is less than a first preset threshold; or determine that the primary beam becomes abnormal if the UE detects no downlink signal on the primary beam within a second preset time period.

With reference to the first possible implementation of the seventh aspect, in a second possible implementation, the sending unit is further configured to: when the primary beam becomes abnormal, send a second beam report message to the base station, where the beam report message is used to indicate that the primary beam becomes abnormal; or when the primary beam becomes abnormal, send an SRS to the base station on a second SRS resource, where the base station configures a first SRS resource and the second SRS resource for the user equipment, and instructs the user equipment to send an SRS on the first SRS resource when the primary beam works normally and send an SRS on the second SRS resource when the primary beam works abnormally.

With reference to the seventh aspect, or the first possible implementation of the seventh aspect, or the second possible implementation of the seventh aspect, in a third possible implementation, the first beam report message includes at least one piece of the following information: CSI-RS port information corresponding to the primary beam, a CSI measurement result corresponding to the primary beam, or an RRM measurement result corresponding to the primary beam.

With reference to any one of the seventh aspect, or the first possible implementation of the seventh aspect to the third possible implementation of the seventh aspect, in a fourth possible implementation, the receiving unit is further configured to receive, in a low-frequency cell, beam receiving instruction information sent by the base station, where the beam receiving instruction information is used to instruct the user equipment to receive a downlink signal on at least one beam in a high-frequency cell; the receiving unit is further configured to receive the downlink signal on the at least one beam in the high-frequency cell; the obtaining unit is further configured to obtain signal quality of the at least one beam in the high-frequency cell; and the sending unit is further configured to feed back the signal quality of the at least one beam to the base station.

With reference to any one of the seventh aspect, or the first possible implementation of the seventh aspect to the fourth possible implementation of the seventh aspect, in a fifth possible implementation, an uplink time-frequency resource used by the user equipment to send the first beam report message is configured by the base station for the user equipment.

With reference to any one of the seventh aspect, or the first possible implementation of the seventh aspect to the fifth possible implementation of the seventh aspect, in a sixth possible implementation, the receiving unit is further configured to: generate one or more receiving beams corresponding to the primary beam according to the primary beam and one or more pieces of receiving beam vector information corresponding to the primary beam, and receive downlink information of the base station on the one or more receiving beams corresponding to the primary beam, where the one or more pieces of receiving beam vector information corresponding to the primary beam are preconfigured by the base station.

With reference to any one of the seventh aspect, or the first possible implementation of the seventh aspect to the sixth possible implementation of the seventh aspect, in a seventh possible implementation, the sending unit is further configured to: generate one or more uplink beams corresponding to the primary beam according to the primary beam and one or more pieces of uplink beam vector information corresponding to the primary beam, and send uplink information to the base station on the one or more uplink beams corresponding to the primary beam, where the one or more pieces of uplink beam vector information corresponding to the primary beam are preconfigured by the base station.

With reference to any one of the seventh aspect, or the first possible implementation of the seventh aspect to the seventh possible implementation of the seventh aspect, in an eighth possible implementation, the sending unit is further configured to send an uplink SRS on the one or more uplink beams corresponding to the primary beam, so that the base station determines an uplink primary beam of the UE according to a measurement result of the uplink SRS on the one or more uplink beams corresponding to the primary beam; the receiving unit is further configured to receive uplink primary beam identity information sent by the base station; and the sending unit is further configured to send an uplink signal on the uplink primary beam indicated in the uplink primary beam identity information.

With reference to any one of the seventh aspect, or the first possible implementation of the seventh aspect to the eighth possible implementation of the seventh aspect, in a ninth possible implementation, the base station and the user equipment agree in advance that adjacent beams of the primary beam are used as secondary beams of the primary beam.

With reference to any one of the seventh aspect, or the first possible implementation of the seventh aspect to the eighth possible implementation of the seventh aspect, in a tenth possible implementation, the determining unit is further configured to determine the at least one secondary beam according to the first beam report message, where the first beam report message further carries identity information of the at least one secondary beam.

With reference to the ninth possible implementation of the seventh aspect or the tenth possible implementation of the seventh aspect, in an eleventh possible implementation, the sending unit is further configured to send identity information and corresponding channel quality of the primary beam and a first secondary beam to the base station if the UE detects that signal quality of the primary beam is less than a second preset threshold and signal quality of the first secondary beam is greater than a third preset threshold, and duration of this case is greater than a third preset time period.

With reference to the ninth possible implementation of the seventh aspect or the tenth possible implementation of the seventh aspect, in a twelfth possible implementation, the sending unit is further configured to send identity information and corresponding channel quality of a first beam and the second secondary beam to the base station when the user equipment detects that signal quality of the second secondary beam is less than a fourth preset threshold and signal quality of the first beam is greater than a third preset threshold, and duration of this case is greater than a fourth preset time period.

With reference to any one of the ninth possible implementation of the seventh aspect to the twelfth possible implementation of the seventh aspect, in a thirteenth possible implementation, the sending unit is further configured to: if channel quality of a current primary beam and channel quality of all secondary beams of the UE are all less than a fourth preset threshold, and duration of this case is greater than a fifth preset time period, attempt to communicate with the base station on a beam corresponding to a preconfigured candidate beam identity, where the beam corresponding to the candidate beam identity is used when the primary beam and all the secondary beams fail.

With reference to the second possible implementation of the seventh aspect to the third possible implementation of the seventh aspect, in a fourteenth possible implementation, the determining unit is further configured to select a beam corresponding to a preconfigured candidate beam identity as a primary beam when a current primary beam of the user equipment becomes abnormal, where the beam corresponding to the candidate beam identity is used when the primary beam fails.

With reference to any one of the seventh aspect, or the first possible implementation of the seventh aspect to the fourteenth possible implementation of the seventh aspect, in a fifteenth possible implementation, the sending unit is further configured to: when the user equipment enters a high-frequency cell, send a discovery signal to the base station according to configuration information of the high-frequency cell, so that the base station sends, according to the discovery signal of the user equipment, the beam indication signal to the user equipment on the at least one beam in a direction in which the discovery signal of the user equipment is located.

With reference to any one of the seventh aspect, or the first possible implementation of the seventh aspect to the fifteenth possible implementation of the seventh aspect, in a sixteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

According to an eighth aspect, a base station is provided, and the base station includes: a sending unit, configured to send a beam indication signal to UE on at least one beam, where the beam indication signal carries identity information of the beam on which the signal is located; a receiving unit, configured to receive a first beam report message fed back by the UE, where the first beam report message carries signal quality information of the at least one beam; and a determining unit, configured to determine, according to the signal quality information of the at least one beam, a primary beam used when the base station sends a downlink signal to the UE.

With reference to the eighth aspect, in a first possible implementation, the base station further includes a detection unit, configured to detect an uplink signal of the UE on an uplink beam corresponding to the primary beam; and the determining unit is further configured to: if the detection unit detects no measurement signal of the UE on the uplink beam corresponding to the primary beam, determine that the primary beam becomes abnormal, or if the detection unit detects that quality of a measurement signal of the UE on the uplink beam corresponding to the primary beam is less than a first preset threshold, determine that the primary beam becomes abnormal.

With reference to the eighth aspect, in a second possible implementation, the receiving unit is further configured to receive, on a second SRS resource, an SRS sent by the UE; and the determining unit is further configured to: when the receiving unit receives, on the second SRS resource, the SRS sent by the UE, determine that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

With reference to the second possible implementation of the eighth aspect, in a third possible implementation, specifically, the signal quality information includes at least one piece of the following information: CSI-RS port information corresponding to the primary beam, a CSI measurement result corresponding to the primary beam, or an RRM measurement result corresponding to the primary beam.

With reference to the third possible implementation of the eighth aspect, in a fourth possible implementation, specifically, the first beam report message further carries a physical cell identifier corresponding to the primary beam.

With reference to any one of the eighth aspect, or the first possible implementation of the eighth aspect to the fourth possible implementation of the eighth aspect, in a fifth possible implementation, the receiving unit is further configured to receive second beam report information sent by the UE, where the second beam report information indicates that the primary beam works abnormally.

With reference to any one of the eighth aspect, or the first possible implementation of the eighth aspect to the fifth possible implementation of the eighth aspect, in a sixth possible implementation, specifically, an uplink time-frequency resource used by the UE to send the first beam report message is configured by the base station for the UE.

With reference to any one of the eighth aspect, or the first possible implementation of the eighth aspect to the sixth possible implementation of the eighth aspect, in a seventh possible implementation, the base station further includes a first configuration unit, configured to:

preconfigure one or more pieces of corresponding receiving beam vector information for each beam in the at least one beam of the UE; and/or preconfigure one or more pieces of corresponding uplink beam vector information for each beam in the at least one beam of the UE.

With reference to any one of the eighth aspect, or the first possible implementation of the eighth aspect to the seventh possible implementation of the eighth aspect, in an eighth possible implementation, specifically, the base station and the UE agree in advance that adjacent beams of the primary beam are used as the secondary beams.

With reference to any one of the eighth aspect, or the first possible implementation of the eighth aspect to the seventh possible implementation of the eighth aspect, in a ninth possible implementation, the determining unit is further configured to determine at least one secondary beam for the primary beam according to the signal quality information of the at least one beam.

With reference to any one of the eighth aspect, or the first possible implementation of the eighth aspect to the seventh possible implementation of the eighth aspect, in a tenth possible implementation, the detection unit is further configured to obtain signal quality of an uplink SRS sent by the UE on an uplink beam corresponding to a beam in the at least one beam other than the primary beam; and the determining unit is further configured to select, from the at least one beam, at least one beam with relatively good uplink SRS signal quality as the secondary beam for the primary beam.

With reference to any one of the eighth aspect, or the first possible implementation of the eighth aspect to the tenth possible implementation of the eighth aspect, in an eleventh possible implementation, the sending unit is further configured to send identity information of at least one beam to the UE in a low-frequency cell, so that the UE finds a beam corresponding to an identifier of the at least one beam in a high-frequency cell, and receives downlink information on the beam corresponding to the identifier of the at least one beam; and the sending unit is further configured to send the downlink information on one or more beams in the at least one beam.

With reference to any one of the eighth possible implementation of the eighth aspect to the eleventh possible implementation of the eighth aspect, in a twelfth possible implementation, the base station further includes a second configuration unit, configured to preconfigure at least one candidate beam identity corresponding to each primary beam, where when the primary beam and all the secondary beams fail, the base station performs downlink communication with the UE by using a beam indicated by the at least one candidate beam identity corresponding to the primary beam.

With reference to any one of the eighth aspect, or the first possible implementation of the eighth aspect to the twelfth possible implementation of the eighth aspect, in a thirteenth possible implementation, before the sending unit sends the beam indication signal to the UE on the at least one beam, the receiving unit is further configured to receive a discovery signal sent when the UE enters a high-frequency cell; and the determining unit is further configured to determine a location and a direction of the UE according to the discovery signal of the UE, and determine the at least one beam according to the location and the direction of the UE, where the at least one beam is located in the location and the direction of the UE.

With reference to any one of the eighth aspect, or the first possible implementation of the eighth aspect to the thirteenth possible implementation of the eighth aspect, in a fourteenth possible implementation, specifically, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

In one aspect, according to the information transmission method, the base station, and the user equipment in the embodiments of the present application, UE obtains signal quality of at least one beam by using identity information carried in a beam indication signal on at least one beam that is sent by a base station, and determines, according to the signal quality of the at least one beam, a primary beam used when the base station sends a downlink signal to the UE. This helps improve communication quality in downlink communication performed by the base station.

In another aspect, according to the information transmission method, the base station, and the user equipment in the embodiments of the present application, a base station sends a beam indication signal carrying identity information on at least one beam, and determines, according to signal quality of the at least one beam that is fed back by UE, a primary beam used when the base station sends a downlink signal to the UE. This helps improve communication quality in downlink communication performed by the base station.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The technical solutions of the present application may be applied to various communications systems, such as: a Global System for Mobile Communications (GSM), a Code Division Multiple Access (CDMA) system, a Wideband Code Division Multiple Access (WCDMA), a general packet radio service (GPRS), and a Long Term Evolution (LTE).

User equipment (UE), also referred to as a mobile terminal, a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base station (BTS, Base Transceiver Station) in GSM or CDMA, or may be a NobeB in WCDMA, or may be an evolved NodeB (eNB or e-NodeB, evolutional Node B) in LTE, which is not limited in the present application. However, for ease of description, the following embodiments are described by using an eNB as an example.

In LTE-A carrier aggregation (CA), larger bandwidth can be obtained by aggregating multiple contiguous or non-contiguous component carriers (CC), so as to improve a peak data rate and a system throughput. CCs aggregated by UE are also referred to as serving cells, including one primary cell (PCell) and zero to four secondary cells (SCell). The primary cell is responsible for security of a non-access stratum (NAS), and the secondary cell mainly provides additional radio resources for data communication. CA supports switching of a PCell and adding, deleting, activation, deactivation, and other operations of a SCell.

Beamforming: data is first weighted and then sent at a transmit end, a narrow transmit beam is formed, and energy is directed at a target user, so as to improve a demodulation signal-to-noise ratio of the target user, and effectively improve a throughput rate of a cell-edge user. By means of beamforming, beneficial effects such as an array gain, a diversity gain, and a multiplexing gain can be obtained. Likewise, beamforming may also be applied to receiving of a beamforming signal. Energy is directed at a transmit beam at a receive end by means of pre-weighting, so that a higher gain can be obtained.

Figure 1:
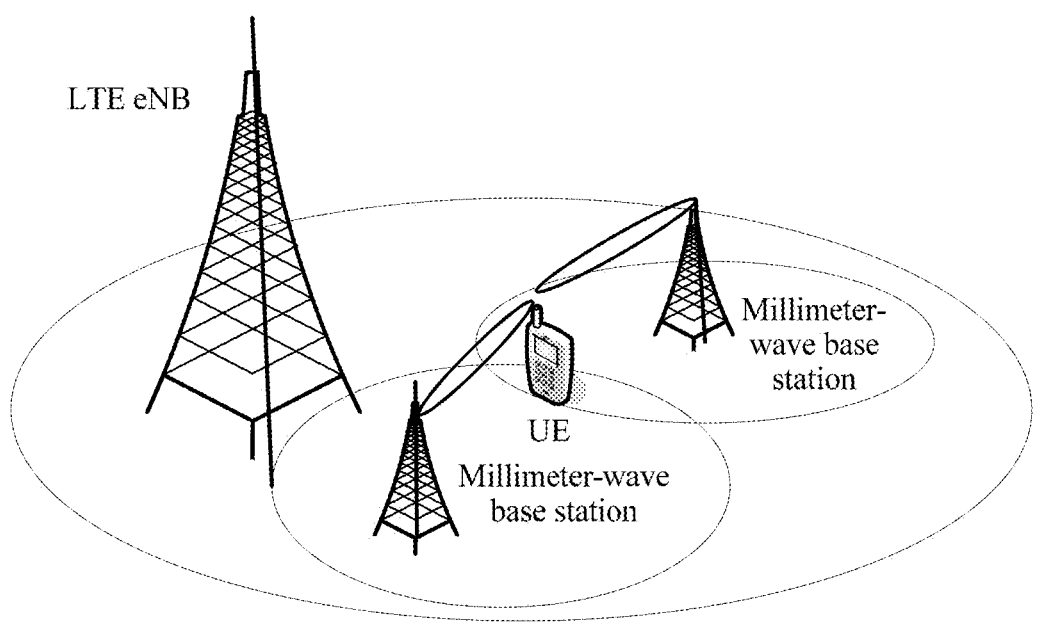
FIG. 1 is a schematic diagram of an application scenario of an embodiment of the present application.

FIG. 1 is a schematic diagram of an application scenario of an embodiment of the present application. In FIG. 1, LTE-A carrier aggregation is used as a background. A relatively low frequency band carrier and a millimeter wave carrier in LTE-A are aggregated to provide higher bandwidth and a larger capacity for a user. The relatively low frequency band carrier is used as a primary cell (PCell), and the millimeter wave frequency band is used as a secondary cell (SCell). The PCell and the SCell may be co-located (Co-Located) or non co-located (Non Co-Located). The SCell is located in a coverage area of the PCell, or coverage areas of the SCell and the PCell overlap. When the PCell and the SCell are non co-located, an LTE-A base station that provides a PCell and one or more millimeter-wave small cells or remote radio heads (RRH) that provide one or more SCells perform backhaul communication by using an optical fiber or by means of wireless connection. A microwave or millimeter-wave band may be used for wireless backhaul, and the band for wireless backhaul and a band in which a SCell is located may be the same or different. The PCell provides wide coverage and mobile management, and the SCell mainly provides hotpot coverage to improve a data communication throughput. The beamforming technology in the embodiments of the present application includes a horizontal beam and a vertical beam.

In addition, the method in this embodiment of the present application may be applicable to a scenario in which a millimeter-wave small cell provides a PCell service.

Figure 2:
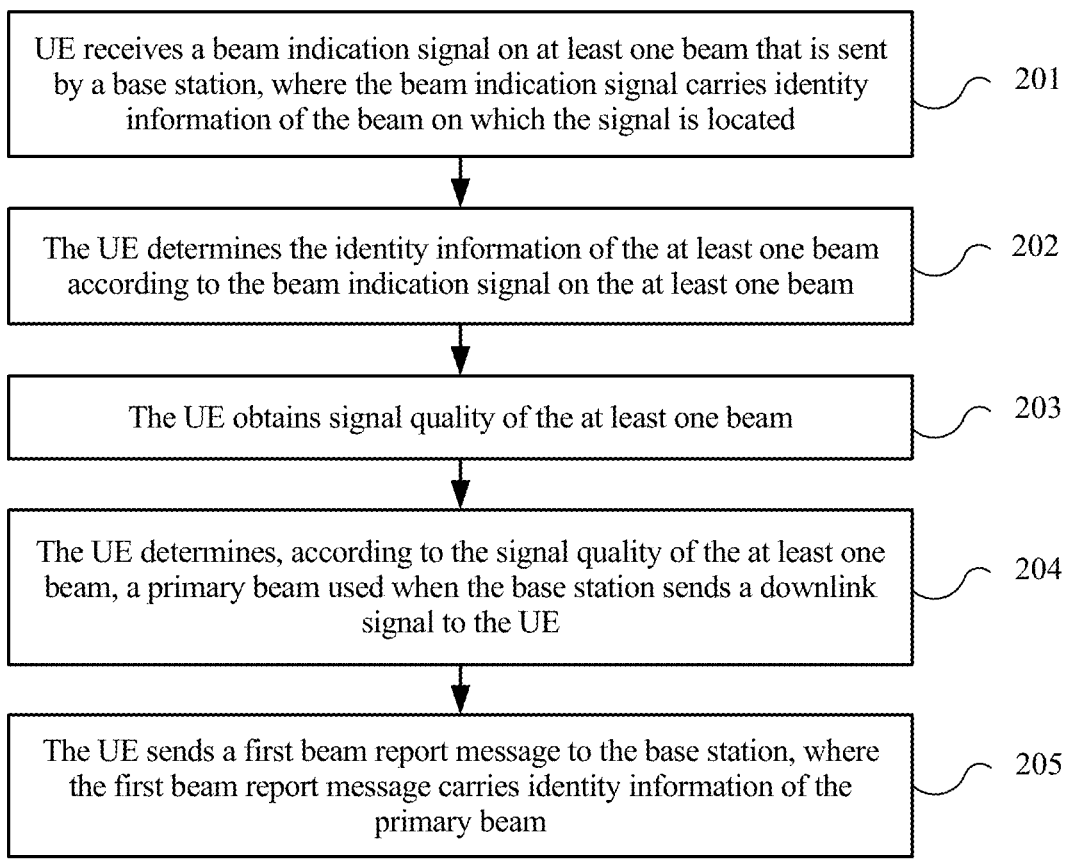
FIG. 2 is a flowchart of an information transmission method according to an embodiment of the present application.

FIG. 2 is a flowchart of an information transmission method according to an embodiment of the present application. The method in FIG. 2 is executed by UE.

201. The UE receives a beam indication signal on at least one beam that is sent by a base station, where the beam indication signal carries identity information of the beam on which the signal is located.

It should be understood that in this embodiment of the present application, the base station is a millimeter wave (mmWave) small cell, or a base station in which a cell with a relatively high frequency greater than 3 GHz is located.

It should be understood that the base station may send the beam indication signal by using multiple types of signals. The base station periodically sends a common signal by using a beam, and adds beam identity (beam ID) information to the beam. A beam ID is used to uniquely identify one beam, and each beam ID is corresponding to one piece of precoding codebook information or one group of antenna weight or vector information.

Correspondingly, the UE periodically receives the beam that carries the beam indication signal, and obtains the identity information carried in the beam.

202. The UE determines the identity information of the at least one beam according to the beam indication signal on the at least one beam.

For example, the base station may scramble the identity information of the beam by using a primary synchronization channel or a secondary synchronization channel that is sent in a beam manner, or broadcast the beam identity information of the beam by using a broadcast channel sent in a beam manner, or indicate the identity information of the beam by using a dedicated common channel sent in a beam manner. The beam indication signal may be a cell discovery signal, or is referred to as a discovery reference signal (DRS). For example, the beam indication signal is one or more of the following signals: a primary synchronization signal PSS, a secondary synchronization signal SSS, broadcast channel BCH information, or system information broadcast (SIB).

The UE obtains the identity information of the beam by parsing the foregoing signal.

203. The UE obtains signal quality of the at least one beam.

The UE obtains the signal quality of the at least one beam by measuring the signal on the at least one beam.

204. The UE determines, according to the signal quality of the at least one beam, a primary beam used when the base station sends a downlink signal to the UE.

It should be understood that the primary beam mentioned in this embodiment of the present application refers to a downlink primary beam unless otherwise specified; similarly, the secondary beam mentioned in this embodiment of the present application refers to a downlink secondary beam unless otherwise specified.

The primary beam used when the base station sends a downlink signal to the UE refers to a primary beam used when the base station subsequently sends a downlink signal to the UE. As mentioned above, a beam ID is used to uniquely identify one beam, and each beam ID is corresponding to one piece of precoding codebook information or one group of antenna weight or vector information. Therefore, in this embodiment of the present application, the primary beam indicates a beam resource or a communication path that is indicated by a piece of precoding codebook information or a group of antenna weight or vector information corresponding to a beam ID of the primary beam. A meaning of the secondary beam is similar to this.

In addition, in this embodiment of the present application, the base station may send a downlink signal to the UE by using a primary beam and zero to multiple secondary beams. Generally, a primary beam is a beam with best downlink signal quality in beams measured by the UE, and the base station communicates with the UE by preferentially using the primary beam. When the primary beam works normally, the UE may receive common signaling from the base station by using the primary beam all the time. Optionally, the base station may select zero to multiple secondary beams to communicate with the UE. The secondary beam may be usually used to assist in data signal transmission. In addition, the secondary beam may be further used to carry a common signal when the primary beam works abnormally, so that a UE side can receive, by using the primary beam, the common signal sent by the base station, and reliability of downlink communication is enhanced.

It should be understood that in this embodiment of the present application, beams sent by the base station in a same beam direction all refer to a same beam resource, and may be represented by using a beam vector weight. That the base station sends a downlink signal to the UE on a primary beam means that the base station sends a beam in a beam direction corresponding to the primary beam, where the sent beam carries the downlink signal to be sent to the UE.

205. The UE sends a first beam report message to the base station, where the first beam report message carries identity information of the primary beam.

The base station may send the beam indication signal by using one loop or two loops. For a manner of one loop, in one period, the base station successively sends beam information in different beam directions, so that beams can cover an entire sector; and UE that receives a beam feeds back identity information of the beam to the base station. In a next period, the base station and the UE separately perform the foregoing process again.

Figure 3:
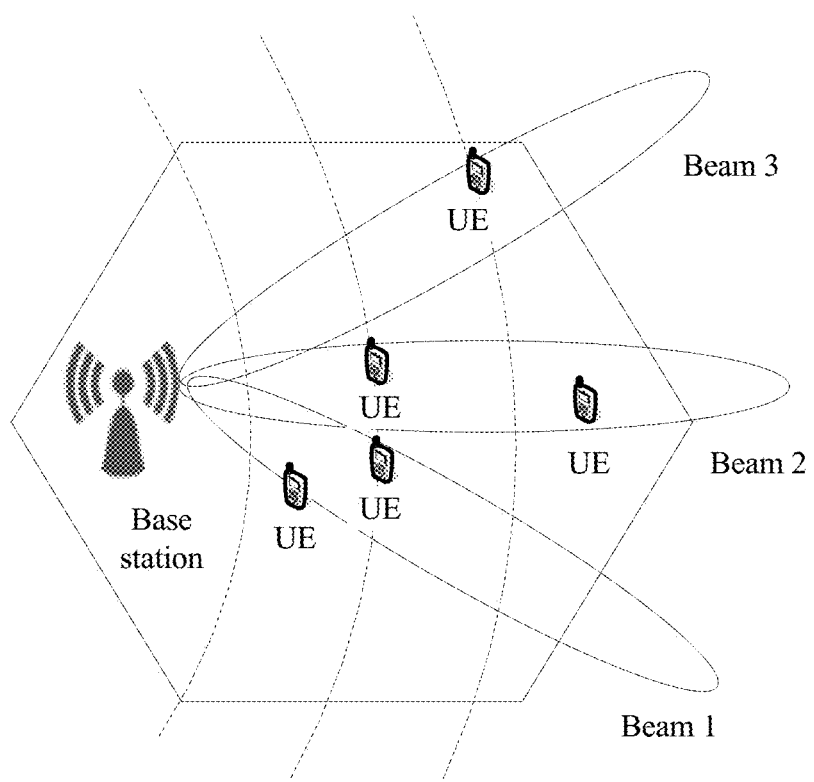
FIG. 3 is a schematic diagram of a scenario in which a base station sends a beam in a directed manner according to an embodiment of the present application.

For a manner of two loops, in a loop 1 (outer loop), the base station sends beams in the manner of one loop, and UE that receives a beam feeds back identity information of the beam to the base station. In a loop 2 (inner loop), the base station sends a beam to only a beam location in which UE exists, and does not send a beam to a direction in which no UE exists, so as to achieve objectives of reducing interference to a neighboring cell and saving energy. This is specifically shown in FIG. 3. It should be understood that different periods may be used for the loop 1 and the loop 2, for example, a longer period is used for the loop 1, and a shorter period is used for the loop 2, and a period for the loop 2 falls between periods of two adjacent loops 1.

In this embodiment of the present application, UE obtains signal quality of at least one beam by using identity information carried in a beam indication signal on the at least one beam that is sent by a base station, and determines, according to the signal quality of the at least one beam, a primary beam used when the base station sends a downlink signal to the UE. This helps improve communication quality in downlink communication performed by the base station.

Optionally, the first beam report message further carries at least one piece of the following information: a physical cell identifier (PCI) corresponding to the primary beam, CSI-RS port information corresponding to the primary beam, a CSI measurement result corresponding to the primary beam, or an RRM measurement result corresponding to the primary beam. When reporting the first beam message, the UE may further add a PCI and a measurement result of the primary beam to the first beam message.

Optionally, in an embodiment, the method further includes: determining, by the UE, that the primary beam becomes abnormal if signal quality detected by the UE on the primary beam within a first preset time period is less than a first preset threshold.

It should be understood that the first preset time period and the first preset threshold may be agreed upon by the base station and the UE in advance, or configured by the base station for the UE, or stipulated in a protocol. Signal quality of a beam may be a detected signal to interference plus noise ratio (SINR), received signal strength indicator (RSSI), reference signal received power (RSRP), reference signal received quality (RSRQ), or the like of the beam.

It should be understood that the signal quality detected on the primary beam within the first preset time period may be average signal quality detected on the primary beam within the first preset time period.

Optionally, in another embodiment, the method further includes: determining, by the UE, that the primary beam becomes abnormal if the UE detects no downlink signal on the primary beam within a second preset time period.

Optionally, in an embodiment, when the UE determines that the primary beam becomes abnormal, the method further includes: sending, by the UE, a second beam report message to the base station, where the beam report message is used to indicate that the primary beam becomes abnormal. The UE may send the second beam report to the base station in a low-frequency cell, or send the second beam report on a secondary beam in a high-frequency cell, so as to report, to the base station, that the primary beam of the UE becomes abnormal. It should be understood that in this embodiment of the present application, the UE may communicate with the base station by using a low-frequency cell or a high-frequency cell. The low-frequency cell mentioned in this embodiment of the present application refers to a low-frequency cell accessed by the UE, and the high-frequency cell in this embodiment of the present application refers to a high-frequency cell accessed by the UE. In addition, a low-frequency cell (or high-frequency cell) that is subsequently mentioned in the present application and that is used for communication between the UE and the base station refers to a low-frequency cell (or high-frequency cell) accessed by the UE.

Optionally, in another embodiment, when the UE determines that the primary beam becomes abnormal, the method further includes: sending, by the UE, an SRS to the base station on a second sounding reference signal (SRS) resource, where the base station configures a first SRS resource and the second SRS resource for the UE, and instructs the UE to send an SRS on the first SRS resource when the primary beam works normally and send an SRS on the second SRS resource when the primary beam works abnormally. The UE may send an SRS to the base station on a second SRS resource in a high-frequency cell, so as to report, to the base station, that the primary beam of the UE becomes abnormal. Certainly, the base station and the UE may also agree to use another dedicated signal and a resource required for the dedicated signal to report whether the beam becomes abnormal.

In the foregoing embodiment in which the primary beam becomes abnormal, the UE determines that the beam becomes abnormal and notifies the base station, so that the base station can perform corresponding processing. For example, the base station may start to use a secondary beam with best signal quality in secondary beams to send a downlink signal.

Further, in the embodiment in which the primary beam becomes abnormal, the method further includes: receiving, by the UE in a low-frequency cell, beam receiving instruction information sent by the base station, where the beam receiving instruction information is used to instruct the UE to receive a downlink signal on at least one beam in a high-frequency cell; receiving, by the UE, the downlink signal on the at least one beam; obtaining, by the UE, signal quality of the at least one beam in the high-frequency cell; and using, by the UE, a beam with best signal quality as a new primary beam, and feeding back the new primary beam to the base station. In this embodiment of the present application, the UE receives and measures the signal on the at least one beam in the high-frequency cell according to the beam receiving instruction information received in the low-frequency cell of the base station, and feeds back the new primary beam to the base station, so that the base station can perform downlink communication with the UE on the new primary beam, thereby enhancing reliability of downlink communication between the base station and the UE.

Optionally, an uplink time-frequency resource used by the UE to send the first beam report message is configured by the base station for the UE, or is agreed upon by the base station and the UE in advance, or is stipulated in a protocol.

Optionally, the method further includes: generating, by the UE, one or more receiving beams corresponding to the primary beam according to the primary beam and one or more pieces of receiving beam vector information corresponding to the primary beam, and receiving downlink information of the base station on the one or more receiving beams corresponding to the primary beam, where the one or more pieces of receiving beam vector information corresponding to the primary beam are preconfigured by the base station. In this embodiment of the present application, a receive end generates a receiving beam of the primary beam, and directs energy at the transmit primary beam, so that a higher receiving gain for the primary beam can be obtained.

Optionally, the method further includes: generating, by the UE, one or more uplink beams corresponding to the primary beam according to the primary beam and one or more pieces of uplink beam vector information corresponding to the primary beam, and sending uplink information to the base station on the one or more uplink beams corresponding to the primary beam, where the one or more pieces of uplink beam vector information corresponding to the primary beam are preconfigured by the base station.

Further, the method further includes: sending, by the UE, an uplink SRS on the one or more uplink beams corresponding to the primary beam, so that the base station determines an uplink primary beam of the UE according to a measurement result of the uplink SRS on the one or more uplink beams corresponding to the primary beam; receiving, by the UE, uplink primary beam identity information sent by the base station; and sending, by the UE, an uplink signal on the uplink primary beam indicated in the uplink primary beam identity information. In this embodiment of the present application, the UE determines an uplink SRS sending beam according to downlink beam information, so that the base station performs uplink channel estimation to determine a preferred uplink primary beam, and the UE selects the preferred uplink primary beam to send an uplink signal, so as to improve an uplink sending gain of the UE.

Optionally, in an embodiment, the base station and the UE agree in advance that adjacent beams of the primary beam are used as secondary beams of the primary beam.

Optionally, in another embodiment, the method further includes: determining, by the UE, the at least one secondary beam according to the signal quality of the at least one beam, where a maximum quantity of secondary beams is configured by the base station for the UE, or is agreed upon by the base station and the UE in advance.

It should be understood that in this embodiment of the present application, the base station and the UE may communicate only on a primary beam, or may perform multi-beam communication by using a primary beam and a secondary beam.

Optionally, the first beam report message further carries at least one piece of the following information: a physical cell identifier (PCI) corresponding to the at least one secondary beam, CSI-RS port information corresponding to the at least one secondary beam, a CSI measurement result of the at least one secondary beam, or an RRM measurement result of the at least one secondary beam. When reporting the first beam message, the UE may further add a PCI corresponding to the at least one secondary beam and a measurement result of the at least one secondary beam to the first beam message. When the first beam report message reported by the UE carries the PCIs and the measurement results of the primary beam and the secondary beam, the base station side may determine subsequent processing operations such as updating and switching of the primary beam and/or the secondary beam according to the first beam report message.

Optionally, the method further includes: generating, by the UE, one or more receiving beams corresponding to a first secondary beam according to the first secondary beam and one or more pieces of receiving beam vector information corresponding to the first secondary beam, and receiving, on the one or more receiving beams corresponding to the first secondary beam, downlink information of the base station on the first secondary beam, where the first secondary beam is a secondary beam of the primary beam, and the one or more pieces of receiving beam vector information corresponding to the first secondary beam are preconfigured by the base station. In this embodiment of the present application, a receive end generates a receiving beam of a secondary beam, and directs energy at the sending secondary beam, so that a higher receiving gain for the secondary beam can be obtained.

Optionally, in an embodiment, the method further includes: using, by the UE, the primary beam as a secondary beam and using the first secondary beam as a new primary beam if the UE detects that signal quality of the primary beam is less than a second preset threshold and signal quality of the first secondary beam is greater than a third preset threshold, and duration of this case is greater than a third preset time period, and reporting identity information of the new primary beam and the secondary beam to the base station. In this embodiment of the present application, a secondary beam is adjusted according to channel quality of a beam, so that channel quality of a primary beam used in communication between the base station and the UE can be kept at a relatively high channel quality level, and communication quality in communication between the base station and the UE can be ensured.

Optionally, in another embodiment, the method further includes: replacing, by the UE, the second secondary beam with a first beam if the UE detects that signal quality of the second secondary beam is less than a fourth preset threshold and signal quality of the first beam is greater than a third preset threshold, and duration of this case is greater than a fourth preset time period, and sending identity information of the first beam and the second secondary beam to the base station, where the first beam is another beam other than the primary beam and the secondary beam in beams of the UE. In this embodiment of the present application, a secondary beam is maintained according to channel quality of a beam, so that channel quality of a secondary beam used in communication between the base station and the UE can be ensured, and this helps improve reliability of communication between the base station and the UE.

Optionally, the method further includes: if channel quality of a current primary beam and channel quality of all secondary beams of the UE are all less than a fourth preset threshold, and duration of this case is greater than a fifth preset time period, attempting, by the UE, to communicate with the base station on a beam corresponding to a preconfigured candidate beam identity, where the beam corresponding to the candidate beam identity is used when the primary beam and all the secondary beams fail. In this embodiment of the present application, when the current primary beam and all the secondary beams become abnormal, a preconfigured candidate beam is selected as a beam used in communication between the base station and the UE, so that communication can be rapidly restored when all the beams fail.

Optionally, the method further includes: selecting, by the UE, a beam corresponding to a preconfigured candidate beam identity as a primary beam if a current primary beam of the UE becomes abnormal, where the beam corresponding to the candidate beam identity is used when the primary beam fails. In this embodiment of the present application, a preconfigured beam is selected as a primary beam when the current primary beam becomes abnormal, so that downlink communication between the base station and the UE can be rapidly restored.

Optionally, before the UE receives a beam indication signal on at least one beam that is sent by a base station, the method further includes: when the UE enters a high-frequency cell, sending, by the UE, a discovery signal to the base station according to configuration information of the high-frequency cell, so that the base station sends, according to the discovery signal of the UE, the beam indication signal to the UE on the at least one beam in a direction in which the discovery signal of the UE is located. In this embodiment of the present application, a procedure in which the base station sends the beam indication signal to the UE is triggered by sending, by the UE, the discovery signal to the base station. This helps save energy of the base station and reduce interference.

The following further describes the method in the embodiments of the present application with reference to specific embodiments.

Figure 4:
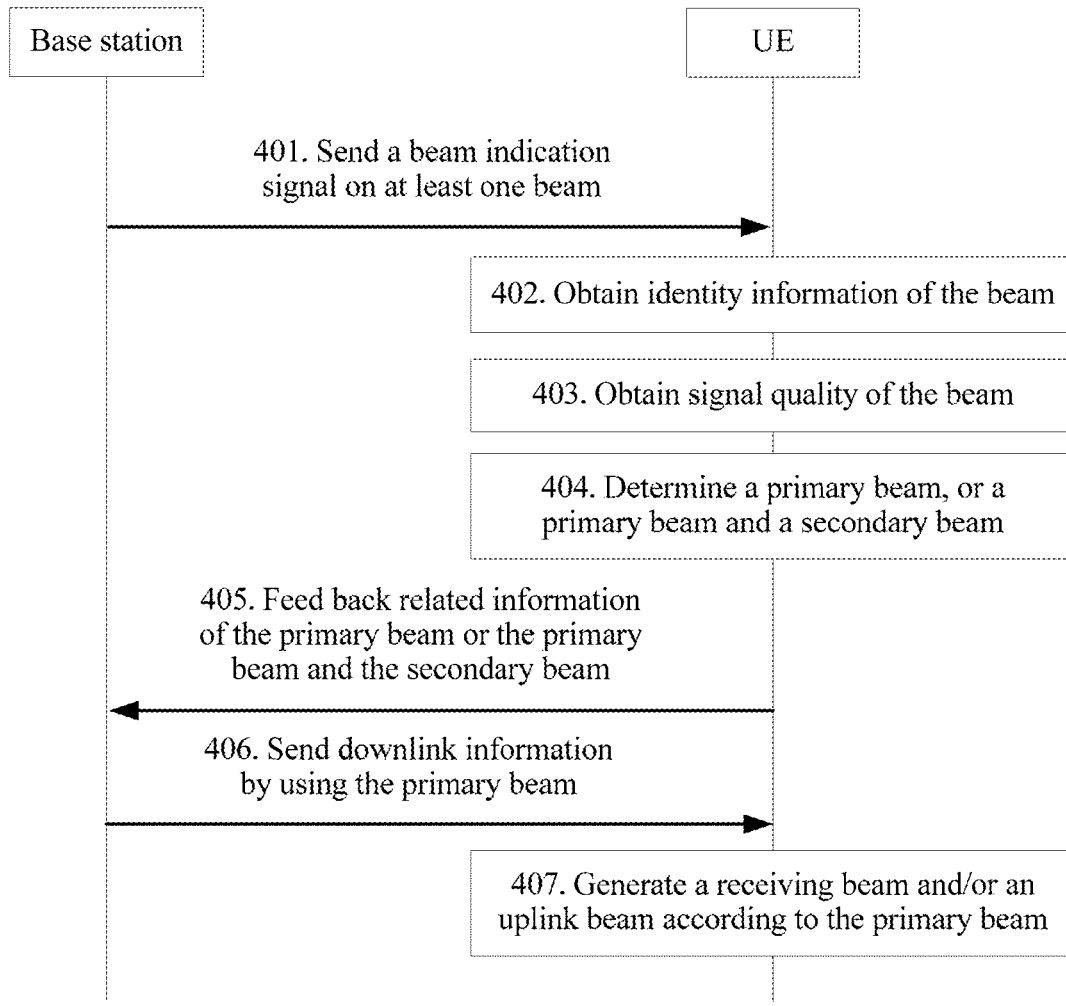
FIG. 4 is a flowchart of an interaction method for information transmission according to an embodiment of the present application.

FIG. 4 is a flowchart of an interaction method for information transmission according to an embodiment of the present application. In an implementation shown in FIG. 4, a base station is a millimeter-wave small cell in LTE carrier aggregation.

401. The base station sends a beam indication signal to UE on at least one beam.

The base station periodically sends a beam indication signal on at least one beam in a beam manner, and adds beam identity (beam ID) information to the beam. A beam ID is used to uniquely identify one beam, and each beam ID is corresponding to one piece of precoding codebook information or one group of antenna weight or vector information.

The base station may scramble the beam ID of the beam by using a primary synchronization channel or a secondary synchronization channel that is sent in a beam manner, or broadcast the beam ID of the beam by using a broadcast channel sent in a beam manner, or transmit the beam ID of the beam by using a dedicated common channel sent in a beam manner.

Specifically, the beam indication signal may be a cell discovery signal or a discovery reference signal (DRS). For example, the beam indication signal may be a dedicated cell discovery signal or one or more of the following signals: a primary synchronization signal (PSS), a secondary synchronization signal (SSS), a channel state information-reference signal (CSI-RS), a cell reference signal (CRS), a physical broadcast channel (PBCH), system information broadcast (SIB), or a signal specific for indicating a beam identity.

It should be understood that the base station and the UE may agree on period configuration information of a PSS, an SSS, a PBCH, a system information block 1 (SIB 1), a SIB 2, and the like of a SCell in advance; or the base station may notify the UE of period configuration information of a PSS, an SSS, a PBCH, a SIB 1, a SIB 2, and the like of a SCell by using system information of a PCell; or the base station may send period configuration information of a PSS, an SSS, a PBCH, a SIB 1, a SIB 2, and the like of a SCell to the UE by using dedicated signaling of a PCell; or the base station may notify the UE of period configuration information of a PSS, an SSS, a PBCH, a SIB 1, a SIB 2, and the like of a SCell by using system information of the SCell.

Among the foregoing manners, when the base station notifies the UE of the period configuration information of the PSS, the SSS, the PBCH, the SIB 1, the SIB 2, and the like of the SCell by using the system information or dedicated signaling of the PCell, the UE does not need to synchronize with the SCell in advance; when the base station notifies the UE of the period configuration information of the PSS, the SSS, the PBCH, the SIB 1, the SIB 2, and the like of the SCell by using the system information of the SCell, the UE needs to synchronize with the SCell first, and reads the system information of the SCell after synchronizing with the SCell, so as to obtain the period configuration information.

The foregoing PSS, SSS, PBCH, system information block 1 (SIB 1), and SIB 2 are sent in a beam manner. Period information of the PSS, the SSS, the PBCH, the SIB 1, or the SIB 2 is associated with a corresponding beam. For example, for different beam IDs, there is a same period but different time offsets. Specifically, for example, a millimeter-wave small cell sends a PSS/SSS in a subframe 0 in a beam ID 0 direction, and sends a PSS/SSS in a subframe 1 in a beam ID 1 direction, and periods of them are both 10 ms; for another example, a millimeter-wave small cell sends a PSS/SSS on an orthogonal frequency division multiplexing (OFDM) symbol 0 of a subframe 0 in a beam ID 0 direction, and sends a PSS/SSS on an OFDM symbol 2 of the subframe 0 in a beam ID 1 direction. A period and a time offset of a synchronization signal may be the same as or different from periods and time offsets of different system messages. When a period and a time offset are the same, signals in a same subframe (or symbol) may be overlaid, that is, the synchronization signal and the different system messages may be sent in a same subframe (or symbol).

402. The UE obtains identity information of the beam.

As shown in step 401, the base station and the UE may agree on the period configuration information of the PSS, the SSS, the PBCH, the system information block 1 (SIB 1), the SIB 2, and the like of the SCell in advance; or the UE may obtain the period configuration information of the PSS, the SSS, the PBCH, the SIB 1, the SIB 2, and the like of the SCell from the system information of the PCell; or the UE may obtain the period configuration information of the PSS, the SSS, the PBCH, the SIB 1, the SIB 2, and the like of the SCell according to the dedicated signaling sent from the PCell; or the UE may obtain the period configuration information of the PSS, the SSS, the PBCH, the SIB 1, the SIB 2, and the like of the SCell according to the system information of the SCell.

The UE performs blind detection according to the foregoing period information to obtain at least one piece of beam ID information. For example, the UE traverses PSS/SSS/PBCH periods and time offsets corresponding to all beam IDs and detects a synchronization channel or a PBCH, so as to obtain beam ID information. Specifically, the UE may synchronize with the SCell by detecting the PSS and the SSS of the SCell. If the base station scrambles the beam ID information by using a synchronization channel, after detecting the synchronization channel, the UE can obtain the beam ID information; if the base station uses a PBCH of the SCell to carry the beam ID information, the UE synchronizes with the SCell and then reads PBCH information of the SCell, so as to obtain the beam ID information.

It should be understood that the UE may receive beams from different directions and/or different millimeter-wave small cells, and obtain multiple pieces of beam ID information.

403. The UE obtains signal quality of the beam.

The UE measures the at least one beam indicated by the at least one beam identity carried in the beam indication signal, and obtains the signal quality of the at least one beam.

Specifically, the signal quality of the beam may be a detected signal to interference plus noise ratio (SINR), received signal strength indicator (RSSI), reference signal received power (RSRP), or reference signal received quality (RSRQ) of the beam.

The UE measures the foregoing signal quality parameter of the beam to obtain a measurement result of the beam. Specifically, the measurement result of the beam may be channel state information-reference signal (CSI-RS) port (port) information, a channel state information (CSI) measurement result, a CSI-RS-based radio resource management (RRM) measurement result, or the like.

404. The UE determines a primary beam, or a primary beam and a secondary beam.

The base station may configure a maximum quantity of maintained secondary beam identities (secondary beam ID) for the UE. Specifically, the base station may configure the maximum quantity of maintained secondary beam IDs for the UE by using a PSS, an SSS, a PBCH, a SIB 1, a SIB 2, or the like, and the maximum quantity is denoted as N.

The UE may determine the primary beam and the secondary beam according to signal quality of each beam.

The UE may use an average value of signal quality of a beam that is measured within a preset time period as signal quality of the beam.

Specifically, the UE may determine a beam having best signal quality within a preset time period t1 as the primary beam.

In a specific manner, when a secondary beam is being determined, if signal quality of a beam of the UE is greater than a preset threshold Y1 and duration of this case is greater than t2, the beam is allowed to be used as a secondary beam of the UE; in addition, the UE can select a maximum of N beams as secondary beams. That is, a minimum quantity of secondary beams selected by the UE is 0, and a maximum quantity of secondary beams selected by the UE is N. Preferably, the UE may select, as secondary beams according to signal quality, beams whose quantity is not greater than N from beams that are allowed to be used as secondary beams.

In another specific manner, it may not be considered whether signal quality of a beam of the UE is greater than a preset threshold Y1 and N (or less than N) beams with best signal quality are directly selected as secondary beams.

For example, the UE may perform sorting according to values of detected parameters such as SINRs or RSSIs, and then determine the primary beam and the secondary beam.

In addition, values of t1, t2, and Y1 may be agreed upon by the base station and the UE in advance, or configured by the base station for the UE, or set by the UE, or stipulated in a protocol.

405. The UE feeds back related information of the primary beam or the primary beam and the secondary beam to the base station.

After determining the primary beam or the primary beam and the secondary beam used for the base station to send a downlink signal, the UE may report the related information of the beam to the base station by using a beam report message. The beam report message is denoted as a first beam report message.

Specifically, if the UE determines only the primary beam in step 404, the first beam report message may carry primary beam ID information but does not include secondary beam ID information; if the UE determines the primary beam and n secondary beams in step 404, the first beam report message may carry information about one primary beam ID and n secondary beam IDs.

Optionally, the UE may further report physical cell identifier (PCI) information corresponding to the primary beam and/or the secondary beam to the base station. For example, when the UE determines only the primary beam, the first beam report message may further carry PCI information corresponding to the primary beam; when the UE determines the primary beam and n secondary beams, the first beam report message may further carry PCI information corresponding to the primary beam and PCI information corresponding to the n secondary beams. For a manner in which the UE obtains PCI information, refer to the prior art. For example, in LTE, the UE may obtain the PCI information according to a PSS and an SSS on a corresponding beam by combining the PSS and the SSS.

Optionally, the UE may further report CSI-RS port information, a CSI measurement result, or a CSI-RS-based RRM measurement result corresponding to the primary beam and/or the secondary beam to the base station. For example, when the UE determines only the primary beam, the first beam report message may further carry CSI-RS port information, a CSI measurement result, or a CSI-RS-based RRM measurement result corresponding to the primary beam; when the UE determines the primary beam and n secondary beams, the first beam report message may further carry CSI-RS port information, a CSI measurement result, or a CSI-RS-based RRM measurement result corresponding to the primary beam, and CSI-RS port information, CSI measurement results, or CSI-RS-based RRM measurement results corresponding to the n secondary beams. After obtaining a beam ID, on a beam corresponding to the beam ID, the UE performs CSI measurement according to CSI-RS configuration information or performs RRM measurement based on a CSI-RS. The CSI-RS configuration information includes information about a CSI-RS port, CSI-RS resource configuration, and the like. The CSI-RS port may belong to different millimeter-wave small cells.

In addition, it should be understood that when feeding back the foregoing information, the UE may divide the information into multiple messages for feedback. This is not limited in this embodiment of the present application. In this embodiment of the present application, that the foregoing information is in the first beam report message is used as an example for description.

The UE may feed back the first beam report message in multiple manners.

For example, the UE may periodically feed back the first beam report message. Specifically, the UE may perform periodic detection and measurement according to a detection and measurement period of the at least one beam, and feed back a measurement result.

For another example, the UE may trigger feedback according to a preconfigured measurement result threshold. When signal quality of a beam that is detected by the UE reaches a preset threshold, the UE may send the first beam report message to the base station, and the first beam report message carries a beam ID of the beam. Specifically, the signal quality of the beam may be an SINR or an RSSI of the beam.

For another example, the UE may perform detection and measurement on the at least one beam according to a request sent by the base station, and feed back a detection and measurement result to the base station by using the first beam report message.

For radio resource control (RRC) idle (IDLE) UE, an uplink common channel such as a physical random access channel (PRACH) may be used for feedback.

For RRC connected (CONNECTED) UE, a media access control (MAC) control element (CE), a physical uplink control channel (PUCCH), or RRC signaling may be used for feedback.

When reporting the first beam report message, the UE may use an uplink dedicated time-frequency resource preconfigured by the base station for the UE. The time-frequency resource may be located in a millimeter-wave cell or a low-frequency cell aggregated by the UE. Specially, the uplink dedicated time-frequency resource is specially used to report an identity of the primary beam, and when the base station or the UE or both indicate that a beam (the primary beam or the secondary beam) becomes abnormal, or after the base station or the UE or both detect that a beam fails, the reserved uplink dedicated time-frequency resource may be activated or enabled.

406. The base station sends downlink information to the UE by using the primary beam.

After receiving the first beam report message from the UE, the base station determines the primary beam according to the primary beam ID in the first beam report message, and transmits the downlink information on the primary beam.

Certainly, if the first beam report message further carries secondary beam ID information, the base station may further determine the secondary beam.

407. The UE generates a receiving beam and/or an uplink beam according to the primary beam.

The UE generates the corresponding receiving beam (Rx Beam) according to the primary beam, and then receives the downlink information on the Rx Beam. A receive end of the UE directs energy at the transmit primary beam by means of pre-weighting, so that a higher receiving gain can be obtained.

Optionally, the base station (a primary base station or a millimeter-wave small cell) may preconfigure one or more pieces of receiving beam vector information corresponding to each beam ID for the UE, and the UE generates one or more receiving beams corresponding to the primary beam according to one or more pieces of receiving beam vector information corresponding to the primary beam ID of the current primary beam, and receives the downlink information on the one or more receiving beams corresponding to the primary beam.

Alternatively, optionally, the UE may find, by means of beam training in the prior art, a receiving beam that matches the primary beam most, and receive the downlink information on the receiving beam. For a specific implementation of finding, by means of beam training, the receiving beam that matches the current primary beam most, refer to related description in the prior art. This is not limited in this embodiment of the present application.

In addition, when the UE is in a connected state, an uplink beam sending sounding reference signal (SRS) corresponding to the primary beam may be used.

Optionally, the base station may preconfigure one or more pieces of uplink beam vector information corresponding to each beam ID for the UE, and the UE generates one or more uplink beams corresponding to the primary beam according to uplink beam vector information corresponding to the primary beam ID of the current primary beam, and sends uplink information on the one or more uplink beams corresponding to the primary beam.

Alternatively, optionally, the UE may find, by means of beam training in the prior art, an uplink beam that matches the current primary beam most, and send uplink information on the uplink beam. Similarly, for a specific implementation of finding, by means of beam training, the uplink beam that matches the current primary beam most, refer to related description in the prior art. This is not limited in this embodiment of the present application.

In this embodiment of the present application, UE reports a primary beam and at least one secondary beam, so that when a fault occurs in primary beam communication, a candidate beam (secondary beam) may be used to restore communication, thereby improving communication reliability of sending a downlink signal by a base station by means of beamforming.

In addition, it should be understood that in this embodiment of the present application, the base station and the UE may communicate only on a primary beam, or may perform multi-beam communication by using a primary beam and a secondary beam.

Figure 5:
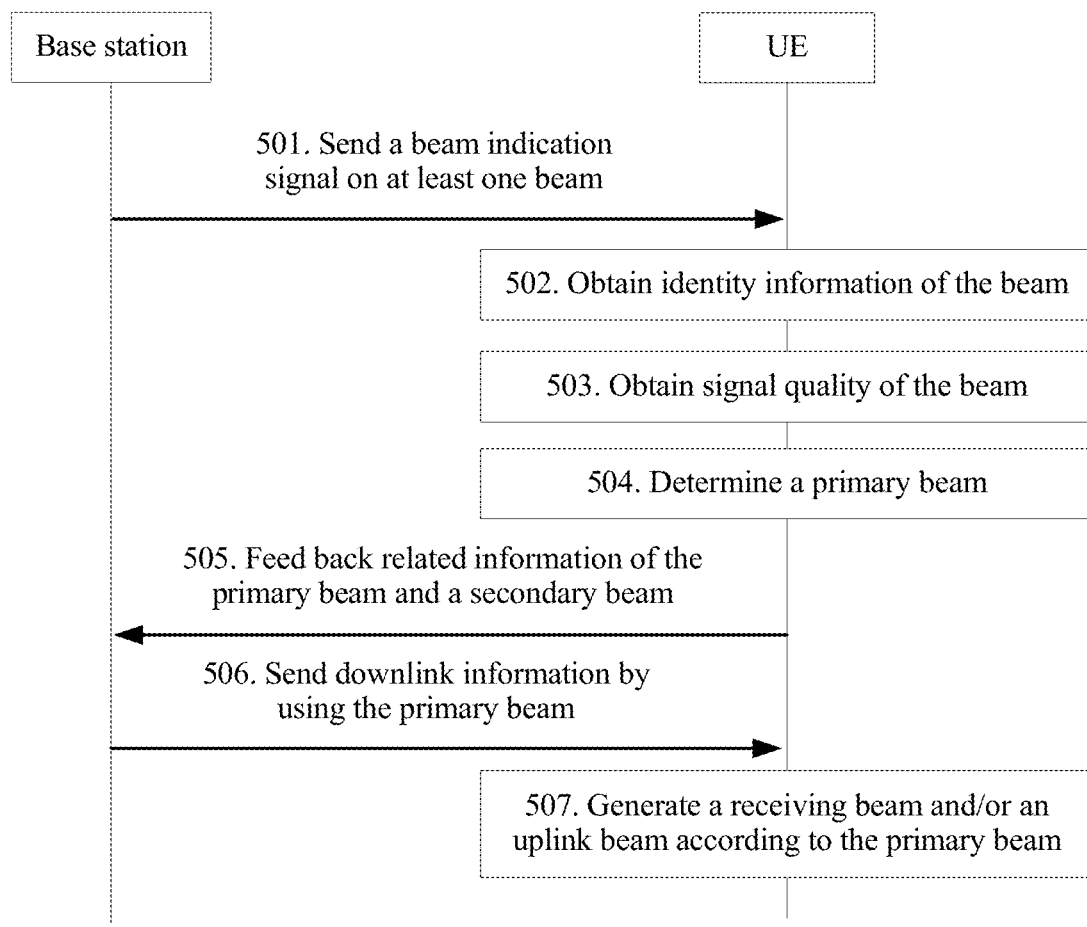
FIG. 5 is a flowchart of another interaction method for information transmission according to an embodiment of the present application.

FIG. 5 is a flowchart of an interaction method for information transmission according to an embodiment of the present application. In an implementation shown in FIG. 5, a base station is a millimeter-wave small cell in LTE carrier aggregation.

501. The base station sends a beam indication signal to UE on at least one beam.

502. The UE obtains identity information of the beam.

503. The UE obtains signal quality of the beam.

For a specific implementation of steps 501 to 503, refer to the related description of steps 401 to 403 in FIG. 4. Details are not described in this embodiment of the present application.

504. The UE determines a primary beam.

The UE may determine the primary beam according to signal quality of each beam.

The UE may use an average value of signal quality of a beam that is measured within a preset time period as signal quality of the beam.

Specifically, the UE may determine a beam having best signal quality within a preset time period t1 as the primary beam.

In addition, the UE and the base station may agree on at least one secondary beam corresponding to each primary beam in advance. For example, the base station and the UE may agree that a beam adjacent to the primary beam is used as a secondary beam. Alternatively, the base station may configure at least one corresponding secondary beam for each beam, and send the configuration information to the UE.

505. The UE feeds back related information of the primary beam to the base station.

After determining the primary beam, the UE may send a beam to the base station to report the related information of the primary beam. The UE may report the related information of the primary beam to the base station by using a first beam report message.

Similar to step 405 in FIG. 4, the first beam report message may carry primary beam ID information.

Optionally, the first beam report message may further carry PCI information corresponding to the primary beam.

Optionally, the first beam report message may further carry CSI-RS port information, a CSI measurement result, or a CSI-RS-based RRM measurement result corresponding to the primary beam.

In addition, optionally, the first beam report message may further carry PCI information corresponding to a secondary beam of the primary beam; and/or the first beam report message may further carry CSI-RS port information, a CSI measurement result, or a CSI-RS-based RRM measurement result corresponding to a secondary beam of the primary beam.

A manner of sending the first beam report message may be similar to that in step 405 in FIG. 4.

In addition, when reporting the first beam report message, the UE may use an uplink dedicated time-frequency resource preconfigured by the base station for the UE. The time-frequency resource may be located in a millimeter-wave cell or a low-frequency cell aggregated by the UE.

506. The base station sends downlink information to the UE by using the primary beam.

507. The UE generates a receiving beam and/or an uplink beam according to the primary beam.

For a specific implementation of steps 506 to 507, refer to the related description of steps 406 to 407 in FIG. 4. Details are not described in this embodiment of the present application.

In this embodiment of the present application, a secondary beam of the primary beam is preconfigured (or a rule of determining a secondary beam according to the primary beam is preconfigured), so that processing complexity of the UE is simplified.

In addition, it should be understood that in this embodiment of the present application, the base station and the UE may communicate only on a primary beam, or may perform multi-beam communication by using a primary beam and a secondary beam.

Figure 6:
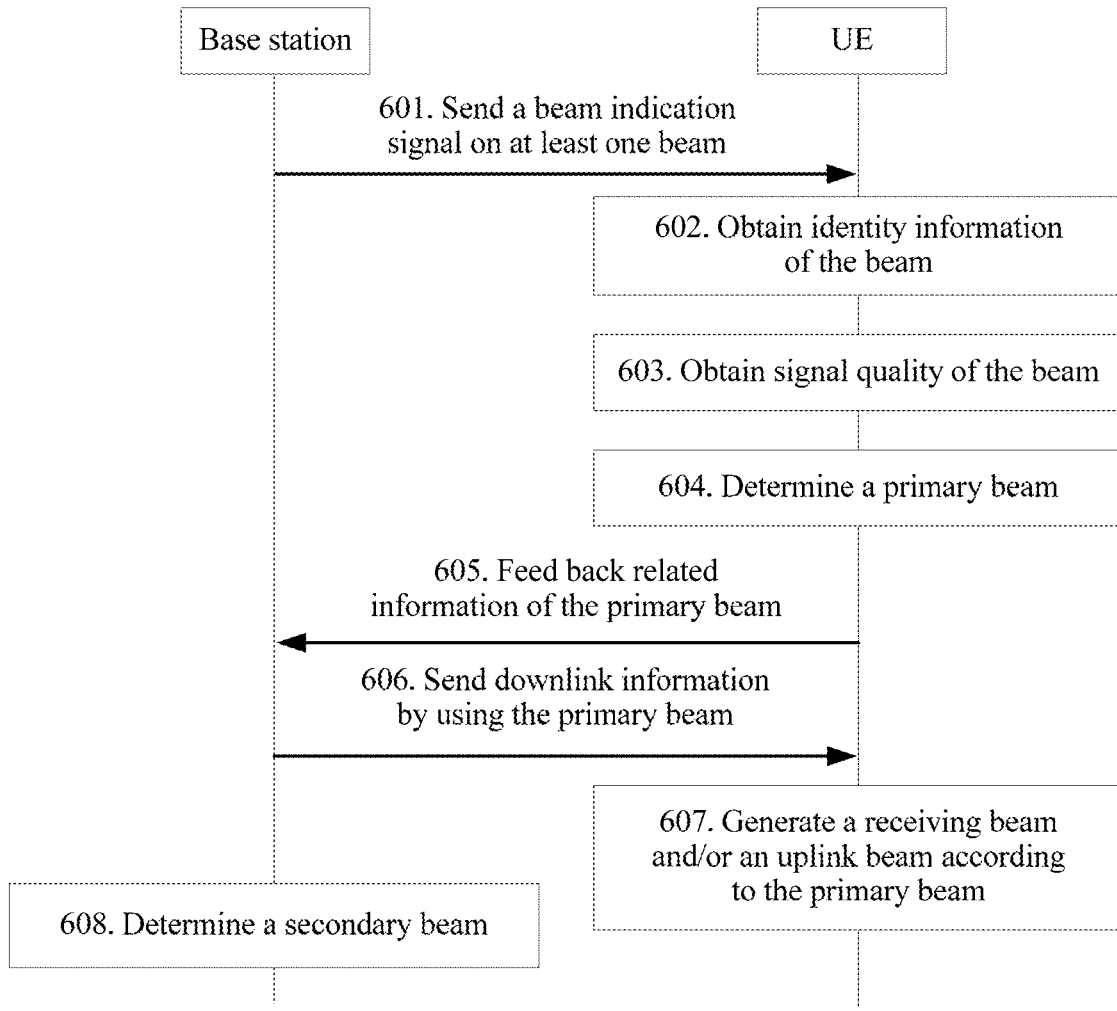
FIG. 6 is a flowchart of still another interaction method for information transmission according to an embodiment of the present application.

FIG. 6 is a flowchart of an interaction method for information transmission according to an embodiment of the present application. A base station shown in FIG. 6 is a millimeter-wave small cell in LTE carrier aggregation.

601. The base station sends a beam indication signal to UE on at least one beam.

602. The UE obtains identity information of the beam.

603. The UE obtains signal quality of the beam.

For a specific implementation of steps 601 to 603, refer to the related description of steps 401 to 403 in FIG. 4. Details are not described in this embodiment of the present application.

604. The UE determines a primary beam.

The UE may determine the primary beam according to signal quality of each beam. The UE may use an average value of signal quality of a beam that is measured within a preset time period as signal quality of the beam. Specifically, the UE may determine a beam having best signal quality within a preset time period t1 as the primary beam.

605. The UE feeds back related information of the primary beam to the base station.

For a specific implementation of step 605, refer to the related description of step 505 in FIG. 5. Details are not described in this embodiment of the present application.

606. The base station sends downlink information to the UE by using the primary beam.

After receiving a report message from the UE, the base station determines the primary beam according to a primary beam ID in the report message, and transmits the downlink information on the primary beam.

607. The UE generates a receiving beam and/or an uplink beam according to the primary beam.

For a specific implementation of step 607, refer to the related description of step 407 in FIG. 4. Details are not described in this embodiment of the present application.

608. The base station determines a secondary beam.

The base station may determine the secondary beam by measuring signal quality of uplink SRSs sent by the UE.

Specifically, the base station first obtains signal quality of uplink SRSs on uplink beams corresponding to beams of the UE, selects uplink beams with best signal quality from the uplink beams, and sets downlink beams (except the primary beam) corresponding to the uplink beams with best signal quality as secondary beams. The UE may send the SRSs in a beam manner, or send the SRSs in an omni manner. To avoid that signal quality is extremely poor or a signal quality measurement deviation is caused due to an instantaneous signal peak, it may be stipulated that when signal quality of an uplink beam is greater than a preset threshold Y1 within a preset time period t1, a downlink beam (except the primary beam) corresponding to the uplink beam may be used as a secondary beam used when the base station sends a downlink signal to the UE. Specially, if a quantity of beams that can be used as a secondary beam is greater than a maximum quantity N of secondary beams that is stipulated by the base station, N beams with best signal quality are selected from the beams as secondary beams.

In this embodiment of the present application, UE needs to report only one best beam, and a secondary beam is maintained by a base station according to signal quality of an uplink beam, so that processing complexity of the UE is simplified.

In addition, it should be understood that in this embodiment of the present application, the base station and the UE may communicate only on a primary beam, or may perform multi-beam communication by using a primary beam and a secondary beam.

Figure 7:
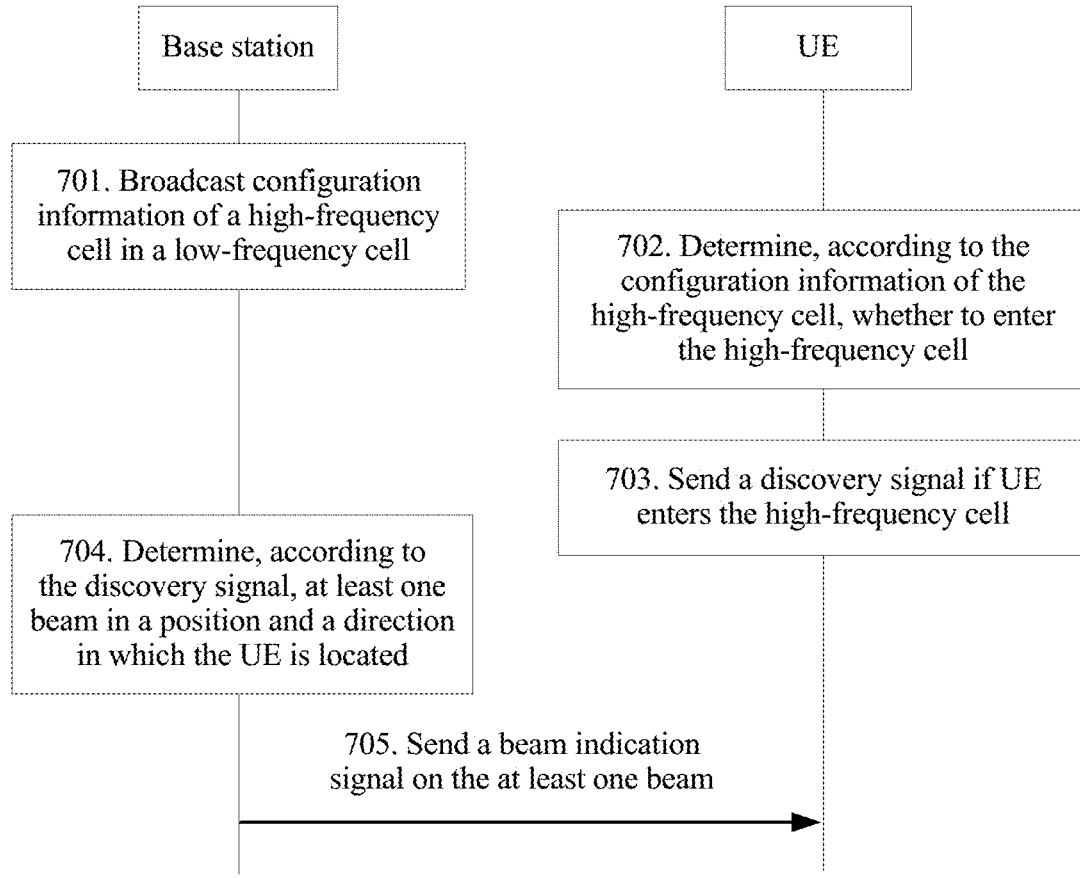
FIG. 7 is a flowchart of yet another interaction method for information transmission according to an embodiment of the present application.

In a solution in which UE determines a primary beam, when the UE enters between beam cluster loops of two beam indication signals of the base station, the UE cannot find a high-frequency cell for quick access. This is unfavorable to a low-delay service. FIG. 7 is a flowchart of an interaction method for information transmission according to an embodiment of the present application. A base station shown in FIG. 7 is a millimeter-wave small cell or a primary base station in LTE carrier aggregation.

701. The base station broadcasts configuration information of a high-frequency cell in a low-frequency cell.

The base station broadcasts the configuration information, such as frequency information and bandwidth, of the high-frequency cell in the low-frequency cell.

Specially, the base station may set coverage areas of the low-frequency cell and the high-frequency cell in a co-site to be the same.

702. The UE determines, according to the configuration information of the high-frequency cell, whether to enter the high-frequency cell.

The UE obtains the configuration information of the high-frequency cell from the low-frequency cell, and determines, according to the configuration information of the high-frequency cell, whether to enter the coverage area of the high-frequency cell.

703. Send a discovery signal if the UE enters the high-frequency cell.

When the UE is to enter or has already entered the coverage area of the high-frequency cell, the UE may send the discovery signal to the base station according to the configuration information of the high-frequency cell.

704. The base station determines, according to the discovery signal, at least one beam in a location and a direction in which the UE is located.

After detecting the discovery signal of the UE, the base station may determine, according to the discovery signal of the UE, a beam location in which the UE is located, and determine the at least one beam in the location and the direction in which the UE is located. The at least one beam is a downlink beam.

705. The base station sends a beam indication signal to the UE on the at least one beam.

The base station sends, according to the location and the direction in which the UE is located, the beam indication signal to the UE on the at least one beam in the location and the direction.

For a processing procedure after the base station sends the beam indication signal, refer to FIG. 4 to FIG. 6. Details are not described in this embodiment of the present application.

In this embodiment of the present application, a base station pertinently sends, according to a discovery signal sent after UE enters a high-frequency cell, a downlink signal to a beam in a direction in which the UE is located. This helps the UE to perform quick access, and energy of the base station that provides the high-frequency cell can be saved.

During communication between UE and a base station, primary beam communication between the UE and the base station may be abnormal due to multiple cases. For example, when the UE moves, the UE is not located in a beam direction for initial reporting, and if the original beam continues to be used in subsequent communication, the communication may fail; or when the UE moves, a current working beam (for example, a line of sight (LOS)) may be suddenly attenuated due to an obstruction, and the current beam is not available (not available); or a current working beam (for example, a line of sight (LOS)) of the UE is suddenly attenuated due to a moving obstruction, and the current beam is not available (not available).

Figure 8:
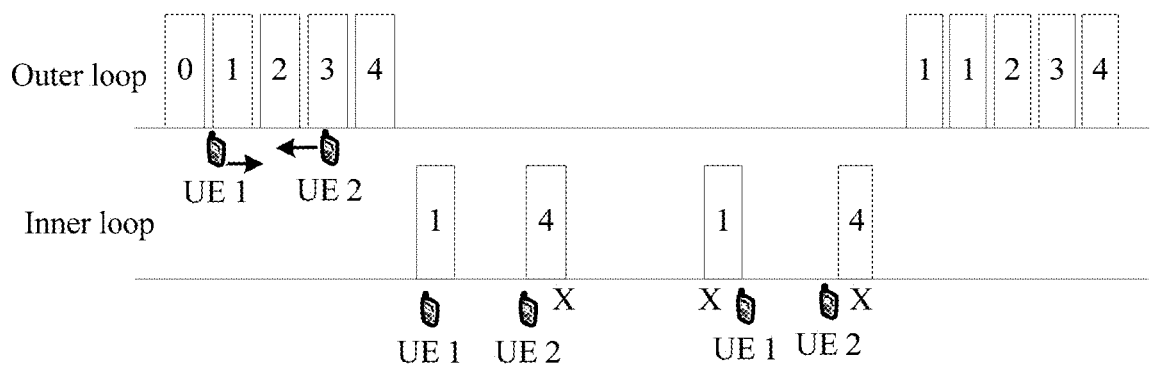
FIG. 8 is a schematic diagram of a scenario in which a fault occurs in primary beam communication according to an embodiment of the present application.

FIG. 8 is a schematic diagram of a scenario in which a fault occurs in primary beam communication according to an embodiment of the present application. As shown in FIG. 8, in an outer loop phase, a base station sends a signal to UE 1 on a beam 1, and sends a signal to UE 2 on a beam 4. In an inner loop phase, because UE moves, the UE is not in a beam direction for initial reporting, for example, the UE 2 is not in a beam direction of the beam 4. Alternatively, in an inner loop phase, because UE moves and encounters an obstruction or because of a moving obstruction, a current working beam (for example, a line of sight (LOS)) is suddenly attenuated, and the current beam is not available (not available). For example, the beam 1 corresponding to the UE 1 is not available, and the beam 4 corresponding to the UE 2 is not available. Therefore, an effective means is needed to quickly detect and restore the primary beam communication.

Figure 9:
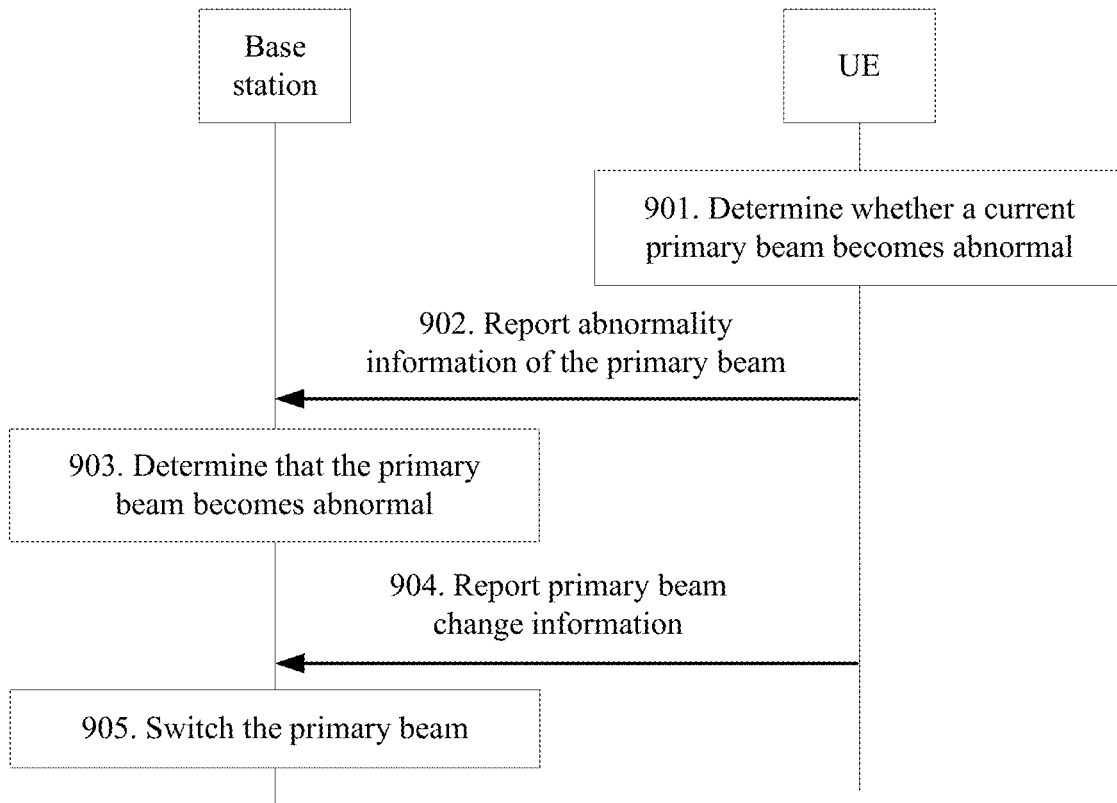
FIG. 9 is a flowchart of an interaction method for information transmission after a primary beam becomes abnormal according to an embodiment of the present application.

FIG. 9 is a flowchart of an interaction method for information transmission after a primary beam becomes abnormal according to an embodiment of the present application. In the embodiment shown in FIG. 9, it is assumed that UE uses multiple mmWave cells with the same frequency as a same SCell, or performs carrier aggregation on multiple mmWave cells with different frequencies. A base station shown in FIG. 9 is a millimeter-wave small cell or a primary base station in LTE carrier aggregation.

901. The UE determines whether a current primary beam becomes abnormal.

The UE may determine, in multiple manners, whether the current primary beam becomes abnormal.

In a specific implementation, if signal quality detected by the UE on the current primary beam is less than a preset threshold Y2, it is considered that the current primary beam becomes abnormal. Specifically, it may be stipulated that if signal quality detected by the UE on the current primary beam at a moment is less than Y2, it may be considered that the current primary beam becomes abnormal; or it may be stipulated that if signal quality detected by the UE on the current primary beam within a preset time period t3 is less than Y2, it may be considered that the current primary beam becomes abnormal. Y2 and t3 may be set by the UE, or agreed upon by the base station and the UE in advance, or stipulated in a protocol. Signal quality of the primary beam may be an SINR, an RSSI, RSRP, RSRQ, or the like of the primary beam.

In another specific implementation, if the UE detects no downlink signal on the current primary beam, it is considered that the current primary beam becomes abnormal. Specifically, it may be stipulated that if the UE detects no downlink signal on the current primary beam within a preset time period t4, it may be considered that the current primary beam becomes abnormal. The preset time period t4 may be set by the UE, or agreed upon by the base station and the UE in advance, or stipulated in a protocol.

902. The UE reports abnormality information of the primary beam.

When the UE determines that the primary beam becomes abnormal, the UE may further send a report to the base station to indicate that the current primary beam is faulty.

In a specific implementation, the base station may configure two different SRS resources (an SRS resource 1 and an SRS resource 2) for the UE, and stipulate that when the current primary beam works normally, the UE sends an SRS on the SRS resource 1, and when the current primary beam works abnormally, the UE sends an SRS on the SRS resource 2. When detecting that the current primary beam works abnormally, the UE sends an SRS on the SRS resource 2, so that the base station determines that the primary beam originally reported by the UE is faulty.

In another specific implementation, the UE may report, to the base station by using a secondary beam, that the current primary beam becomes abnormal. In this case, the UE and the base station may attempt to perform communication by successively using one or more beams according to signal quality of secondary beams in descending order. Specifically, the UE may send primary beam abnormality indication information to the base station, to indicate that the primary beam becomes abnormal, or send current signal quality information of the primary beam to the base station.

In still another specific implementation, the UE may report, to the base station by using a low-frequency cell, that the current primary beam becomes abnormal. Specifically, the UE may send primary beam abnormality indication information to the base station, to indicate that the primary beam becomes abnormal, or send current signal quality information of the primary beam to the base station.

903. The base station determines that the primary beam becomes abnormal.

After receiving the primary beam indication information from the UE, the base station may determine that the primary beam becomes abnormal.

Alternatively, if the base station and the UE agree that the UE sends an SRS on an SRS resource 1 when the current primary beam works normally, and the UE sends an SRS on an SRS resource 2 when the current primary beam works abnormally, and the base station receives the SRS on the SRS resource 2, the base station may determine that the primary beam becomes abnormal.

Optionally, the base station may send a beam indication signal carrying a beam identity to the UE again, so as to reselect a primary beam and a secondary beam. For a specific implementation, refer to the methods in FIG. 4 to FIG. 6. Details are not described in this embodiment of the present application.

Alternatively, optionally, the base station may implement, together with the UE, a method of redetermining a primary beam in advance after a primary beam fails, and wait for the UE side to send the new primary beam.

904. The UE reports primary beam change information.

The UE may periodically report primary beam change information.

Specifically, the UE may measure signal quality of the primary beam and secondary beams according to a period of the current primary beam, and determine whether to change the primary beam.

The UE may use an average value of signal quality of a beam that is measured within a preset time period as signal quality of the beam.

When the signal quality of the primary beam is less than a preset threshold Y4 and signal quality of a first beam in the secondary beams is greater than a preset threshold Y5, and duration of this case exceeds a preset time period t6, the UE may use the first beam as a new primary beam, use the original primary beam as a secondary beam, and report a new primary beam ID and secondary beam ID to the base station.

Values of the thresholds Y4 and Y5 may be the same or different. In addition, specially, a value of t6 may be 0. When the value of t6 is 0, Y4 and Y5 may be instantaneous values. That is, when the signal quality of the primary beam is less than Y4, and the signal quality of the first beam in the secondary beams is greater than Y5, the UE may use the first beam as a new primary beam, and use the original primary beam as a secondary beam.

After determining the new primary beam, the UE may send identity information of the new primary beam and the original primary beam to the base station.

905. The base station switches the primary beam.

The base station switches the primary beam according to the primary beam change information sent by the UE.

In an application scenario in this embodiment of the present application, if the base station in FIG. 9 is a millimeter-wave small cell, and both the new primary beam and the old primary beam belong to the same millimeter-wave small cell, the base station may directly update a primary beam, and send a downlink message to the UE on the new primary beam.

In another application scenario in this embodiment of the present application, if the base station shown in FIG. 9 is a millimeter-wave small cell (a first base station), and the new primary beam belongs to a neighboring base station (a second base station) of the millimeter-wave small cell to which the old primary beam belongs, the first base station may send an instruction message to the second base station to instruct the second base station to communicate with the UE on the new primary beam.

In still another application scenario in this embodiment of the present application, if the base station shown in FIG. 9 is a primary base station (a third base station) to which a millimeter-wave small cell (a first base station) of the original primary beam belongs, and the new primary beam belongs to a neighboring base station (a second base station) of the millimeter-wave small cell to which the old primary beam belongs, the third base station may send an instruction message to the second base station to instruct the second base station to communicate with the UE on the new primary beam.

It should be understood that in this embodiment of the present application, when determining that the primary beam becomes abnormal, the UE may not report primary beam abnormality information, but directly reports primary beam change information.

In this embodiment of the present application, when a primary beam is faulty, a candidate beam can be used to quickly restore communication, thereby improving communication reliability of sending a downlink signal in a beamforming manner. It should be understood that the downlink signal may be a common signal, a service signal, or the like.

Figure 10:
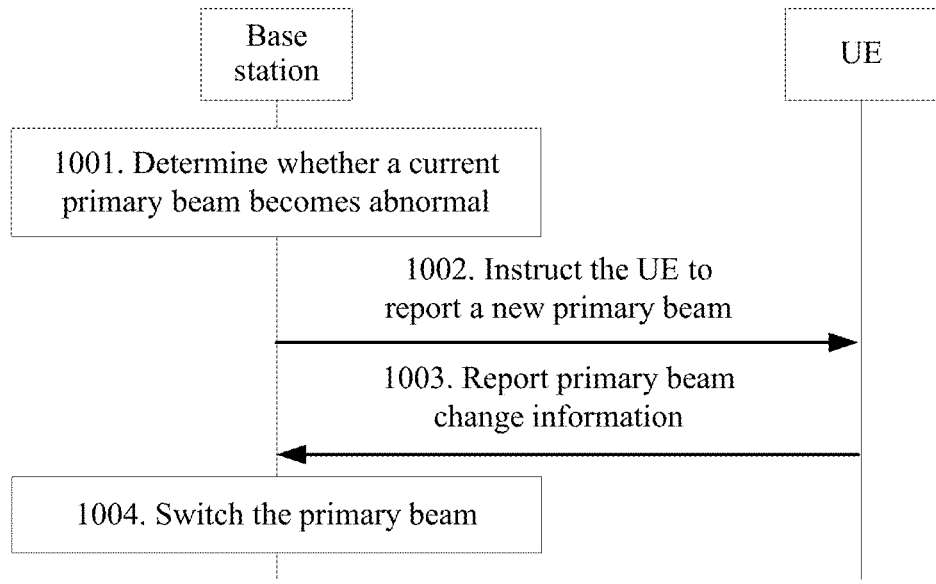
FIG. 10 is a flowchart of another interaction method for information transmission after a primary beam becomes abnormal according to an embodiment of the present application.

FIG. 10 is a flowchart of an interaction method for information transmission after a primary beam becomes abnormal according to an embodiment of the present application. In the embodiment shown in FIG. 10, it is assumed that UE uses multiple mmWave cells with the same frequency as a same SCell, or performs carrier aggregation on multiple mmWave cells with different frequencies. A base station shown in FIG. 10 is a millimeter-wave small cell in LTE carrier aggregation.

1001. The base station determines whether a current primary beam becomes abnormal.

The base station may determine, in multiple manners, whether the current primary beam becomes abnormal.

In a specific implementation, if the base station detects no SRS of the UE on an uplink beam corresponding to a primary beam reported by the UE, it is considered that the primary beam reported by the UE becomes abnormal. Specifically, it may be stipulated that if the base station detects, within a preset time period t5, no SRS of the UE on the uplink beam corresponding to the primary beam reported by the UE, it may be considered that the current primary beam becomes abnormal. t5 may be set by the base station, or agreed upon by the base station and the UE in advance, or stipulated in a protocol.

In another specific implementation, if signal quality detected by the base station on an uplink beam corresponding to a primary beam reported by the UE is less than a preset threshold Y3, it is considered that the primary beam reported by the UE becomes abnormal. Specifically, it may be stipulated that if signal quality detected by the base station on the uplink beam at a moment is less than Y3, it may be considered that the current primary beam becomes abnormal; or it may be stipulated that if signal quality detected by the base station on the uplink beam within a preset time period t5 is less than Y3, it may be considered that the current primary beam becomes abnormal. Y3 and t5 may be set by the base station, or agreed upon by the base station and the UE in advance, or stipulated in a protocol.

Optionally, if the base station determines that the primary beam becomes abnormal, the base station may send a beam indication signal carrying a beam identity to the UE again, so as to reselect a primary beam and a secondary beam. For a specific implementation, refer to the methods in FIG. 4 to FIG. 6. Details are not described in this embodiment of the present application.

Alternatively, optionally, if the base station determines that the primary beam becomes abnormal, the base station may send instruction information to the UE, to instruct the UE to send a new primary beam identity. That is, step 1002 is performed.

1002. The base station instructs the UE to report a new primary beam.

The base station may send an instruction message to the UE to instruct the UE to report a new primary beam.

1003. The UE reports primary beam change information.

For a specific implementation of step 1003, refer to step 904 in FIG. 9. Details are not described in this embodiment of the present application.

1004. The base station determines a primary beam.

The base station switches the primary beam according to the primary beam change information sent by the UE.

If the new primary beam also belongs to the base station, the base station directly updates the primary beam, and sends downlink information to the UE on the new primary beam.

If the new primary beam belongs to a neighboring base station (a second base station) of the base station, the base station may send an instruction message to the second base station to instruct the second base station to communicate with the UE on the new primary beam.

In this embodiment of the present application, when a primary beam is faulty, a candidate beam can be used to quickly restore communication, thereby improving communication reliability of sending a downlink signal in a beamforming manner. It should be understood that the downlink signal may be a common signal, a service signal, or the like.

Figure 11:
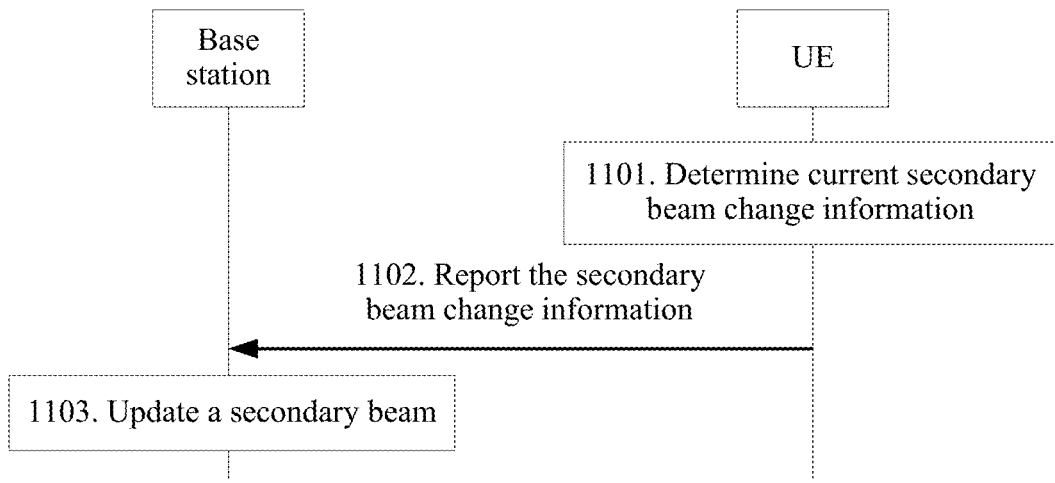
FIG. 11 is a flowchart of interaction for changing a secondary beam according to an embodiment of the present application.

FIG. 11 is a flowchart of interaction for changing a secondary beam according to an embodiment of the present application.

1101. Determine current secondary beam change information.

UE may determine the current secondary beam change information according to signal quality of a current secondary beam.

If signal quality of a second beam with worst signal quality in current secondary beams of the UE is less than a preset threshold Y6, the UE measures signal quality of another beam outside the current secondary beam set. When signal quality of a third beam in other beams is greater than a preset threshold Y7, and duration of this case exceeds a preset time period t7, the third beam replaces the second beam and is used as a secondary beam.

It should be understood that, in this embodiment of the present application, Y6 and Y7 may be the same or different. In addition, specially, when a value of t7 is 0, Y6 and Y7 may be instantaneous values. That is, when the signal quality of the second beam with worst signal quality in the current secondary beams of the UE is less than Y6, and the signal quality of the third beam in the other beams other than the primary beam and the secondary beams is greater than Y7, the third beam replaces the second beam and is used as a secondary beam.

1102. Report current secondary beam change information.

After determining the new secondary beam, the UE may send the secondary beam change information to the base station.

1103. The base station updates a secondary beam.

The base station determines the new secondary beam according to the secondary beam change information sent by the UE.

For example, the UE reports identity information of the second beam and the third beam to the base station, and the base station may determine to change the secondary beam, and update the secondary beam.

The base station may update a list for recording secondary beams, delete the identity information of the second beam from the list, and add the identity information of the third beam.

Certainly, another application scenario may exist, and this is not specifically described in this embodiment of the present application.

Figure 12:
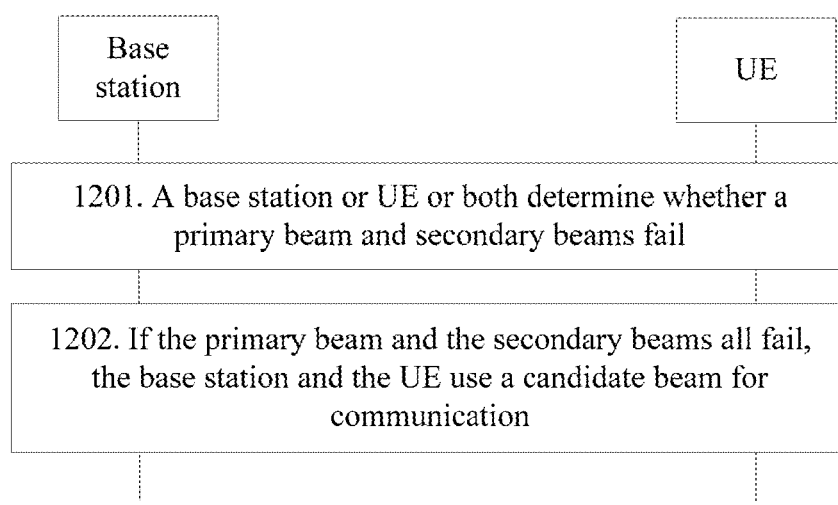
FIG. 12 is a flowchart of interaction for information transmission after a primary beam and secondary beams all fail according to an embodiment of the present application.

FIG. 12 is a flowchart of interaction for information transmission after a primary beam and secondary beams all fail according to an embodiment of the present application. In this embodiment of the present application, a base station may preconfigure at least one piece of candidate beam identity information for UE to use when a primary beam and all secondary beams fail.

1201. The base station or the UE or both determine whether the primary beam and the secondary beams fail.

The base station or the UE or both may determine whether the primary beam and the secondary beams fail, that is, determine whether the primary beam and the secondary beams become abnormal.

Specifically, for a specific implementation of determining, by the UE, whether the primary beam fails, refer to the related description of step 901 in FIG. 9; for a specific implementation of determining, by the base station, whether the primary beam fails, refer to the related description of step 903 in FIG. 9 or step 1001 in FIG. 10; for a specific implementation of determining, by the UE, whether the secondary beams fail, refer to the related description of step 1101 in FIG. 11. A process of determining, by the base station, whether the secondary beams fail is similar to a process of determining, by the base station, whether the primary beam fails. Details are not described in this embodiment of the present application.

1202. If the primary beam and the secondary beams all fail, the base station and the UE use a candidate beam for communication.

If the base station or the UE or both determine that the primary beam and all the secondary beams fail, the base station and the UE attempt to perform downlink communication on a beam corresponding to the at least one candidate beam identity.

Specially, if the UE still fails to receive a downlink signal, a new beam training process may be triggered. For a specific implementation of beam training, refer to the prior art. Details are not described in this embodiment of the present application.

This embodiment is usually applied in some special areas, for example, in some special locations of a cell, only a reflection method can be used to form some non line of sight (NLOS) communication paths. In this case, the base station and the UE may determine beam ID information of these communication paths (beams) according to deployment.

Figure 13:
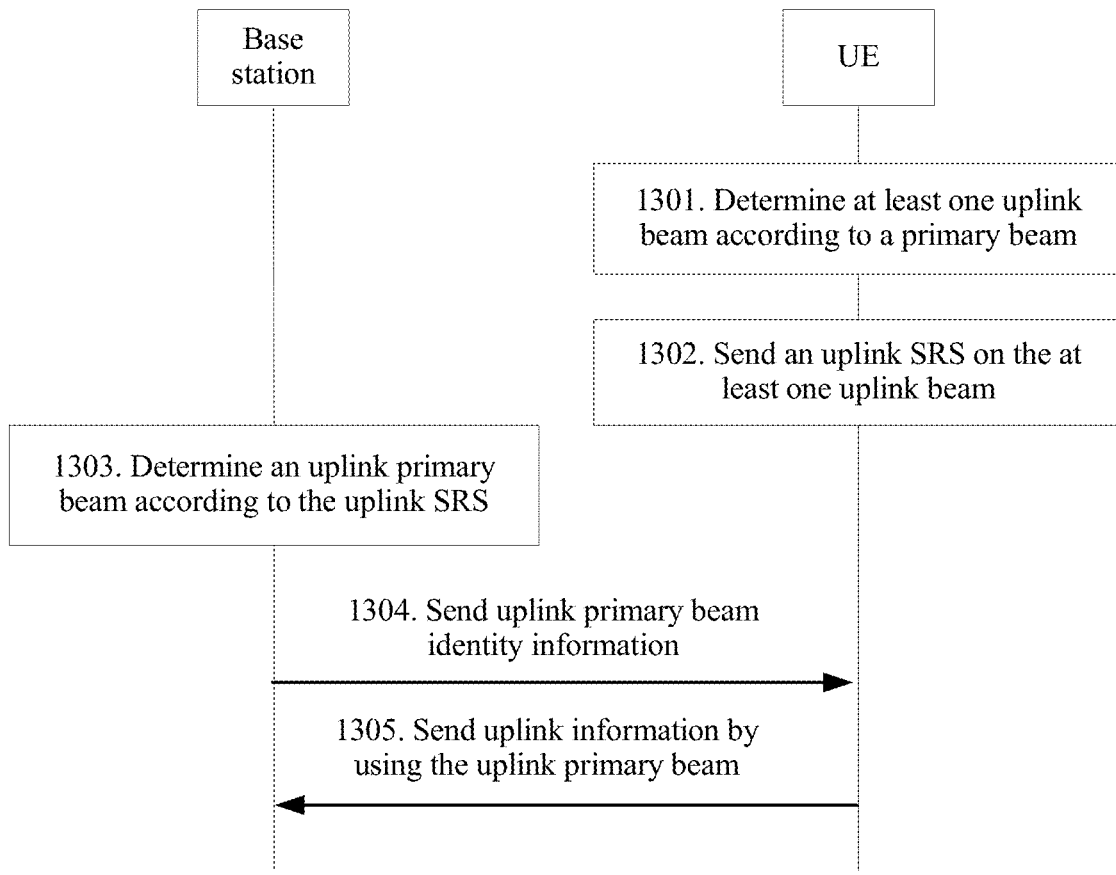
FIG. 13 is a flowchart of an interaction method for information transmission on an uplink beam according to an embodiment of the present application.

FIG. 13 is a flowchart of an interaction method for information transmission on an uplink beam according to an embodiment of the present application.

1301. UE determines at least one uplink beam according to a primary beam.

After determining the primary beam, the UE may perform uplink beam training according to the primary beam. The UE may determine the at least one uplink beam on a direction of the primary beam, to send an uplink SRS (or uplink discovery signal).

1302. The UE sends an uplink SRS on the at least one uplink beam.

The UE sends, in a direction of the current primary beam, multiple uplink SRSs in different beam directions.

1303. The base station determines an uplink primary beam according to the uplink SRS.

The base station determines, according to multiple uplink beam SRS measurement results, an uplink beam with best signal quality as the uplink primary beam of the UE.

1304. The base station sends uplink primary beam identity information.

After determining the uplink primary beam, the base station may send the uplink primary beam identity information to the UE.

1305. The UE sends uplink information by using the uplink primary beam.

The UE sends the uplink information on the uplink primary beam indicated in the uplink primary beam identity information.

Certainly, it should be understood that if a primary beam used by the base station to send a downlink signal to the UE changes, the uplink beam training process needs to be performed again.

In this embodiment of the present application, an uplink beam with relatively good signal quality can be obtained by means of uplink beam training, and this helps uplink transmission by the UE.

Figure 14:
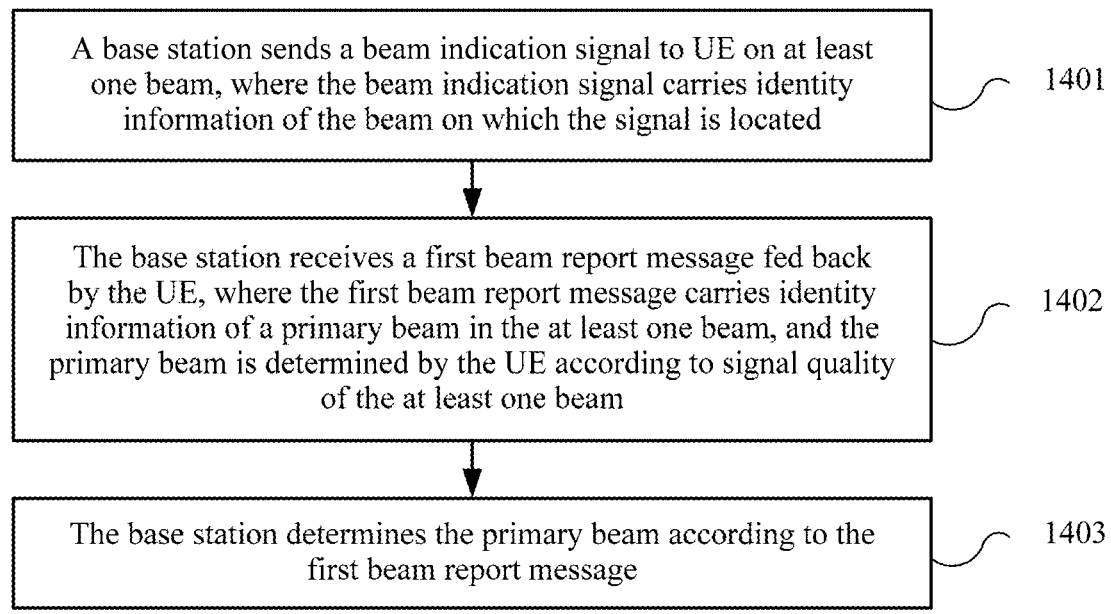
FIG. 14 is a flowchart of another information transmission method according to an embodiment of the present application.

FIG. 14 is a flowchart of another information transmission method according to an embodiment of the present application. The method in FIG. 14 is executed by a base station. It should be understood that the base station mentioned in this embodiment of the present application is a millimeter-wave small cell. The method includes the following steps.

1401. The base station sends a beam indication signal to UE on at least one beam, where the beam indication signal carries identity information of the beam on which the signal is located.

Optionally, the beam indication signal includes at least one of the following signals: a cell discovery signal, a primary synchronization signal, a secondary synchronization signal, a broadcast channel signal, a cell-specific reference signal, a channel state reference signal, or a signal specific for indicating a beam identity.

1402. The base station receives a first beam report message fed back by the UE, where the first beam report message carries identity information of the primary beam, and the primary beam is determined by the UE according to signal quality of the at least one beam.

1403. The base station determines the primary beam according to the first beam report message.

In this embodiment of the present application, a base station sends a beam indication signal on at last one beam, where the beam indication signal carries identity information of the at least one beam, and determines, according to signal quality of the at least one beam that is fed back by a UE side, a primary beam used when the base station sends a downlink signal to the UE. This helps improve communication quality in downlink communication performed by the base station.

Optionally, in an embodiment, the method further includes: detecting, by the base station, an uplink signal of the UE on an uplink beam corresponding to the primary beam; and if the base station detects no measurement signal of the UE on the uplink beam corresponding to the primary beam, determining, by the base station, that the primary beam becomes abnormal.

Optionally, in another embodiment, the method further includes: detecting, by the base station, an uplink signal of the UE on an uplink beam corresponding to the primary beam; and if the base station detects that quality of a measurement signal of the UE on the uplink beam corresponding to the primary beam is less than a first preset threshold, determining, by the base station, that the primary beam becomes abnormal.

In the foregoing two embodiments, the base station determines, by detecting a signal on the uplink beam corresponding to the primary beam, whether the primary beam becomes abnormal.

Optionally, in another embodiment, the method further includes: if the base station receives, on a second SRS resource, an SRS sent by the UE, determining that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

In this embodiment of the present application, a base station determines a working state of a primary beam according to an SRS resource used when UE sends SRS signaling, thereby reducing signaling transfer overheads.

Optionally, in still another embodiment, the method further includes: receiving, by the base station, second beam report information sent by the UE, where the second beam report information indicates that the primary beam works abnormally.

Optionally, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

Optionally, in an embodiment, the method further includes: an uplink time-frequency resource used by the UE to send the first beam report message is configured by the base station for the UE.

Optionally, in an embodiment, the method further includes: preconfiguring, by the base station, one or more pieces of corresponding receiving beam vector information for each beam in the at least one beam of the UE.

Optionally, in an embodiment, the method further includes: preconfiguring, by the base station, one or more pieces of corresponding uplink beam vector information for each beam in the at least one beam of the UE.

Optionally, in an embodiment, the base station and the UE agree in advance that adjacent beams of the primary beam are used as the secondary beams.

Optionally, in another embodiment, the method further includes: determining, by the base station, at least one secondary beam for the primary beam according to the first beam report message, where the first beam report message further carries identity information of the at least one secondary beam for the primary beam.

Optionally, in an embodiment, the method further includes: obtaining, by the base station, signal quality of an uplink SRS sent by the UE on an uplink beam corresponding to a beam in the at least one beam other than the primary beam; and selecting, by the base station from the at least one beam, at least one beam with relatively good uplink SRS signal quality as the secondary beam for the primary beam.

Further, in an embodiment, the method further includes: sending, by the base station, identity information of at least one beam to the UE in a low-frequency cell, so that the UE finds a beam corresponding to an identifier of the at least one beam in a high-frequency cell, and receives downlink information on the beam corresponding to the identifier of the at least one beam; and sending, by the base station, the downlink information on one or more beams in the at least one beam.

Optionally, in an embodiment, the base station preconfigures at least one candidate beam identity corresponding to each primary beam; and when the primary beam and all the secondary beams fail, the base station performs downlink communication with the UE by using a beam indicated by the at least one candidate beam identity corresponding to the primary beam.

Optionally, in an embodiment, before the sending, by the base station, a beam indication signal to UE on at least one beam, the method further includes: receiving, by the base station, a discovery signal sent when the UE enters a high-frequency cell; determining, by the base station, a location and a direction of the UE according to the discovery signal of the UE; and determining, by the base station, the at least one beam according to the location and the direction of the UE, where the at least one beam is located in the location and the direction of the UE.

For specific implementations of methods in the embodiments shown in FIG. 14 of the present application, refer to the methods executed by the base station in the embodiments shown in FIG. 4 to FIG. 7 and FIG. 9 to FIG. 13. Details are not described in this embodiment of the present application.

Figure 15:
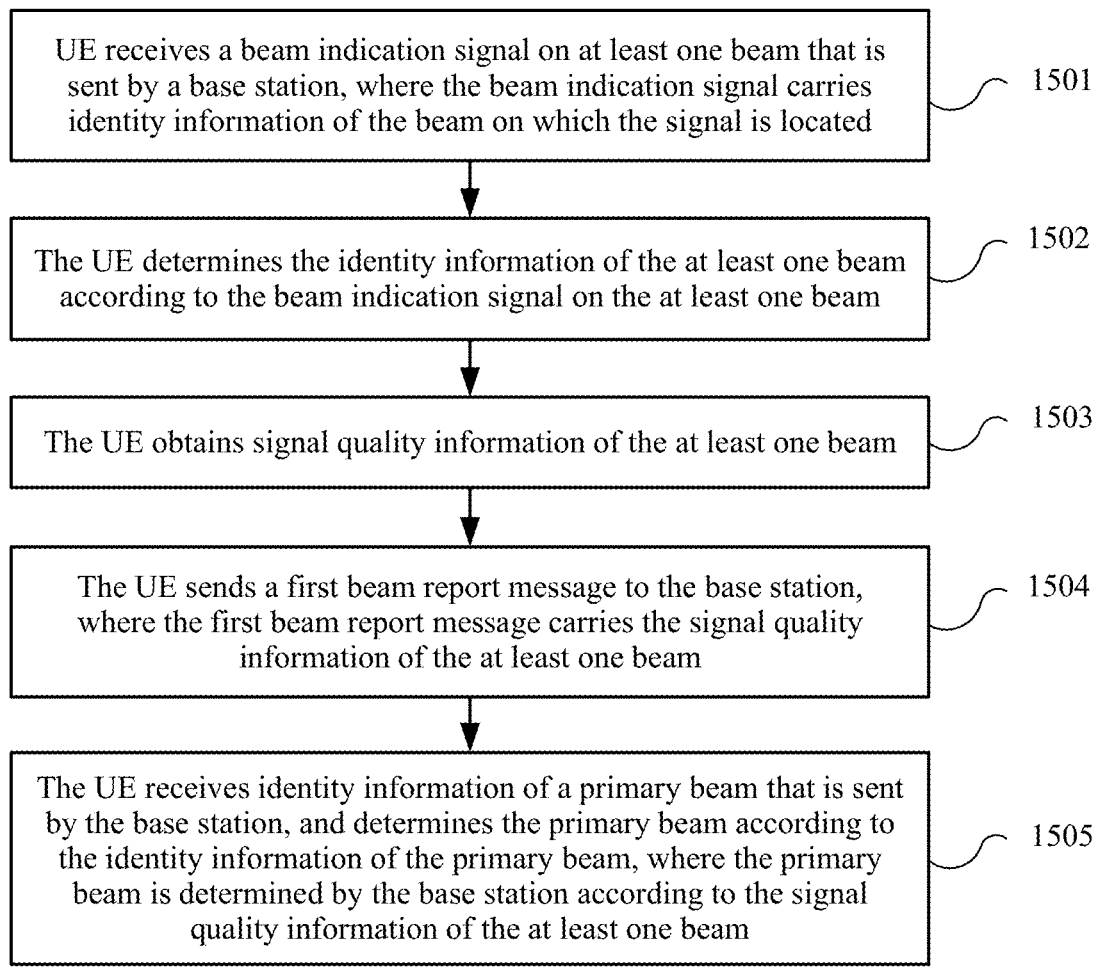
FIG. 15 is a flowchart of still another information transmission method according to an embodiment of the present application.

FIG. 15 is a flowchart of another information transmission method according to an embodiment of the present application. The method in FIG. 15 is executed by UE. The method includes the following steps.

1501. The UE receives a beam indication signal on at least one beam that is sent by a base station, where the beam indication signal carries identity information of the beam on which the signal is located.

It should be understood that in this embodiment of the present application, the base station is a millimeter wave small cell, or a base station in which a cell with a relatively high frequency greater than 3 GHz is located.

1502. The UE determines the identity information of the at least one beam according to the beam indication signal on the at least one beam.

The UE obtains the identity information of the beam by parsing the beam indication signal on the beam.

1503. The UE obtains signal quality information of the at least one beam.

The UE obtains signal quality of the at least one beam by measuring the signal on the at least one beam.

1504. The UE sends a first beam report message to the base station, where the first beam report message carries the signal quality information of the at least one beam.

1505. The UE receives identity information of a primary beam that is sent by the base station, and determines the primary beam according to the identity information of the primary beam, where the primary beam is determined by the base station according to the signal quality information of the at least one beam.

In this embodiment of the present application, signal quality of at least one beam is obtained according to identity information carried in a beam indication signal on the at least one beam that is sent by a base station, and the signal quality is sent to the base station, so that the base station determines a primary beam used when the base station sends a downlink signal to UE. This helps improve communication quality in downlink communication performed by the base station.

Optionally, the first beam report message includes at least one piece of the following information: CSI-RS port information corresponding to the primary beam, a CSI measurement result corresponding to the primary beam, or an RRM measurement result corresponding to the primary beam. Further, the first beam report message may further carry a physical cell identifier corresponding to the primary beam.

Optionally, in an embodiment, the method further includes: determining, by the UE, that the primary beam becomes abnormal if signal quality detected by the UE on the primary beam within a first preset time period is less than a first preset threshold.

Optionally, in another embodiment, the method further includes: determining, by the UE, that the primary beam becomes abnormal if the UE detects no downlink signal on the primary beam within a second preset time period.

Optionally, in an embodiment, when the UE determines that the primary beam becomes abnormal, the method further includes: sending, by the UE, a second beam report message to the base station, where the beam report message is used to indicate that the primary beam becomes abnormal.

Optionally, in another embodiment, when the UE determines that the primary beam becomes abnormal, the method further includes: sending, by the UE, an SRS to the base station on a second SRS resource, where the base station configures a first SRS resource and the second SRS resource for the UE, and instructs the UE to send an SRS on the first SRS resource when the primary beam works normally and send an SRS on the second SRS resource when the primary beam works abnormally.

Optionally, in the embodiment in which the primary beam becomes abnormal, the method further includes: receiving, by the UE in a low-frequency cell, beam receiving instruction information sent by the base station, where the beam receiving instruction information is used to instruct the UE to receive a downlink signal on at least one beam in a high-frequency cell; receiving, by the UE, the downlink signal on the at least one beam in the high-frequency cell; obtaining, by the UE, signal quality of the at least one beam in the high-frequency cell; and using, by the UE, a beam with best signal quality as a new primary beam, and feeding back the new primary beam to the base station.

Optionally, in an embodiment, an uplink time-frequency resource used by the UE to send the first beam report message is configured by the base station for the UE.

Optionally, in another embodiment, the method further includes: generating, by the UE, one or more receiving beams corresponding to the primary beam according to the primary beam and one or more pieces of receiving beam vector information corresponding to the primary beam, and receiving downlink information of the base station on the one or more receiving beams corresponding to the primary beam, where the one or more pieces of receiving beam vector information corresponding to the primary beam are preconfigured by the base station.

Optionally, the method further includes: generating, by the UE, one or more uplink beams corresponding to the primary beam according to the primary beam and one or more pieces of uplink beam vector information corresponding to the primary beam, and sending uplink information to the base station on the one or more uplink beams corresponding to the primary beam, where the one or more pieces of uplink beam vector information corresponding to the primary beam are preconfigured by the base station.

Optionally, the method further includes: sending an uplink SRS on the one or more uplink beams corresponding to the primary beam, so that the base station determines an uplink primary beam of the UE according to a measurement result of the uplink SRS on the one or more uplink beams corresponding to the primary beam; receiving, by the UE, uplink primary beam identity information sent by the base station; and sending, by the UE, an uplink signal on the uplink primary beam indicated in the uplink primary beam identity information.

Optionally, in an embodiment, the base station and the UE agree in advance that adjacent beams of the primary beam are used as secondary beams of the primary beam.

Optionally, in another embodiment, the method further includes: determining, by the UE, the at least one secondary beam according to the first beam report message, where the first beam report message further carries identity information of the at least one secondary beam.

Optionally, in an embodiment, the method further includes: sending, by the UE, identity information and corresponding channel quality of the primary beam and a first secondary beam to the base station if the UE detects that signal quality of the primary beam is less than a second preset threshold and signal quality of the first secondary beam is greater than a third preset threshold, and duration of this case is greater than a third preset time period.

Optionally, in another embodiment, the method further includes: sending, by the UE, identity information and corresponding channel quality of a first beam and a second secondary beam to the base station if the UE detects that signal quality of the second secondary beam is less than a fourth preset threshold and signal quality of the first beam is greater than a third preset threshold, and duration of this case is greater than a fourth preset time period.

Optionally, in another embodiment, the method further includes: if channel quality of a current primary beam and channel quality of all secondary beams of the UE are all less than a fourth preset threshold, and duration of this case is greater than a fifth preset time period, attempting, by the UE, to communicate with the base station on a beam corresponding to a preconfigured candidate beam identity, where the beam corresponding to the candidate beam identity is used when the primary beam and all the secondary beams fail.

Optionally, the method further includes: selecting, by the UE, a beam corresponding to a preconfigured candidate beam identity as a primary beam if a current primary beam of the UE becomes abnormal, where the beam corresponding to the candidate beam identity is used when the primary beam fails.

Optionally, before the UE receives a beam indication signal on at least one beam that is sent by a base station, the method further includes: when the UE enters a high-frequency cell, sending, by the UE, a discovery signal to the base station according to configuration information of the high-frequency cell, so that the base station sends, according to the discovery signal of the UE, the beam indication signal to the UE on the at least one beam in a direction in which the discovery signal of the UE is located.

The following further describes the method in the embodiments of the present application with reference to specific embodiments.

Figure 16:
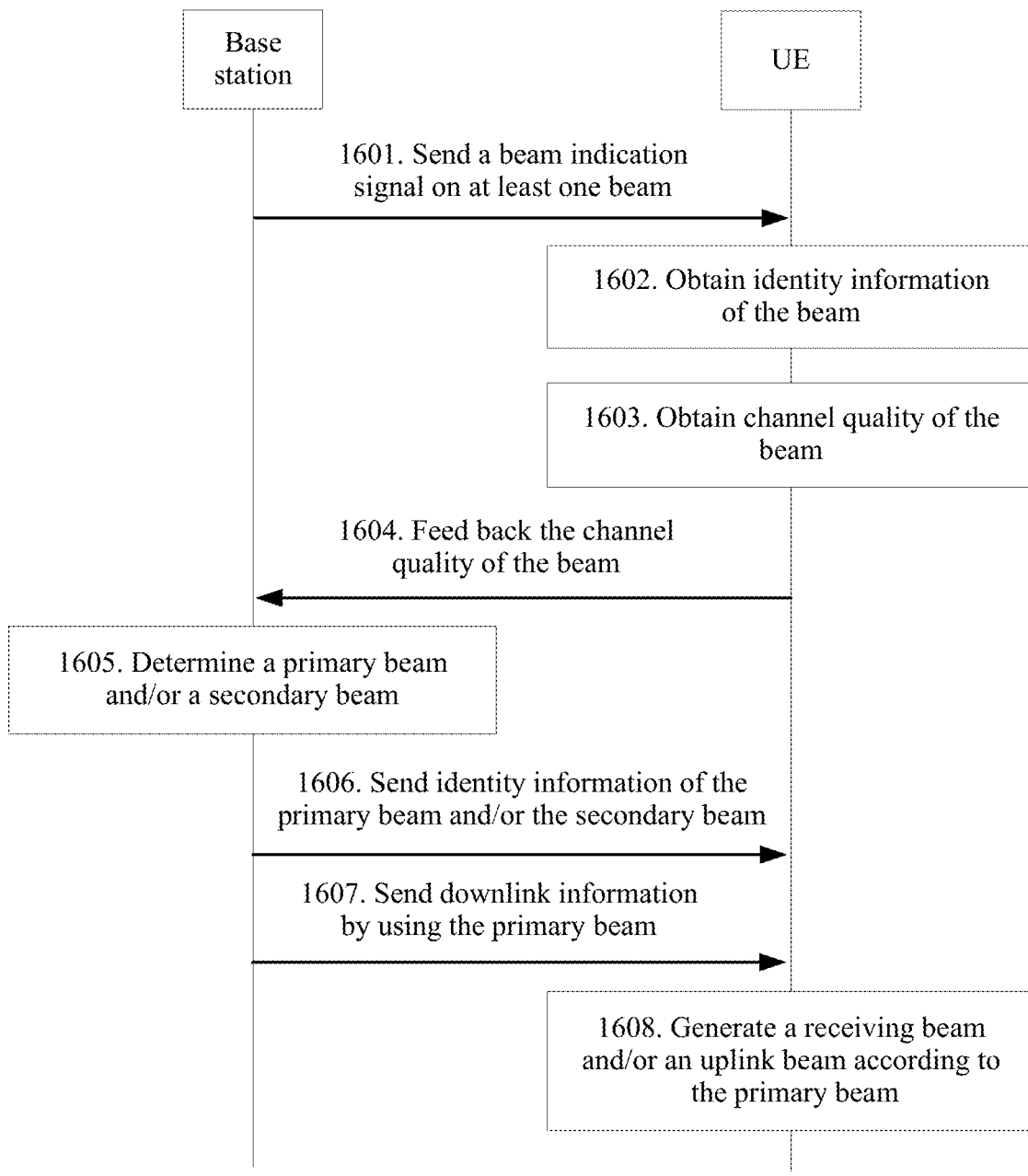
FIG. 16 is a flowchart of yet another interaction method for information transmission according to an embodiment of the present application.

FIG. 16 is a flowchart of an interaction method for information transmission according to an embodiment of the present application. In an implementation shown in FIG. 16, a base station is a millimeter-wave small cell in LTE carrier aggregation.

1601. The base station sends a beam indication signal to UE on at least one beam.

1602. The UE obtains identity information of the beam.

1603. The UE obtains channel quality of the beam.

For a specific implementation of step 1601 to step 1603, refer to step 401 to step 403 in FIG. 4. Details are not described in this embodiment of the present application.

1604. The UE feeds back the channel quality of the beam.

In a specific implementation, after obtaining the channel quality of the at least one beam, the UE may feed back the channel quality of the at least one beam to the base station.

In another specific implementation, after obtaining the channel quality of the at least one beam, the UE may feed back channel quality of several beams with relatively good channel quality in the at least one beam to the base station.

In addition, information fed back by the UE may include a beam identity and corresponding channel quality.

1605. The base station determines a primary beam and/or a secondary beam.

The base station determines a beam with best channel quality as the primary beam according to the channel quality of the beam that is fed back by the UE.

In addition, when determining the secondary beam, in a specific implementation, the base station may preconfigure a secondary beam corresponding to a primary beam identity, for example, the base station and the UE may agree to use a beam adjacent to the primary beam as the secondary beam; in another specific implementation, the base station may select beams with best channel quality from beams fed back by the UE, use a beam with the best channel quality as the primary beam, and use another beam as the secondary beam.

1606. The base station sends identity information of the primary beam and/or the secondary beam.

After determining the primary beam and/or the secondary beam, the base station may send the identity information of the primary beam and/or the secondary beam to the UE. Specifically, the base station may send the identity information to the UE by using dedicated signaling. The dedicated signaling may be RRC signaling, or MAC CE signaling, or physical downlink control channel (PDCCH) signaling.

1607. The base station sends downlink information to the UE by using the primary beam.

After determining the primary beam, the base station may transmit the downlink information by using the primary beam.

1608. The UE generates a receiving beam and/or an uplink beam according to the primary beam.

For a specific implementation of step 1608, refer to step 407 in FIG. 4. Details are not described in this embodiment of the present application.

In this embodiment of the present application, a base station determines a primary beam and at least one secondary beam according to signal quality of beams that is reported by the UE, so that when a fault occurs in primary beam communication, a candidate beam (secondary beam) may be used to restore communication, thereby improving communication reliability of sending a downlink signal by a base station by means of beamforming.

Similarly, in a solution in which a base station side determines a primary beam, when the UE enters between beam cluster loops of two beam indication signals of the base station, the UE cannot find a high-frequency cell for quick access. This is unfavorable to a low-delay service.

Figure 17:
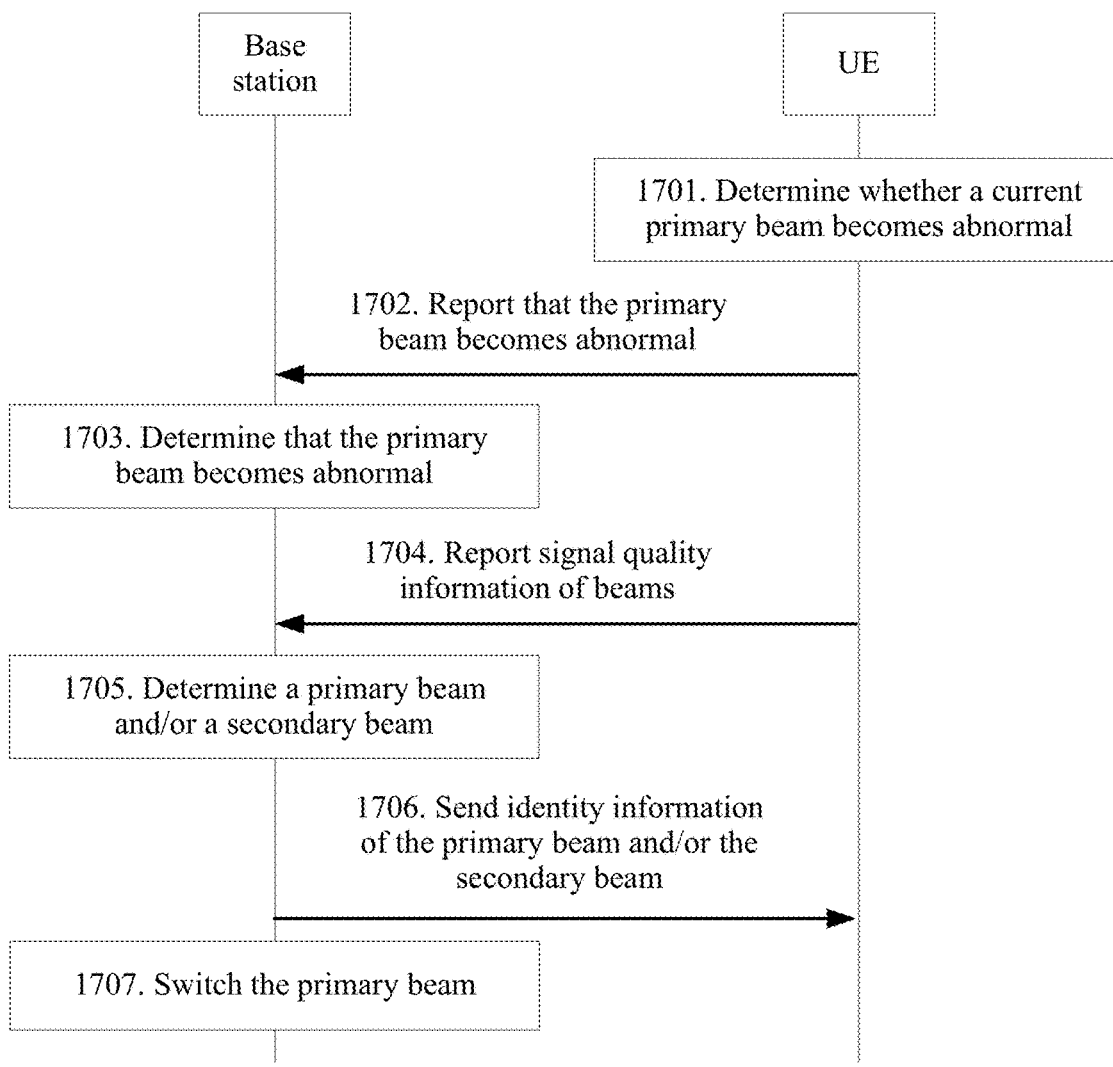
FIG. 17 is a flowchart of still another interaction method for information transmission after a primary beam becomes abnormal according to an embodiment of the present application.

FIG. 17 is a flowchart of an interaction method for information transmission after a primary beam becomes abnormal according to an embodiment of the present application. In the embodiment shown in FIG. 17, it is assumed that UE uses multiple mmWave cells with the same frequency as a same SCell, or performs carrier aggregation on multiple mmWave cells with different frequencies. A base station shown in FIG. 17 is a millimeter-wave small cell or a primary base station in LTE carrier aggregation.

1701. The UE determines whether a current primary beam becomes abnormal.

The UE may determine, in multiple manners, whether the current primary beam becomes abnormal.

In a specific implementation, if signal quality detected by the UE on the current primary beam is less than a preset threshold Y2, it is considered that the current primary beam becomes abnormal. Specifically, it may be stipulated that if signal quality detected by the UE on the current primary beam at a moment is less than Y2, it may be considered that the current primary beam becomes abnormal; or it may be stipulated that if signal quality detected by the UE on the current primary beam within a preset time period t3 is less than Y2, it may be considered that the current primary beam becomes abnormal. Y2 and t3 may be set by the UE, or agreed upon by the base station and the UE in advance, or stipulated in a protocol. Signal quality of the primary beam may be an SINR, an RSSI, RSRP, RSRQ, or the like of the primary beam.

In another specific implementation, if the UE detects no downlink signal on the current primary beam, it is considered that the current primary beam becomes abnormal. Specifically, it may be stipulated that if the UE detects no downlink signal on the current primary beam within a preset time period t4, it may be considered that the current primary beam becomes abnormal. The preset time period t4 may be set by the UE, or agreed upon by the base station and the UE in advance, or stipulated in a protocol.

1702. The UE reports abnormality information of the primary beam.

When the UE determines that the primary beam becomes abnormal, the UE may further send a report to the base station to indicate that the current primary beam is faulty.

In a specific implementation, the base station may configure two different SRS resources (an SRS resource 1 and an SRS resource 2) for the UE, and stipulate that when the current primary beam works normally, the UE sends an SRS on the SRS resource 1, and when the current primary beam works abnormally, the UE sends an SRS on the SRS resource 2. When detecting that the current primary beam works abnormally, the UE sends an SRS on the SRS resource 2, so that the base station determines that the primary beam originally reported by the UE is faulty.

In another specific implementation, the UE may report, to the base station by using a secondary beam, that the current primary beam becomes abnormal. In this case, the UE and the base station may attempt to perform communication by successively using one or more beams according to signal quality of secondary beams in descending order. Specifically, the UE may send primary beam abnormality indication information to the base station, to indicate that the primary beam becomes abnormal, or send current signal quality information of the primary beam to the base station.

In still another specific implementation, the UE may report, to the base station by using a low-frequency cell, that the current primary beam becomes abnormal. Specifically, the UE may send primary beam abnormality indication information to the base station, to indicate that the primary beam becomes abnormal, or send current signal quality information of the primary beam to the base station.

1703. The base station determines that the primary beam becomes abnormal.

After receiving the primary beam indication information from the UE, the base station may determine that the primary beam becomes abnormal.

Alternatively, if the base station and the UE agree that the UE sends an SRS on an SRS resource 1 when the current primary beam works normally, and the UE sends an SRS on an SRS resource 2 when the current primary beam works abnormally, and the base station receives the SRS on the SRS resource 2, the base station may determine that the primary beam becomes abnormal.

Optionally, the base station may send a beam indication signal carrying a beam identity to the UE again, so as to reselect a primary beam and a secondary beam. For a specific implementation, refer to the methods in FIG. 4 to FIG. 6. Details are not described in this embodiment of the present application.

Alternatively, optionally, the base station may wait for the UE to report beams that currently have best quality and signal quality of the beams, that is, step 1704 is performed.

1704. The UE reports signal quality information of beams.

The UE may use an average value of signal quality of a beam that is measured within a preset time period as signal quality of the beam.

In a first manner, when the signal quality of the primary beam is less than a preset threshold Y4 and signal quality of a first beam in the secondary beams is greater than a preset threshold Y5, and duration of this case exceeds a preset time period t6, the UE may report the signal quality of the first beam and the primary beam to the base station, so that the base station determines a new primary beam and secondary beam.

Alternatively, in a second manner, when the signal quality of the primary beam is less than a preset threshold Y4, and duration of this case exceeds a present time period t6, the UE may send beams with best signal quality and signal quality of the beams to the base station, so that the base station determines a new primary beam and secondary beam.

1705. The base station determines a primary beam and/or a secondary beam.

The base station may determine a new primary beam according to the signal quality of the beams that is reported by the UE.

When the UE performs reporting in the first manner, the base station may determine the first beam as the primary beam.

In addition, if the base station and the UE agree on a secondary beam corresponding to each primary beam in advance, the base station determines a secondary beam according to a correspondence between a primary beam and a secondary beam; or the base station determines the original primary beam as a secondary beam, and other secondary beams remain unchanged.

When the UE performs reporting in the second manner, the base station may determine a beam with best signal quality as the primary beam.

In addition, if the base station and the UE agree on a secondary beam corresponding to each primary beam in advance, the base station determines a secondary beam according to a correspondence between a primary beam and a secondary beam; or the base station determines that other beams with relatively good signal quality are secondary beams.

1706. The base station sends identity information of the primary beam and/or the secondary beam.

After determining the identity information of the primary beam and/or the secondary beam, the base station may send the identity information of the primary beam and/or the secondary beam to the UE.

1707. The base station switches the primary beam.

After determining the primary beam, the base station may perform primary beam switching. For a specific implementation, refer to step 905 in FIG. 9. Details are not described in this embodiment of the present application.

It should be understood that in this embodiment of the present application, when determining that the primary beam becomes abnormal, the UE may not report primary beam abnormality information, but directly reports primary beam change information.

In this embodiment of the present application, when a primary beam is faulty, a candidate beam can be used to quickly restore communication, thereby improving communication reliability of sending a downlink signal in a beamforming manner. It should be understood that the downlink signal may be a common signal, a service signal, or the like.

Figure 18:
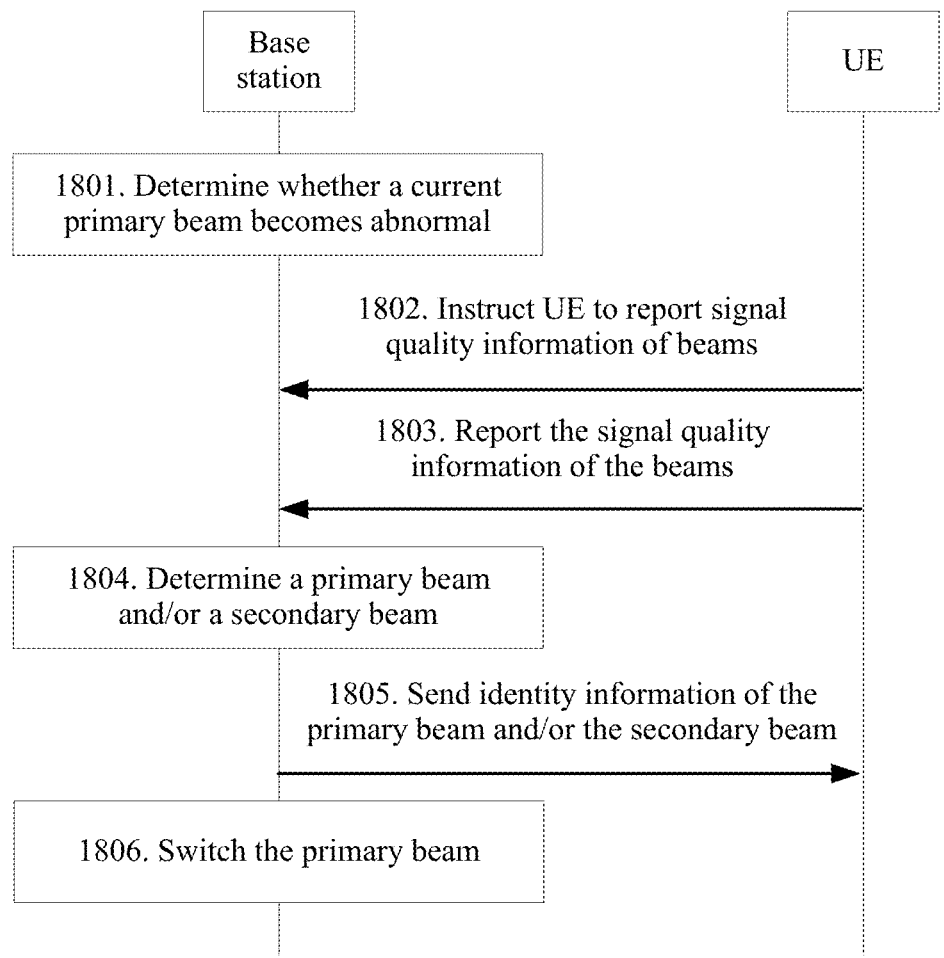
FIG. 18 is a flowchart of yet another interaction method for information transmission after a primary beam becomes abnormal according to an embodiment of the present application.

FIG. 18 is a flowchart of an interaction method for information transmission after a primary beam becomes abnormal according to an embodiment of the present application. In the embodiment shown in FIG. 18, it is assumed that UE uses multiple mmWave cells with the same frequency as a same SCell, or performs carrier aggregation on multiple mmWave cells with different frequencies. A base station shown in FIG. 18 is a millimeter-wave small cell in LTE carrier aggregation.

1801. The base station determines whether a current primary beam becomes abnormal.

The base station may determine, in multiple manners, whether the current primary beam becomes abnormal.

In a specific implementation, if the base station detects no SRS of the UE on an uplink beam corresponding to a primary beam reported by the UE, it is considered that the primary beam reported by the UE becomes abnormal. Specifically, it may be stipulated that if the base station detects, within a preset time period t5, no SRS of the UE on the uplink beam corresponding to the primary beam reported by the UE, it may be considered that the current primary beam becomes abnormal. t5 may be set by the base station, or agreed upon by the base station and the UE in advance, or stipulated in a protocol.

In another specific implementation, if signal quality detected by the base station on an uplink beam corresponding to a primary beam reported by the UE is less than a preset threshold Y3, it is considered that the primary beam reported by the UE becomes abnormal. Specifically, it may be stipulated that if signal quality detected by the base station on the uplink beam at a moment is less than Y3, it may be considered that the current primary beam becomes abnormal; or it may be stipulated that if signal quality detected by the base station on the uplink beam within a preset time period t5 is less than Y3, it may be considered that the current primary beam becomes abnormal. Y3 and t5 may be set by the base station, or agreed upon by the base station and the UE in advance, or stipulated in a protocol.

Optionally, if the base station determines that the primary beam becomes abnormal, the base station may send a beam indication signal carrying a beam identity to the UE again, so as to reselect a primary beam and a secondary beam. For a specific implementation, refer to the methods in FIG. 4 to FIG. 6. Details are not described in this embodiment of the present application.

Alternatively, optionally, if the base station determines that the primary beam becomes abnormal, the base station may send instruction information to the UE, to instruct the UE to report signal quality of beams. That is, step 1802 is performed.

1802. The base station instructs the UE to report signal quality of beams.

The base station may send an instruction message to the UE to instruct the UE to report signal quality of current beams.

1803. The UE reports signal quality information of the beams.

The UE may use an average value of signal quality of a beam that is measured within a preset time period as signal quality of the beam.

In a first manner, the UE may send beams with best signal quality and signal quality of the beams to the base station, so that the base station determines a new primary beam and secondary beam.

Alternatively, in a second manner, the UE may send all beams and signal quality thereof to the base station, so that the base station determines a new primary beam and secondary beam.

1804. The base station determines a primary beam and/or a secondary beam.

The base station may determine a new primary beam according to the signal quality of the beams that is reported by the UE.

In addition, if the base station and the UE agree on a secondary beam corresponding to each primary beam in advance, the base station determines a secondary beam according to a correspondence between a primary beam and a secondary beam; or the base station determines that other beams with relatively good signal quality are secondary beams.

1805. The base station sends identity information of the primary beam and/or the secondary beam.

After determining the identity information of the primary beam and/or the secondary beam, the base station may send the identity information of the primary beam and/or the secondary beam to the UE.

1806. The base station switches the primary beam.

After determining the primary beam, the base station may perform primary beam switching. For a specific implementation, refer to step 905 in FIG. 9. Details are not described in this embodiment of the present application.

In this embodiment of the present application, when a primary beam is faulty, a candidate beam can be used to quickly restore communication, thereby improving communication reliability of sending a downlink signal in a beamforming manner. It should be understood that the downlink signal may be a common signal, a service signal, or the like.

For specific implementations of some methods in the embodiments shown in FIG. 15 of the present application, refer to the methods executed by the UE in the embodiments shown in FIG. 7, FIG. 12, and FIG. 13. Details are not described in this embodiment of the present application.

Figure 19:
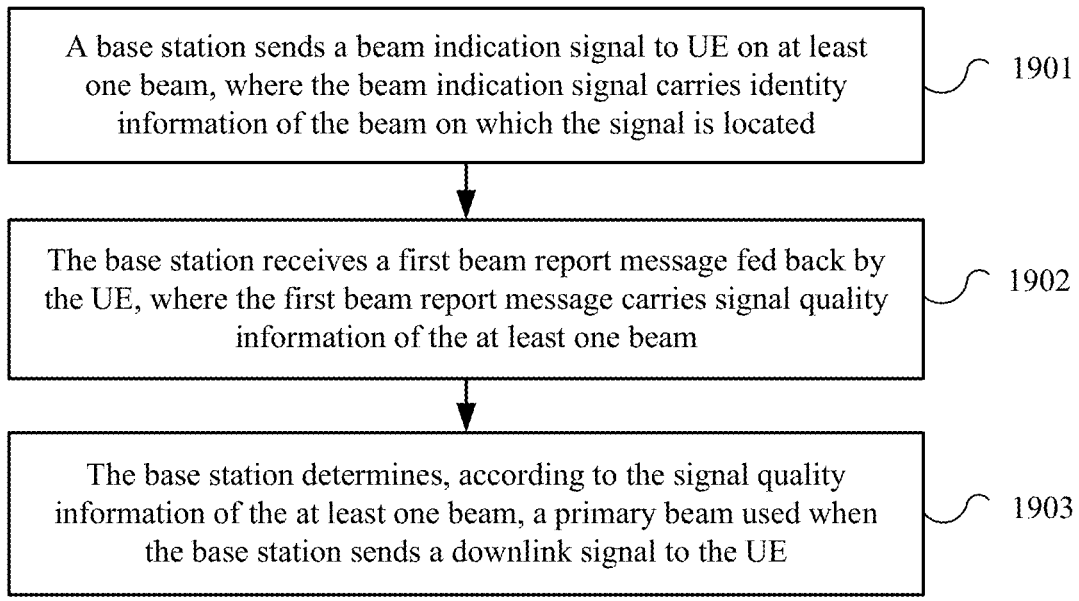
FIG. 19 is a flowchart of yet another information transmission method according to an embodiment of the present application.

FIG. 19 is a flowchart of another information transmission method according to an embodiment of the present application. The method in FIG. 19 is executed by a base station, and the base station is a millimeter wave small cell, or a base station in which a cell with a relatively high frequency greater than 3 GHz is located. The method includes the following steps:

1901. The base station sends a beam indication signal to UE on at least one beam, where the beam indication signal carries identity information of the beam on which the signal is located.

1902. The base station receives a first beam report message fed back by the UE, where the first beam report message carries signal quality information of the at least one beam.

1903. The base station determines, according to the signal quality information of the at least one beam, a primary beam used when the base station sends a downlink signal to the UE.

In this embodiment of the present application, a base station sends, on at least one beam, a beam indication signal carrying a beam identity, and determines, according to signal quality of the at least one beam that is fed back by UE, a primary beam used when the base station sends a downlink signal to the UE. This helps improve communication quality in downlink communication performed by the base station.

Optionally, in an embodiment, the method further includes: detecting, by the base station, an uplink signal of the UE on an uplink beam corresponding to the primary beam; and if the base station detects no measurement signal of the UE on the uplink beam corresponding to the primary beam, determining, by the base station, that the primary beam becomes abnormal.

Optionally, in another embodiment, the method further includes: detecting, by the base station, an uplink signal of the UE on an uplink beam corresponding to the primary beam; and if the base station detects that quality of a measurement signal of the UE on the uplink beam corresponding to the primary beam is less than a first preset threshold, determining, by the base station, that the primary beam becomes abnormal.

Optionally, in another embodiment, the method further includes: if the base station receives, on a second SRS resource, an SRS sent by the UE, determining that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

Optionally, in still another embodiment, the method further includes: receiving, by the base station, second beam report information sent by the UE, where the second beam report information indicates that the primary beam works abnormally.

Optionally, the signal quality information includes at least one piece of the following information: CSI-RS port information corresponding to the primary beam, a CSI measurement result corresponding to the primary beam, or an RRM measurement result corresponding to the primary beam. Further, the first beam report message further carries a physical cell identifier corresponding to the primary beam.

Optionally, in an embodiment, the method further includes: an uplink time-frequency resource used by the UE to send the first beam report message is configured by the base station for the UE.

Optionally, in an embodiment, the method further includes: preconfiguring, by the base station, one or more pieces of corresponding receiving beam vector information for each beam in the at least one beam of the UE.

Optionally, in an embodiment, the method further includes: preconfiguring, by the base station, one or more pieces of corresponding uplink beam vector information for each beam in the at least one beam of the UE.

Optionally, in an embodiment, the base station and the UE agree in advance that adjacent beams of the primary beam are used as the secondary beams.

Optionally, in another embodiment, the method further includes: determining, by the base station, at least one secondary beam for the primary beam according to the first beam report message, where the first beam report message further carries identity information of the at least one secondary beam for the primary beam.

Optionally, in an embodiment, the method further includes: obtaining, by the base station, signal quality of an uplink SRS sent by the UE on an uplink beam corresponding to a beam in the at least one beam other than the primary beam; and selecting, by the base station from the at least one beam, at least one beam with relatively good uplink SRS signal quality as the secondary beam for the primary beam.

Further, in an embodiment, the method further includes: sending, by the base station, identity information of at least one beam to the UE in a low-frequency cell, so that the UE finds a beam corresponding to an identifier of the at least one beam in a high-frequency cell, and receives downlink information on the beam corresponding to the identifier of the at least one beam; and sending, by the base station, the downlink information on one or more beams in the at least one beam.

Optionally, in an embodiment, the base station preconfigures at least one candidate beam identity corresponding to each primary beam; and when the primary beam and all the secondary beams fail, the base station performs downlink communication with the UE by using a beam indicated by the at least one candidate beam identity corresponding to the primary beam.

Optionally, in an embodiment, before the sending, by the base station, a beam indication signal to UE on at least one beam, the method further includes: receiving, by the base station, a discovery signal sent when the UE enters a high-frequency cell; determining, by the base station, a location and a direction of the UE according to the discovery signal of the UE; and determining, by the base station, the at least one beam according to the location and the direction of the UE, where the at least one beam is located in the location and the direction of the UE.

For specific implementations of methods in the embodiments shown in FIG. 19 of the present application, refer to the methods executed by the base station in the embodiments shown in FIG. 16 to FIG. 18, FIG. 7, FIG. 12, and FIG. 13. Details are not described in this embodiment of the present application.

Figure 20:
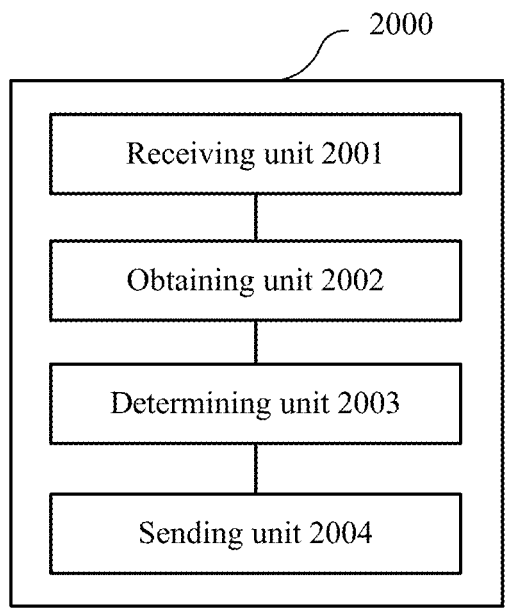
FIG. 20 is a schematic structural diagram of user equipment according to an embodiment of the present application.

FIG. 20 is a schematic structural diagram of user equipment 2000 according to an embodiment of the present application. The user equipment 2000 includes:

a receiving unit 2001, configured to receive a beam indication signal on at least one beam that is sent by a base station, where the beam indication signal carries identity information of the beam on which the signal is located;

an obtaining unit 2002, configured to obtain the identity information of the at least one beam according to the beam indication signal on the at least one beam, where the obtaining unit 2002 is further configured to obtain signal quality of the at least one beam;

a determining unit 2003, configured to determine, according to the signal quality of the at least one beam, a primary beam used when the base station sends a downlink signal to the user equipment 2000; and a sending unit 2004, configured to send a first beam report message to the base station, where the first beam report message carries identity information of the primary beam.

In this embodiment of the present application, user equipment 2000 obtains signal quality of at least one beam by using identity information carried in a beam indication signal on the at least one beam that is sent by a base station, and determines, according to the signal quality of the at least one beam, a primary beam used when the base station sends a downlink signal to the UE. This helps improve communication quality in downlink communication performed by the base station.

Optionally, the first beam report message further carries at least one piece of the following information: a physical cell identifier (PCI) corresponding to the primary beam, CSI-RS port information corresponding to the primary beam, a CSI measurement result corresponding to the primary beam, or an RRM measurement result corresponding to the primary beam. When reporting the first beam message, the UE may further add a PCI and a measurement result of the primary beam to the first beam message.

Optionally, in an embodiment, the determining unit 2003 is further configured to determine that the primary beam becomes abnormal if signal quality detected on the primary beam within a first preset time period is less than a first preset threshold.

Optionally, in another embodiment, the determining unit 2003 is further configured to determine that the primary beam becomes abnormal if no downlink signal is detected on the primary beam within a second preset time period.

Optionally, in still another embodiment, the determining unit 2003 is further configured to send a second beam report message to the base station when the primary beam becomes abnormal, where the beam report message is used to indicate that the primary beam becomes abnormal.

Optionally, in still another embodiment, the sending unit 2004 is further configured to send an SRS to the base station on a second SRS resource when the primary beam becomes abnormal, where the base station configures a first SRS resource and the second SRS resource for the user equipment 2000, and instructs the user equipment 2000 to send an SRS on the first SRS resource when the primary beam works normally and send an SRS on the second SRS resource when the primary beam works abnormally.

Further, in the embodiment in which the primary beam becomes abnormal, the receiving unit 2001 is further configured to receive, in a low-frequency cell, beam receiving instruction information sent by the base station, where the beam receiving instruction information is used to instruct the user equipment 2000 to receive a downlink signal on at least one beam in a high-frequency cell; the receiving unit 2001 is further configured to receive the downlink signal on the at least one beam in the high-frequency cell; the obtaining unit 2002 is further configured to obtain signal quality of the at least one beam in the high-frequency cell; and the sending unit 2004 is further configured to: use a beam with best signal quality in the at least one beam in the high-frequency cell as a new primary beam, and feed back the new primary beam to the base station.

Optionally, an uplink time-frequency resource used by the UE to send the first beam report message is configured by the base station for the UE, or is agreed upon by the base station and the UE in advance, or is stipulated in a protocol.

Optionally, the receiving unit 2001 is further configured to: generate one or more receiving beams corresponding to the primary beam according to the primary beam and one or more pieces of receiving beam vector information corresponding to the primary beam, and receive downlink information of the base station on the one or more receiving beams corresponding to the primary beam, where the one or more pieces of receiving beam vector information corresponding to the primary beam are preconfigured by the base station.

Optionally, the sending unit 2004 is further configured to: generate one or more uplink beams corresponding to the primary beam according to the primary beam and one or more pieces of uplink beam vector information corresponding to the primary beam, and send uplink information to the base station on the one or more uplink beams corresponding to the primary beam, where the one or more pieces of uplink beam vector information corresponding to the primary beam are preconfigured by the base station.

Optionally, the sending unit 2004 is further configured to send an uplink SRS on the one or more uplink beams corresponding to the primary beam, so that the base station determines an uplink primary beam of the user equipment 2000 according to a measurement result of the uplink SRS on the one or more uplink beams corresponding to the primary beam; the receiving unit 2001 is further configured to receive uplink primary beam identity information sent by the base station; and the sending unit 2004 is further configured to send an uplink signal on the uplink primary beam indicated in the uplink primary beam identity information.

Optionally, in an embodiment, the base station and the UE agree in advance that adjacent beams of the primary beam are used as secondary beams of the primary beam.

Optionally, in another embodiment, the determining unit 2003 is further configured to determine the at least one secondary beam according to the signal quality of the at least one beam, where a maximum quantity of secondary beams is configured by the base station for the user equipment 2000, or is agreed upon by the base station and the user equipment 2000 in advance.

Optionally, in an embodiment, the determining unit 2003 is further configured to use the primary beam as a secondary beam and use the first secondary beam as a new primary beam when the user equipment 2000 detects that signal quality of the primary beam is less than a second preset threshold and signal quality of the first secondary beam is greater than a third preset threshold, and duration of this case is greater than a third preset time period; and the sending unit 2004 is further configured to report identity information of the new primary beam and the secondary beam to the base station.

Optionally, in another embodiment, the determining unit 2003 is further configured to replace the second secondary beam with a first beam when the user equipment 2000 detects that signal quality of the second secondary beam is less than a fourth preset threshold and signal quality of the first beam is greater than a third preset threshold, and duration of this case is greater than a fourth preset time period; and the sending unit 2004 is further configured to send identity information of the first beam and the second secondary beam to the base station, where the first beam is another beam other than the primary beam and the secondary beam in beams of the user equipment 2000.

Optionally, the sending unit 2004 is further configured to: when channel quality of a current primary beam and channel quality of all secondary beams of the user equipment 2000 are all less than a fourth preset threshold, and duration of this case is greater than a fifth preset time period, attempt to communicate with the base station on a beam corresponding to a preconfigured candidate beam identity, where the beam corresponding to the candidate beam identity is used when the primary beam and all the secondary beams fail.

Optionally, the determining unit 2003 is further configured to select a beam corresponding to a preconfigured candidate beam identity as a primary beam if a current primary beam of the user equipment 2000 becomes abnormal, where the beam corresponding to the candidate beam identity is used when the primary beam fails.

Optionally, the sending unit 2004 is further configured to: when the user equipment 2000 enters a high-frequency cell, send a discovery signal to the base station according to configuration information of the high-frequency cell, so that the base station sends, according to the discovery signal of the user equipment 2000, the beam indication signal to the user equipment 2000 on the at least one beam in a direction in which the discovery signal of the user equipment 2000 is located.

In addition, the user equipment 2000 may further execute the method in FIG. 2, and implement the functions of the UE in the embodiments shown in FIG. 4 to FIG. 7 and FIG. 9 to FIG. 13. Details are not described in this embodiment of the present application.

Figure 21:
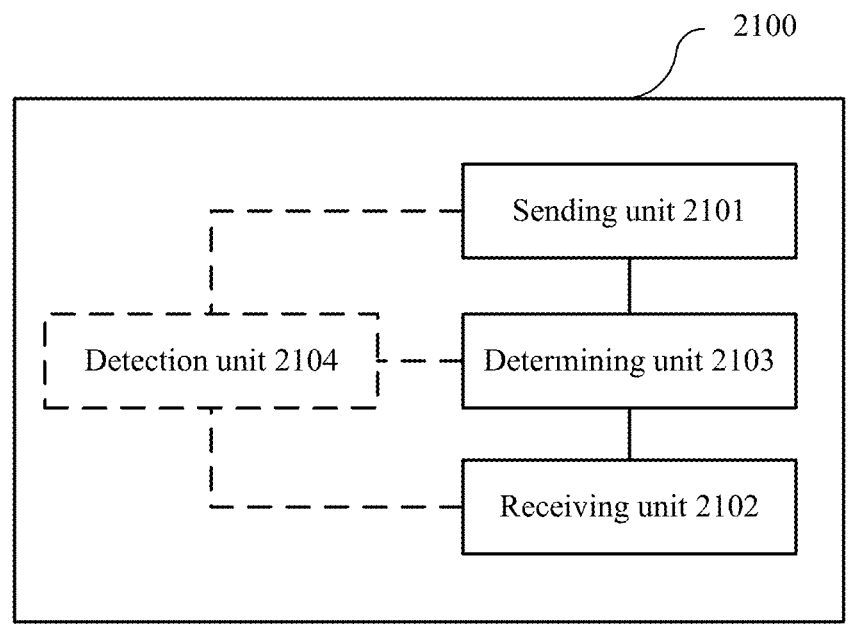
FIG. 21 is a schematic structural diagram of a base station according to an embodiment of the present application.

FIG. 21 is a schematic structural diagram of a base station 2100 according to an embodiment of the present application. The base station 2100 includes:

a sending unit 2101, configured to send a beam indication signal to UE on at least one beam, where the beam indication signal carries identity information of the beam on which the signal is located;

a receiving unit 2102, configured to receive a first beam report message fed back by the UE, where the first beam report message carries identity information of a primary beam in the at least one beam, and the primary beam is determined by the UE according to signal quality of the at least one beam; and a determining unit, configured to determine the primary beam according to the first beam report message.

In this embodiment of the present application, a base station 2100 sends a beam indication signal on at last one beam, where the beam indication signal carries identity information of the at least one beam, and determines, according to signal quality of the at least one beam that is fed back by a UE side, a primary beam used when the base station sends a downlink signal to the UE. This helps improve communication quality in downlink communication performed by the base station.

Optionally, in an embodiment, the base station 2100 further includes: a detection unit 2104, configured to detect an uplink signal of the UE on an uplink beam corresponding to the primary beam; and the determining unit 2103 is further configured to: if the detection unit 2104 detects no measurement signal of the UE on the uplink beam corresponding to the primary beam, determine that the primary beam becomes abnormal.

Optionally, in another embodiment, the base station 2100 further includes: a detection unit 2104, configured to detect an uplink signal of the UE on an uplink beam corresponding to the primary beam; and the determining unit 2103 is further configured to: if the detection unit 2104 detects that quality of a measurement signal of the UE on the uplink beam corresponding to the primary beam is less than a first preset threshold, determine that the primary beam becomes abnormal.

Optionally, in still another embodiment, the receiving unit 2102 is further configured to receive, on a second SRS resource, an SRS sent by the UE; and the determining unit 2103 is further configured to: when the receiving unit 2102 receives, on the second SRS resource, the SRS sent by the UE, determine that the primary beam becomes abnormal, where the base station configures a first SRS resource and the second SRS resource for the UE, and instructs the UE to send an SRS on the first SRS resource when the primary beam works normally and send an SRS on the second SRS resource when the primary beam works abnormally.

Optionally, in still another embodiment, the receiving unit 2102 is further configured to receive second beam report information sent by the UE, where the second beam report information indicates that the primary beam works abnormally.

Optionally, the first beam report message further carries at least one piece of the following information: a physical cell identifier corresponding to the primary beam, CSI-RS port information corresponding to the primary beam, a CSI measurement result corresponding to the primary beam, or an RRM measurement result corresponding to the primary beam.

Optionally, in an embodiment, an uplink time-frequency resource used by the UE to send the first beam report message is configured by the base station for the UE.

Optionally, in an embodiment, the base station further includes a first configuration unit, configured to preconfigure one or more pieces of corresponding receiving beam vector information for each beam in the at least one beam of the UE; and/or configured to preconfigure one or more pieces of corresponding uplink beam vector information for each beam in the at least one beam of the UE.

Optionally, in an embodiment, the base station and the UE agree in advance that adjacent beams of the primary beam are used as the secondary beams.

Optionally, in another embodiment, the determining unit 2103 is further configured to determine at least one secondary beam for the primary beam according to the first beam report message, where the first beam report message further carries identity information of the at least one secondary beam for the primary beam.

Optionally, in an embodiment, the detection unit 2104 is further configured to obtain signal quality of an uplink SRS sent by the UE on an uplink beam corresponding to a beam in the at least one beam other than the primary beam; and the determining unit 2103 is further configured to select, from the at least one beam, at least one beam with relatively good uplink SRS signal quality as the secondary beam for the primary beam.

Further, in an embodiment, the sending unit 2101 is further configured to send identity information of at least one beam to the UE in a low-frequency cell, so that the UE finds a beam corresponding to an identifier of the at least one beam in a high-frequency cell, and receives downlink information on the beam corresponding to the identifier of the at least one beam; and the sending unit 2101 is further configured to send the downlink information on one or more beams in the at least one beam.

Optionally, in an embodiment, the base station further includes a second configuration unit, configured to preconfigure at least one candidate beam identity corresponding to each primary beam. When the primary beam and all the secondary beams fail, the base station performs downlink communication with the UE by using a beam indicated by the at least one candidate beam identity corresponding to the primary beam.

Optionally, in an embodiment, before the sending unit 2101 sends the beam indication signal to the UE on the at least one beam, the receiving unit 2102 is further configured to receive a discovery signal sent when the UE enters a high-frequency cell; and the determining unit 2103 is further configured to: determine a location and a direction of the UE according to the discovery signal of the UE, and determine the at least one beam according to the location and the direction of the UE, where the at least one beam is located in the location and the direction of the UE.

In addition, the base station 2100 may further execute the method in FIG. 14, and implement the functions of the base station in the embodiments shown in FIG. 4 to FIG. 7 and FIG. 9 to FIG. 13. Details are not described in this embodiment of the present application.

Figure 22:
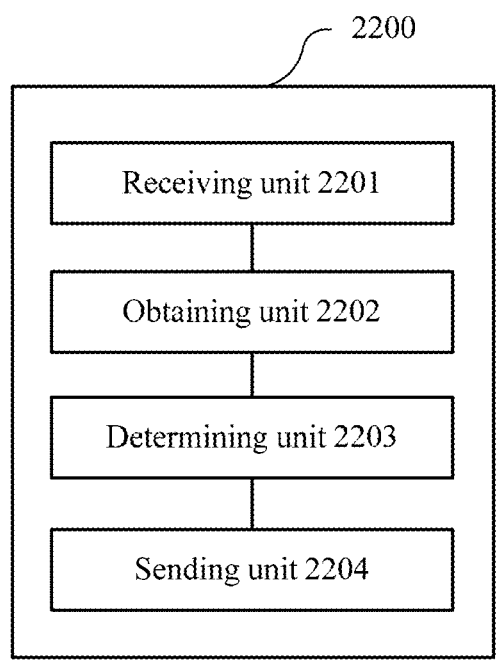
FIG. 22 is another schematic structural diagram of user equipment according to an embodiment of the present application.

FIG. 22 is a schematic structural diagram of user equipment 2200 according to an embodiment of the present application. The user equipment 2200 includes:

a receiving unit 2201, configured to receive a beam indication signal on at least one beam that is sent by a base station, where the beam indication signal carries identity information of the beam on which the signal is located;

an obtaining unit 2202, configured to obtain the identity information of the at least one beam according to the beam indication signal on the at least one beam, where the obtaining unit 2202 is further configured to obtain signal quality of the at least one beam;

a sending unit 2203, configured to send a first beam report message to the base station, where the first beam report message carries signal quality information of the at least one beam; where the receiving unit 2201 is further configured to receive primary beam identity information sent by the base station; and a determining unit 2204, configured to determine a primary beam according to the primary beam identity information.

In this embodiment of the present application, signal quality of at least one beam is obtained according to identity information carried in a beam indication signal on the at least one beam that is sent by a base station, and the signal quality is sent to the base station, so that the base station determines a primary beam used when the base station sends a downlink signal to UE. This helps improve communication quality in downlink communication performed by the base station.

Optionally, the first beam report message includes at least one piece of the following information: CSI-RS port information corresponding to the primary beam, a CSI measurement result corresponding to the primary beam, or an RRM measurement result corresponding to the primary beam. Further, the first beam report message may further carry a physical cell identifier corresponding to the primary beam.

Optionally, in an embodiment, the determining unit 2204 is further configured to determine that the primary beam becomes abnormal if signal quality detected on the primary beam within a first preset time period is less than a first preset threshold.

Optionally, in another embodiment, the determining unit 2204 is further configured to determine that the primary beam becomes abnormal if no downlink signal is detected on the primary beam within a second preset time period.

Optionally, in an embodiment, the sending unit 2203 is further configured to send a second beam report message to the base station when the primary beam becomes abnormal, where the beam report message is used to indicate that the primary beam becomes abnormal.

Optionally, in another embodiment, the sending unit 2203 is further configured to send an SRS to the base station on a second SRS resource when the primary beam becomes abnormal, where the base station configures a first SRS resource and the second SRS resource for the user equipment 2200, and instructs the user equipment 2200 to send an SRS on the first SRS resource when the primary beam works normally and send an SRS on the second SRS resource when the primary beam works abnormally.

Optionally, in the embodiment in which the primary beam becomes abnormal, the receiving unit 2201 is further configured to receive, in a low-frequency cell, beam receiving instruction information sent by the base station, where the beam receiving instruction information is used to instruct the user equipment 2200 to receive a downlink signal on at least one beam in a high-frequency cell; the receiving unit 2201 is further configured to receive the downlink signal on the at least one beam in the high-frequency cell; the obtaining unit 2202 is further configured to obtain signal quality of the at least one beam in the high-frequency cell; and the sending unit 2203 is further configured to feed back the signal quality of the at least one beam to the base station.

Optionally, in an embodiment, an uplink time-frequency resource used by the user equipment 2200 to send the first beam report message is configured by the base station for the user equipment 2200.

Optionally, in another embodiment, the receiving unit 2201 is further configured to: generate one or more receiving beams corresponding to the primary beam according to the primary beam and one or more pieces of receiving beam vector information corresponding to the primary beam, and receive downlink information of the base station on the one or more receiving beams corresponding to the primary beam, where the one or more pieces of receiving beam vector information corresponding to the primary beam are preconfigured by the base station.

Optionally, the sending unit 2203 is further configured to: generate one or more uplink beams corresponding to the primary beam according to the primary beam and one or more pieces of uplink beam vector information corresponding to the primary beam, and send uplink information to the base station on the one or more uplink beams corresponding to the primary beam, where the one or more pieces of uplink beam vector information corresponding to the primary beam are preconfigured by the base station.

Optionally, the sending unit 2203 is further configured to send an uplink SRS on the one or more uplink beams corresponding to the primary beam, so that the base station determines an uplink primary beam of the user equipment 2200 according to a measurement result of the uplink SRS on the one or more uplink beams corresponding to the primary beam; the receiving unit 2201 is further configured to receive uplink primary beam identity information sent by the base station; and the sending unit 2203 is further configured to send an uplink signal on the uplink primary beam indicated in the uplink primary beam identity information.

Optionally, in an embodiment, the base station and the user equipment 2200 agree in advance that adjacent beams of the primary beam are used as secondary beams of the primary beam.

Optionally, in another embodiment, the determining unit 2204 is further configured to determine the at least one secondary beam according to the first beam report message, where the first beam report message further carries identity information of the at least one secondary beam.

Optionally, in an embodiment, the sending unit 2203 is further configured to send identity information and corresponding channel quality of the primary beam and a first secondary beam to the base station when the user equipment 2200 detects that signal quality of the primary beam is less than a second preset threshold and signal quality of the first secondary beam is greater than a third preset threshold, and duration of this case is greater than a third preset time period.

Optionally, in another embodiment, the sending unit 2203 is further configured to send identity information and corresponding channel quality of a first beam and the second secondary beam to the base station when the user equipment 2200 detects that signal quality of the second secondary beam is less than a fourth preset threshold and signal quality of the first beam is greater than a third preset threshold, and duration of this case is greater than a fourth preset time period.

Optionally, in another embodiment, the sending unit 2203 is further configured to: when channel quality of a current primary beam and channel quality of all secondary beams of the user equipment 2200 are all less than a fourth preset threshold, and duration of this case is greater than a fifth preset time period, attempt to communicate with the base station on a beam corresponding to a preconfigured candidate beam identity, where the beam corresponding to the candidate beam identity is used when the primary beam and all the secondary beams fail.

Optionally, the determining unit 2204 is further configured to select a beam corresponding to a preconfigured candidate beam identity as a primary beam when a current primary beam of the user equipment 2200 becomes abnormal, where the beam corresponding to the candidate beam identity is used when the primary beam fails.

Optionally, the sending unit 2203 is further configured to: when the user equipment 2200 enters a high-frequency cell, send a discovery signal to the base station according to configuration information of the high-frequency cell, so that the base station sends, according to the discovery signal of the user equipment 2200, the beam indication signal to the user equipment 2200 on the at least one beam in a direction in which the discovery signal of the user equipment 2200 is located.

In addition, the user equipment 2200 may further execute the method in FIG. 15, and implement the functions of the UE in the embodiments shown in FIG. 16 to FIG. 18, FIG. 7, FIG. 12, and FIG. 13. Details are not described in this embodiment of the present application.

Figure 23:
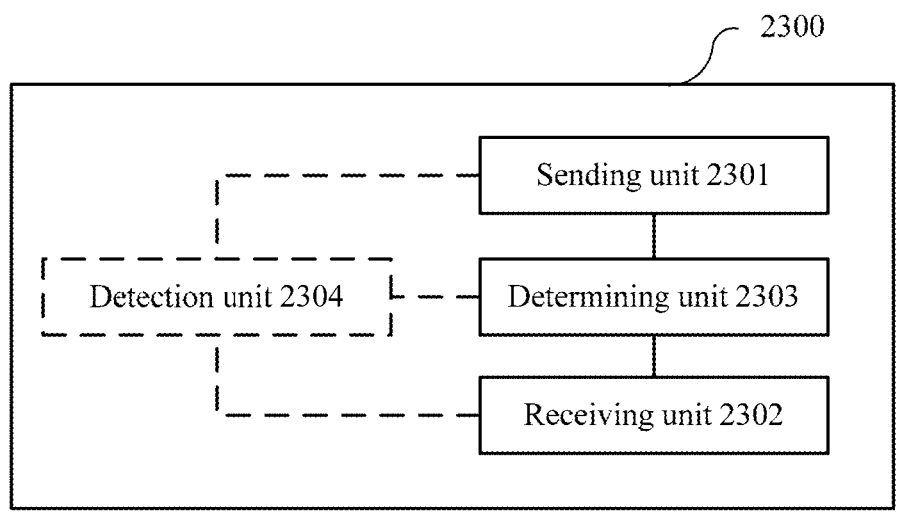
FIG. 23 is another schematic structural diagram of a base station according to an embodiment of the present application.

FIG. 23 is a schematic structural diagram of a base station 2300 according to an embodiment of the present application. The base station 2300 includes:

a sending unit 2301, configured to send a beam indication signal to user equipment UE on at least one beam, where the beam indication signal carries identity information of the beam on which the signal is located;

a receiving unit 2302, configured to receive a first beam report message fed back by the UE, where the first beam report message carries signal quality information of the at least one beam; and a determining unit 2303, configured to determine, according to the signal quality information of the at least one beam, a primary beam used when the base station sends a downlink signal to the UE.

In this embodiment of the present application, a base station 2300 sends, on at least one beam, a beam indication signal carrying a beam identity, and determines, according to signal quality of the at least one beam that is fed back by UE, a primary beam used when the base station sends a downlink signal to the UE. This helps improve communication quality in downlink communication performed by the base station.

Optionally, the signal quality information includes at least one piece of the following information: CSI-RS port information corresponding to the primary beam, a CSI measurement result corresponding to the primary beam, or an RRM measurement result corresponding to the primary beam. Further, the first beam report message further carries a physical cell identifier corresponding to the primary beam.

Optionally, in an embodiment, the base station 2300 further includes: a detection unit 2304, configured to detect an uplink signal of the UE on an uplink beam corresponding to the primary beam; and the determining unit 2303 is further configured to: if the detection unit 2304 detects no measurement signal of the UE on the uplink beam corresponding to the primary beam, determine that the primary beam becomes abnormal.

Optionally, in another embodiment, the base station 2300 further includes: a detection unit 2304, configured to detect an uplink signal of the UE on an uplink beam corresponding to the primary beam; and the determining unit 2303 is further configured to: if the detection unit 2304 detects that quality of a measurement signal of the UE on the uplink beam corresponding to the primary beam is less than a first preset threshold, determine that the primary beam becomes abnormal.

Optionally, in still another embodiment, the receiving unit 2302 is further configured to receive, on a second SRS resource, an SRS sent by the UE; and the determining unit 2303 is further configured to: when the receiving unit 2302 receives, on the second SRS resource, the SRS sent by the UE, determine that the primary beam becomes abnormal, where the base station 2300 configures a first SRS resource and the second SRS resource for the UE, and instructs the UE to send an SRS on the first SRS resource when the primary beam works normally and send an SRS on the second SRS resource when the primary beam works abnormally.

Optionally, in still another embodiment, the receiving unit 2302 is further configured to receive second beam report information sent by the UE, where the second beam report information indicates that the primary beam works abnormally.

Optionally, in an embodiment, an uplink time-frequency resource used by the UE to send the first beam report message is configured by the base station 2300 for the UE.

Optionally, in an embodiment, the base station 2300 further includes a first configuration unit, configured to:

preconfigure one or more pieces of corresponding receiving beam vector information for each beam in the at least one beam of the UE; and/or preconfigure one or more pieces of corresponding uplink beam vector information for each beam in the at least one beam of the UE.

Optionally, in an embodiment, the base station 2300 and the UE agree in advance that adjacent beams of the primary beam are used as the secondary beams.

Optionally, in another embodiment, the determining unit 2303 is further configured to determine at least one secondary beam for the primary beam according to the signal quality information of the at least one beam.

Optionally, in an embodiment, the detection unit 2304 is further configured to obtain signal quality of an uplink SRS sent by the UE on an uplink beam corresponding to a beam in the at least one beam other than the primary beam; and the determining unit 2303 is further configured to select, from the at least one beam, at least one beam with relatively good uplink SRS signal quality as the secondary beam for the primary beam.

Further, in an embodiment, the sending unit 2301 is further configured to send identity information of at least one beam to the UE in a low-frequency cell, so that the UE finds a beam corresponding to an identifier of the at least one beam in a high-frequency cell, and receives downlink information on the beam corresponding to the identifier of the at least one beam; and the sending unit 2301 is further configured to send the downlink information on one or more beams in the at least one beam.

Optionally, in an embodiment, the base station 2300 further includes a second configuration unit, configured to preconfigure at least one candidate beam identity corresponding to each primary beam. When the primary beam and all the secondary beams fail, the base station 2300 performs downlink communication with the UE by using a beam indicated by the at least one candidate beam identity corresponding to the primary beam.

Optionally, in an embodiment, before the sending unit 2301 sends the beam indication signal to the UE on the at least one beam, the receiving unit 2302 is further configured to receive a discovery signal sent when the UE enters a high-frequency cell; and the determining unit 2303 is further configured to: determine a location and a direction of the UE according to the discovery signal of the UE, and determine the at least one beam according to the location and the direction of the UE, where the at least one beam is located in the location and the direction of the UE.

In addition, the base station 2300 may further execute the method in FIG. 19, and implement the functions of the base station in the embodiments shown in FIG. 16 to FIG. 18, FIG. 7, FIG. 12, and FIG. 13. Details are not described in this embodiment of the present application.

Figure 24:
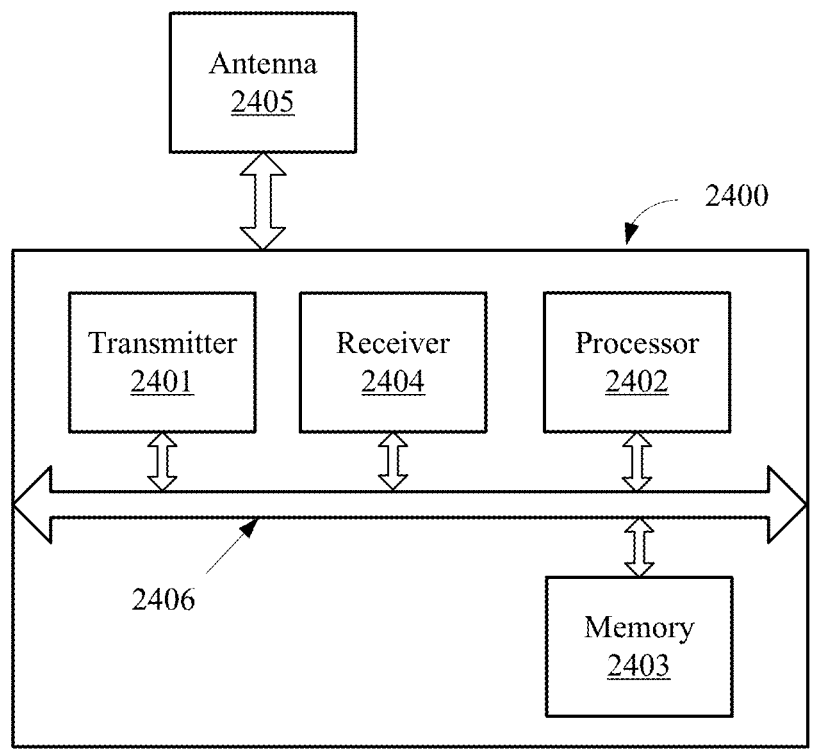
FIG. 24 is still another schematic structural diagram of user equipment according to an embodiment of the present application.

FIG. 24 is a schematic structural diagram of user equipment 2400 according to an embodiment of the present application. The user equipment 2400 may include a processor 2402, a memory 2403, a transmitter 2401, and a receiver 2404. In specific application, the user equipment 2400 may be the like.

The receiver 2404, the transmitter 2401, the processor 2402, and the memory 2403 are connected to each other by using a bus 2406 system. The bus 2406 may be an ISA bus, a PCI bus, an EISA bus, or the like. The bus may be classified into an address bus, a data bus, a control bus, and the like. For convenience of representation, only one double-headed arrow is used in FIG. 24 for representation, which, however, does not mean that there is only one bus or one type of bus. In specific application, the transmitter 2401 and the receiver 2404 may be coupled to an antenna 2405.

The memory 2403 is configured to store a program. Specifically, the program may include program code, and the program code includes a computer operation instruction. The memory 2403 may include a read-only memory and a random access memory, and provide an instruction and data for the processor 2402. The memory 2403 may include a high-speed RAM memory, and may further include a non-volatile memory, for example, at least one magnetic disk memory.

The processor 2402 executes the program stored in the memory 2403, and is specifically configured to execute the following operations:

receiving, by using the receiver 2404, a beam indication signal on at least one beam that is sent by a base station, where the beam indication signal carries identity information of the beam on which the signal is located;

obtaining the identity information of the at least one beam according to the beam indication signal on the at least one beam;

obtaining signal quality of the at least one beam;

determining, according to the signal quality of the at least one beam, a primary beam used when the base station sends a downlink signal to the user equipment 2400; and sending a first beam report message to the base station by using the transmitter 2401, where the first beam report message carries identity information of the primary beam.

The foregoing method that is disclosed in any embodiment of FIG. 2, FIG. 4 to FIG. 7, and FIG. 9 to FIG. 13 of the present application and is executed by user equipment may be applied to the processor 2402 or implemented by the processor 2402. The processor 2402 may be an integrated circuit chip with a signal processing capability. In an implementation process, the steps of the foregoing method may be completed by using an integrated logic circuit of hardware in the processor 2402 or an instruction in a form of software. The foregoing processor 2402 may be a general purpose processor that includes a central processing unit (CPU), a network processor (NP), and the like; or may be a digital signal processor (DSP), an application-specific integrated circuit (ASIC), a field programmable gate array (FPGA) or another programmable logic device, a discrete gate or a transistor logic device, or a discrete hardware component, and can implement or execute various methods, steps, and logical block diagrams disclosed in this embodiment of the present application. The general purpose processor may be a microprocessor, or the processor may be any conventional processor or the like. The steps of the method disclosed in the embodiments of the present application may be executed and completed by a hardware decoding processor, or executed and completed by means of a combination of hardware and a software module in a decoding processor. The software module may be located in any mature storage medium in the field such as a random access memory, a flash memory, a read-only memory, a programmable read-only memory, an electrically erasable programmable memory, or a register. The storage medium is located in the memory 2403. The processor 2402 reads information in the memory 2403, and completes the steps of the foregoing method in combination with hardware of the processor 2402.

In this embodiment of the present application, user equipment 2400 obtains signal quality of at least one beam by using identity information carried in a beam indication signal on the at least one beam that is sent by a base station, and determines, according to the signal quality of the at least one beam, a primary beam used when the base station sends a downlink signal to the UE. This helps improve communication quality in downlink communication performed by the base station.

In addition, by using the processor 2402, the transmitter 2401, the receiver 2404, and the like, the user equipment 2400 may further execute the method in FIG. 2, and implement the functions of the UE in the embodiments shown in FIG. 4 to FIG. 7 and FIG. 9 to FIG. 13. Details are not described in this embodiment of the present application.

Figure 25:
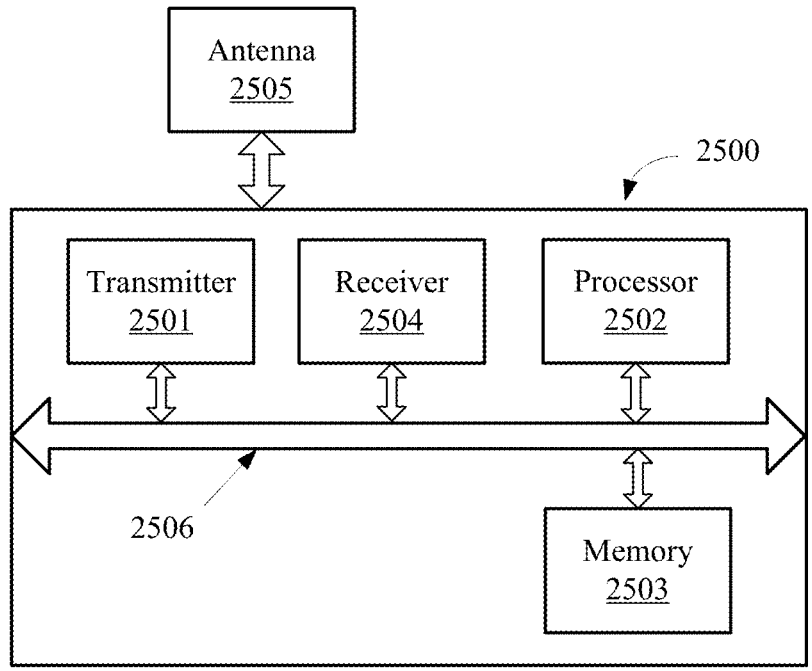
FIG. 25 is still another schematic structural diagram of a base station according to an embodiment of the present application.

FIG. 25 is a schematic structural diagram of a base station 2500 according to an embodiment of the present application. The base station 2500 may include a processor 2502, a memory 2503, a transmitter 2501, and a receiver 2504. In specific application, the base station 2500 may be the like.

The receiver 2504, the transmitter 2501, the processor 2502, and the memory 2503 are connected to each other by using a bus 2506 system. The bus 2506 may be an ISA bus, a PCI bus, an EISA bus, or the like. The bus may be classified into an address bus, a data bus, a control bus, and the like. For convenience of representation, only one double-headed arrow is used in FIG. 25 for representation, which, however, does not mean that there is only one bus or one type of bus. In specific application, the transmitter 2501 and the receiver 2504 may be coupled to an antenna 2505.

The memory 2503 is configured to store a program. Specifically, the program may include program code, and the program code includes a computer operation instruction. The memory 2503 may include a read-only memory and a random access memory, and provide an instruction and data for the processor 2502. The memory 2503 may include a high-speed RAM memory, and may further include a non-volatile memory, for example, at least one magnetic disk memory.

The processor 2502 executes the program stored in the memory 2503, and is specifically configured to execute the following operations:

sending, by using the transmitter 2501, a beam indication signal to UE on at least one beam, where the beam indication signal carries identity information of the beam on which the signal is located;

receiving, by using the receiver 2504, a first beam report message fed back by the UE, where the first beam report message carries identity information of a primary beam in the at least one beam, and the primary beam is determined by the UE according to signal quality of the at least one beam; and determining the primary beam according to the first beam report message.

The foregoing method that is disclosed in any embodiment of FIG. 4 to FIG. 7, and FIG. 9 to FIG. 14 of the present application and is executed by a base station may be applied to the processor 2502 or implemented by the processor 2502. The processor 2502 may be an integrated circuit chip with a signal processing capability. In an implementation process, the steps of the foregoing method may be completed by using an integrated logic circuit of hardware in the processor 2502 or an instruction in a form of software. The foregoing processor 2502 may be a general purpose processor that includes a central processing unit (CPU), a network processor (NP), and the like; or may be a digital signal processor (DSP), an application-specific integrated circuit (ASIC), a field programmable gate array (FPGA) or another programmable logic device, a discrete gate or a transistor logic device, or a discrete hardware component, and can implement or execute various methods, steps, and logical block diagrams disclosed in this embodiment of the present application. The general purpose processor may be a microprocessor, or the processor may be any conventional processor or the like. The steps of the method disclosed in the embodiments of the present application may be executed and completed by a hardware decoding processor, or executed and completed by means of a combination of hardware and a software module in a decoding processor. The software module may be located in any mature storage medium in the field such as a random access memory, a flash memory, a read-only memory, a programmable read-only memory, an electrically erasable programmable memory, or a register. The storage medium is located in the memory 2503. The processor 2502 reads information in the memory 2503, and completes the steps of the foregoing method in combination with hardware of the processor 2502.

In this embodiment of the present application, a base station 2500 sends a beam indication signal on at last one beam, where the beam indication signal carries identity information of the at least one beam, and determines, according to signal quality of the at least one beam that is fed back by a UE side, a primary beam used when the base station sends a downlink signal to the UE. This helps improve communication quality in downlink communication performed by the base station.

In addition, by using the processor 2502, the transmitter 2501, the receiver 2504, and the like, the base station 2500 may further execute the method in FIG. 14, and implement the functions of the base station in the embodiments shown in FIG. 4 to FIG. 7 and FIG. 9 to FIG. 13. Details are not described in this embodiment of the present application.

Figure 26:
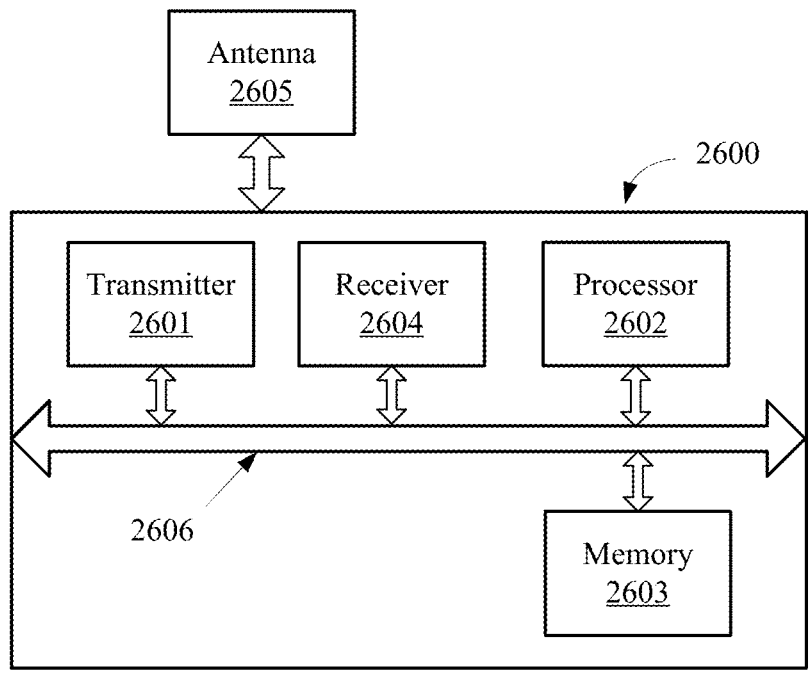
FIG. 26 is yet another schematic structural diagram of user equipment according to an embodiment of the present application.

FIG. 26 is a schematic structural diagram of user equipment 2600 according to an embodiment of the present application. The user equipment 2600 may include a processor 2602, a memory 2603, a transmitter 2601, and a receiver 2604. In specific application, the user equipment 2600 may be the like.

The receiver 2604, the transmitter 2601, the processor 2602, and the memory 2603 are connected to each other by using a bus 2606 system. The bus 2606 may be an ISA bus, a PCI bus, an EISA bus, or the like. The bus may be classified into an address bus, a data bus, a control bus, and the like. For convenience of representation, only one double-headed arrow is used in FIG. 26 for representation, which, however, does not mean that there is only one bus or one type of bus. In specific application, the transmitter 2601 and the receiver 2604 may be coupled to an antenna 2605.

The memory 2603 is configured to store a program. Specifically, the program may include program code, and the program code includes a computer operation instruction. The memory 2603 may include a read-only memory and a random access memory, and provide an instruction and data for the processor 2602. The memory 2603 may include a high-speed RAM memory, and may further include a non-volatile memory, for example, at least one magnetic disk memory.

The processor 2602 executes the program stored in the memory 2603, and is specifically configured to execute the following operations:

receiving, by using the receiver 2604, a beam indication signal on at least one beam that is sent by a base station, where the beam indication signal carries identity information of the beam on which the signal is located;

obtaining the identity information of the at least one beam according to the beam indication signal on the at least one beam;

obtaining signal quality of the at least one beam;

sending, by using the transmitter 2601, a first beam report message to the base station, where the first beam report message carries signal quality information of the at least one beam;

receiving, by using the receiver 2604, primary beam identity information sent by the base station; and determining a primary beam according to the primary beam identity information.

The foregoing method that is disclosed in any embodiment of FIG. 16 to FIG. 18, FIG. 7, FIG. 12, and FIG. 13 of the present application and is executed by user equipment may be applied to the processor 2602 or implemented by the processor 2602. The processor 2602 may be an integrated circuit chip with a signal processing capability. In an implementation process, the steps of the foregoing method may be completed by using an integrated logic circuit of hardware in the processor 2602 or an instruction in a form of software. The foregoing processor 2602 may be a general purpose processor that includes a central processing unit (CPU), a network processor (NP), and the like; or may be a digital signal processor (DSP), an application-specific integrated circuit (ASIC), a field programmable gate array (FPGA) or another programmable logic device, a discrete gate or a transistor logic device, or a discrete hardware component, and can implement or execute various methods, steps, and logical block diagrams disclosed in this embodiment of the present application. The general purpose processor may be a microprocessor, or the processor may be any conventional processor or the like. The steps of the method disclosed in the embodiments of the present application may be executed and completed by a hardware decoding processor, or executed and completed by means of a combination of hardware and a software module in a decoding processor. The software module may be located in any mature storage medium in the field such as a random access memory, a flash memory, a read-only memory, a programmable read-only memory, an electrically erasable programmable memory, or a register. The storage medium is located in the memory 2603. The processor 2602 reads information in the memory 2603, and completes the steps of the foregoing method in combination with hardware of the processor 2602.

In this embodiment of the present application, user equipment 2600 obtains signal quality of at least one beam according to identity information carried in a beam indication signal on the at least one beam that is sent by a base station, and sends the signal quality to the base station, so that the base station determines a primary beam used when the base station sends a downlink signal to UE. This helps improve communication quality in downlink communication performed by the base station.

In addition, by using the processor 2602, the transmitter 2601, the receiver 2604, and the like, the user equipment 2600 may further execute the method in FIG. 15, and implement the functions of the UE in the embodiments shown in FIG. 16 to FIG. 18, FIG. 7, FIG. 12, and FIG. 13. Details are not described in this embodiment of the present application.

Figure 27:
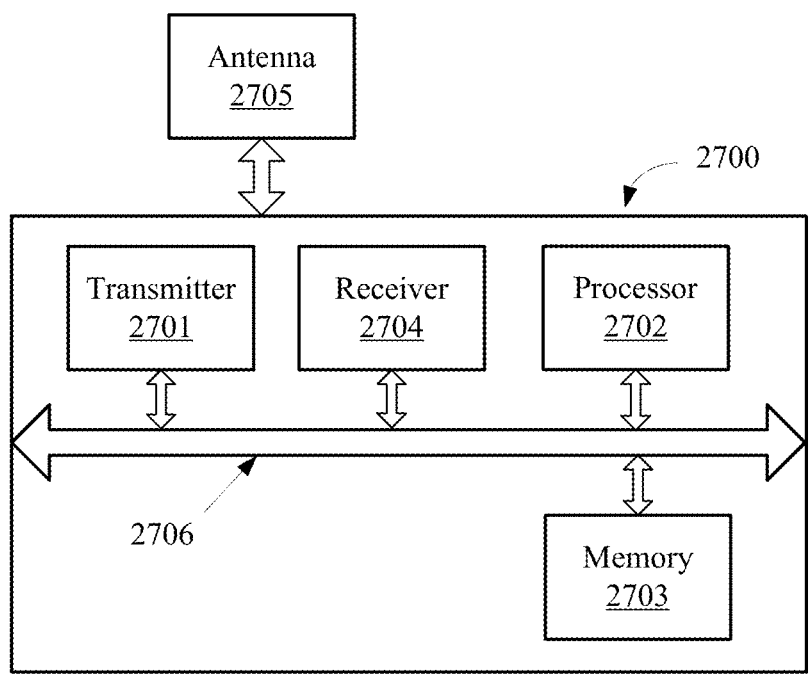
FIG. 27 is yet another schematic structural diagram of a base station according to an embodiment of the present application.

FIG. 27 is a schematic structural diagram of a base station 2700 according to an embodiment of the present application. The base station 2700 may include a processor 2702, a memory 2703, a transmitter 2701, and a receiver 2704. In specific application, the base station 2700 may be the like.

The receiver 2704, the transmitter 2701, the processor 2702, and the memory 2703 are connected to each other by using a bus 2706 system. The bus 2706 may be an ISA bus, a PCI bus, an EISA bus, or the like. The bus may be classified into an address bus, a data bus, a control bus, and the like. For convenience of representation, only one double-headed arrow is used in FIG. 27 for representation, which, however, does not mean that there is only one bus or one type of bus. In specific application, the transmitter 2701 and the receiver 2704 may be coupled to an antenna 2705.

The memory 2703 is configured to store a program. Specifically, the program may include program code, and the program code includes a computer operation instruction. The memory 2703 may include a read-only memory and a random access memory, and provide an instruction and data for the processor 2702. The memory 2703 may include a high-speed RAM memory, and may further include a non-volatile memory, for example, at least one magnetic disk memory.

The processor 2702 executes the program stored in the memory 2703, and is specifically configured to execute the following operations:

sending, by using the transmitter 2701, a beam indication signal to user equipment UE on at least one beam, where the beam indication signal carries identity information of the beam on which the signal is located;

receiving, by using the receiver 2704, a first beam report message fed back by the UE, where the first beam report message carries signal quality information of the at least one beam; and determining, according to the signal quality information of the at least one beam, a primary beam used when the base station sends a downlink signal to the UE.

The foregoing method that is disclosed in any embodiment in FIG. 16 to FIG. 19, FIG. 7, FIG. 12, and FIG. 13 of the present application and is executed by a base station may be applied to the processor 2702, or implemented by the processor 2702. The processor 2702 may be an integrated circuit chip with a signal processing capability. In an implementation process, the steps of the foregoing method may be completed by using an integrated logic circuit of hardware in the processor 2702 or an instruction in a form of software. The processor 2702 may be a general purpose processor, including a central processing unit (CPU), a network processor (NP), and the like, or may also be a digital signal processor (DSP), an application-specific integrated circuit (ASIC), a field programmable gate array (FPGA) or another programmable logic device, discrete gate or transistor logic device, or discrete hardware component. The processor 2702 can implement or execute the methods, steps, and logical block diagrams disclosed in the embodiments of the present application. The general purpose processor may be a microprocessor, or the processor may be any conventional processor or the like. The steps of the method disclosed in the embodiments of the present application may be executed and completed by a hardware decoding processor, or executed and completed by means of a combination of hardware and a software module in a decoding processor. The software module may be located in any mature storage medium in the field such as a random memory, a flash memory, a read-only memory, a programmable read-only memory, an electrically erasable programmable memory, or a register. The storage medium is located in the memory 2703, and the processor 2702 reads information in the memory 2703 and completes the steps in the foregoing methods in combination with hardware of the processor.

In this embodiment of the present application, a base station 2700 sends, on at least one beam, a beam indication signal carrying a beam identity, and determines, according to signal quality of the at least one beam that is fed back by UE, a primary beam used when the base station sends a downlink signal to the UE. This helps improve communication quality in downlink communication performed by the base station.

In addition, by using the processor 2702, the transmitter 2701, the receiver 2704, and the like, the base station 2700 may further execute the method in FIG. 19, and implement the functions of the base station in the embodiments shown in FIG. 16 to FIG. 18, FIG. 7, FIG. 12, and FIG. 13. Details are not described in this embodiment of the present application.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method implemented for transmitting information, the method comprising:
   receiving, by a user equipment (UE), a beam indication signal on at least one beam from a base station, wherein the beam indication signal carries identity information of the at least one beam;
   obtaining, by the UE, the identity information of the at least one beam according to the beam indication signal;
   obtaining, by the UE, a signal quality of the at least one beam;
   determining, by the UE according to the signal quality of the at least one beam, a primary beam and a secondary beam each for carrying a downlink signal;
   sending, by the UE, a first beam report message to the base station, wherein the first beam report message carries identity information of the primary beam and the secondary beam;
   receiving, by the UE, an instruction from the base station, wherein the instruction is used to instruct the UE to send a sounding reference signal (SRS) on a first SRS resource when the primary beam works normally and send the SRS on a second SRS resource when the primary beam works abnormally;

determining, by the UE, whether a signal quality of the primary beam is less than a preset threshold for a preset time period, thereby determining whether the primary beam is abnormal;

when it is determined the primary beam is abnormal, sending, by the UE, the SRS to the base station on the second SRS resource;

and when it is determined the primary beam is normal, sending, by the UE, the SRS on the first SRS resource, wherein the first SRS resource is different than the second SRS resource.

2. The method according to claim 1, further comprising: receiving, by the UE in a low-frequency cell, beam receiving instruction information from the base station for instructing the UE to receive a downlink signal on at least one beam in a high-frequency cell;

receiving, by the UE, the downlink signal on the at least one beam in the high-frequency cell;

obtaining, by the UE, a signal quality of the at least one beam in the high-frequency cell;

and using, by the UE, a beam with best signal quality as a new primary beam; and feeding back, by the UE, the new primary beam to the base station.

3. The method according to claim 1, wherein the first beam report message further comprises at least one of:
a physical cell identifier corresponding to the primary beam,
channel state information-reference signal (CSI-RS) port information corresponding to the primary beam,
a channel state information (CSI) measurement result of the primary beam, or a radio resource management (RRM) measurement result of the primary beam.

4. The method according to claim 1, further comprising: generating, by the UE, one or more receiving beams corresponding to the primary beam
according to the primary beam and one or more pieces of receiving beam vector information corresponding to the primary beam;
and receiving, by the UE, downlink information of the base station on the one or more receiving beams corresponding to the primary beam, wherein the one or more pieces of receiving beam vector information corresponding to the primary beam are preconfigured by the base station.

5. The method according to claim 1, further comprising: selecting, by the UE, a beam corresponding to a preconfigured candidate beam identity as a primary beam when a current primary beam of the UE becomes abnormal, wherein the beam corresponding to the candidate beam identity is used when the primary beam fails.

6. The method according to claim 1, wherein before receiving, by the UE, the beam indication signal on the at least one beam from the base station, the method further comprises:
when the UE enters a high-frequency cell, sending, by the UE, a discovery signal to the base station according to configuration information of the high-frequency cell to enable the base station to send, according to the discovery signal of the UE, the beam indication signal to the UE on the at least one beam in a direction in which the discovery signal of the UE is located.

7. The method according to claim 1, wherein the beam indication signal comprises at least one of the:
a cell discovery signal, a primary synchronization signal, a secondary synchronization signal, a broadcast channel signal, a cell-specific reference signal, a channel state reference signal, or a signal specific for indicating a beam identity.

8. An apparatus, comprising:
a processor;
and a memory coupled to the processor and for storing instructions which, when executed by the processor, cause the apparatus to:
receive a beam indication signal on at least one beam from a base station, wherein the beam indication signal carries identity information of the at least one beam,
obtain the identity information of the at least one beam according to the beam indication signal,
obtain a signal quality of the at least one beam,
determine, according to the signal quality of the at least one beam, a primary beam and a secondary beam each for carrying a downlink signal,
send a first beam report message to the base station, wherein the first beam report message carries identity information of the primary beam and the secondary beam,
receive an instruction from the base station, wherein the instruction is used to instruct the UE to send a sounding reference signal (SRS) on a first SRS resource when the primary beam works normally and send the SRS on a second SRS resource when the primary beam works abnormally,
determine whether a signal quality of the primary beam is less than a preset threshold for a preset time period, thereby determine whether the primary beam is abnormal,
when it is determined the primary beam is abnormal, send the SRS to the base station on the second SRS resource, and
when it is determined the primary beam is normal, send the SRS on the first SRS resource,
wherein the first SRS resource is different than the second SRS resource.

9. The apparatus according to claim 8, wherein the instructions, when executed by the processor, further cause the apparatus to:
receive, in a low-frequency cell, beam receiving instruction information from the base station for instructing the apparatus to receive a downlink signal on at least one beam in a high-frequency cell;
receive the downlink signal on the at least one beam in the high-frequency cell;
obtain a signal quality of the at least one beam in the high-frequency cell;
use a beam with a best signal quality as a new primary beam;
and feed back the new primary beam to the base station.

10. The apparatus according to claim 8, wherein the instructions, when executed by the processor, further cause the apparatus to:
generate one or more receiving beams corresponding to the primary beam according to the primary beam and one or more pieces of receiving beam vector information corresponding to the primary beam, and
receive downlink information of the base station on the one or more receiving beams corresponding to the primary beam, wherein the one or more pieces of receiving beam vector information corresponding to the primary beam are preconfigured by the base station.

11. The apparatus according to claim 8, wherein the first beam report message further comprises at least one of:

a physical cell identifier corresponding to the primary beam, channel state information-reference signal (CSI-RS) port information corresponding to the primary beam, a channel state information (CSI) measurement result of the primary beam, or a radio resource management (RRM) measurement result of the primary beam.

12. The apparatus according to claim 8, wherein the beam indication signal comprises at least one of the:

a cell discovery signal, a primary synchronization signal, a secondary synchronization signal, a broadcast channel signal, a cell-specific reference signal, a channel state reference signal, or a signal specific for indicating a beam identity.

13. A non-transitory, computer-readable storage medium comprising instructions which, when executed by a processor of a computer, cause the computer to:

receive a beam indication signal on at least one beam from a base station, wherein the beam indication signal carries identity information of the at least one beam;

obtain the identity information of the at least one beam according to the beam indication signal;

obtain a signal quality of the at least one beam;

determine, according to the signal quality of the at least one beam, a primary beam and a secondary beam each for carrying a downlink signal;

send a first beam report message to the base station, wherein the first beam report message carries identity information of the primary beam and the secondary beam;

receive an instruction from the base station, wherein the instruction is used to instruct the UE to send a sounding reference signal (SRS) on a first SRS resource when the primary beam works normally and send the SRS on a second SRS resource when the primary beam works abnormally;

determine whether a signal quality of the primary beam is less than a preset threshold for a preset time period, thereby determine whether the primary beam is abnormal;

when it is determined the primary beam is abnormal, send the SRS to the base station on the second SRS resource;

and when it is determined the primary beam is normal, send the SRS on the first SRS resource, wherein the first SRS resource is different than the second SRS resource.

14. The non-transitory, computer-readable storage medium according to claim 13, wherein the instructions cause the computer to:

receive, in a low-frequency cell, beam receiving instruction information from the base station for instructing the computer to receive a downlink signal on at least one beam in a high-frequency cell;

receive the downlink signal on the at least one beam in the high-frequency cell;

obtain signal quality of the at least one beam in the high-frequency cell;

use a beam with a best signal quality as a new primary beam;

and feed back the new primary beam to the base station.

15. The non-transitory, computer-readable storage medium according to claim 13, wherein the instructions cause the computer to:

generate one or more receiving beams corresponding to the primary beam according to the primary beam and one or more pieces of receiving beam vector information corresponding to the primary beam, and receive downlink information of the base station on the one or more receiving beams corresponding to the primary beam, wherein the one or more pieces of receiving beam vector information corresponding to the primary beam are preconfigured by the base station.

16. The non-transitory, computer-readable storage medium according to claim 13, wherein the first beam report message further comprises at least one of:

a physical cell identifier corresponding to the primary beam, channel state information-reference signal (CSI-RS) port information corresponding to the primary beam, a channel state information (CSI) measurement result of the primary beam, or a radio resource management (RRM) measurement result of the primary beam.

17. The non-transitory, computer-readable storage medium according to claim 13, wherein the beam indication signal comprises at least one of:

a cell discovery signal, a primary synchronization signal, a secondary synchronization signal, a broadcast channel signal, a cell-specific reference signal, a channel state reference signal, or a signal specific for indicating a beam identity.

* * * * *